US011888150B2

(12) United States Patent
Liu et al.

(10) Patent No.: US 11,888,150 B2
(45) Date of Patent: Jan. 30, 2024

(54) POSITIVE ELECTRODE PLATE, SECONDARY BATTERY AND POWER CONSUMING DEVICE

(71) Applicant: CONTEMPORARY AMPEREX TECHNOLOGY CO., LIMITED, Ningde (CN)

(72) Inventors: Huihui Liu, Ningde (CN); Lingyun Feng, Ningde (CN); Yanhuang Fan, Ningde (CN); Lianwei Duan, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 18/354,618

(22) Filed: Jul. 18, 2023

(65) Prior Publication Data

US 2023/0361273 A1 Nov. 9, 2023

Related U.S. Application Data

(63) Continuation of application No. PCT/CN2022/084404, filed on Mar. 31, 2022.

(51) Int. Cl.
*H01M 4/136* (2010.01)
*H01M 4/36* (2006.01)
(Continued)

(52) U.S. Cl.
CPC .......... *H01M 4/136* (2013.01); *H01M 4/366* (2013.01); *H01M 4/583* (2013.01);
(Continued)

(58) Field of Classification Search
None
See application file for complete search history.

(56) References Cited

U.S. PATENT DOCUMENTS

2013/0224594 A1\* 8/2013 Yushin ............... H01M 4/5815
252/182.1
2020/0067080 A1\* 2/2020 Pan ......................... H01M 4/48

FOREIGN PATENT DOCUMENTS

CN 103069624 A 4/2013
CN 110431697 A 11/2019
(Continued)

OTHER PUBLICATIONS

The World Intellectual Property Organization (WIPO) International Search Report and Written Opinion for PCT/CN2022/084404 dated Jan. 5, 2023 17 pages (including English translation).

*Primary Examiner* — Tracy M Dove
(74) *Attorney, Agent, or Firm* — ANOVA LAW GROUP, PLLC

(57) ABSTRACT

A positive electrode plate includes a positive electrode current collector, a positive electrode film layer arranged on at least one surface of the positive electrode current collector, and a conductive undercoat layer positioned between the positive electrode current collector and the positive electrode film layer. The positive electrode film layer includes a positive electrode active material including an inner core and a shell coating the inner core. The shell includes a first coating layer coating the inner core, a second coating layer coating the first coating layer, and a third coating layer coating the second coating layer. The conductive undercoat layer includes a polymer, an aqueous binder, and a conductive agent.

20 Claims, 4 Drawing Sheets

(51) Int. Cl.
      *H01M 4/62*        (2006.01)
      *H01M 4/58*        (2010.01)
      *H01M 4/583*      (2010.01)
      *H01M 4/02*        (2006.01)

(52) U.S. Cl.
      CPC ......... *H01M 4/5825* (2013.01); *H01M 4/622* (2013.01); *H01M 4/625* (2013.01); *H01M 2004/021* (2013.01); *H01M 2004/028* (2013.01)

(56) References Cited

FOREIGN PATENT DOCUMENTS

| | | |
|---|---|---|
| CN | 114174384 A | 3/2022 |
| CN | 114256448 A | 3/2022 |
| JP | H1173943 A | 3/1999 |
| JP | 2014056722 A | 3/2014 |

* cited by examiner

POSITIVE ELECTRODE PLATE, SECONDARY BATTERY AND POWER CONSUMING DEVICE

CROSS-REFERENCE TO RELATED APPLICATION

This application is a continuation of International Application No. PCT/CN2022/084404, filed on Mar. 31, 2022, the entire content of which is incorporated herein by reference.

TECHNICAL FIELD

The present application relates to the technical field of batteries, and in particular to a positive electrode plate, a secondary battery, and a power consuming device.

BACKGROUND ART

In recent years, with the increasing application range, secondary batteries are widely used in energy storage power systems such as hydraulic power, thermal power, wind power and solar power stations, as well as many fields such as electric tools, electric bicycles, electric motorcycles, electric vehicles, military equipment, and aerospace. Due to the great development of secondary batteries, higher requirements have also been placed on the secondary batteries in terms of energy density, cycling performance, etc.

In the related art, a conductive undercoat layer arranged between the active material of a positive electrode plate and a current collector is used to improve one or more properties of the secondary battery.

In order to further improve the battery performance, there is a need in the related art for a better positive electrode plate.

SUMMARY

In view of the above issues, the present application provides a novel positive electrode plate, a secondary battery, and a power consuming device, which are described separately below.

In a first aspect, the present application provides a positive electrode plate, comprising a positive electrode current collector, a positive electrode film layer arranged on at least one surface of the positive electrode current collector, and a conductive undercoat layer positioned between the positive electrode current collector and the positive electrode film layer, wherein the positive electrode film layer comprises a positive electrode active material having a core-shell structure, with the positive electrode active material comprising an inner core and a shell coating the inner core, wherein the inner core has a chemical formula of $Li_{1+x}Mn_{1-y}A_yP_{1-z}R_zO_4$ in which x is any value in a range of −0.100 to 0.100, y is any value in a range of 0.001 to 0.500, z is any value in a range of 0.001 to 0.100, A is one or more elements selected from Zn, Al, Na, K, Mg, Mo, W, Ti, V, Zr, Fe, Ni, Co, Ga, Sn, Sb, Nb, and Ge, optionally one or more elements of Fe, Ti, V, Ni, Co, and Mg, R is one or more elements selected from B, Si, N, and S, and optionally, R is an element selected from B, Si, N, and S, with the values of x, y, and z satisfying the following condition: keeping the entire inner core electrically neutral; the shell comprises a first coating layer coating the inner core, a second coating layer coating the first coating layer, and a third coating layer coating the second coating layer, wherein the first coating layer comprises crystalline pyrophosphate $Li_aMP_2O_7$ and/or $M_b(P_2O_7)_c$ in which 0≤a≤2, 1≤b≤4, and 1≤c≤6, with the values of a, b, and c satisfying the following condition: keeping the crystalline pyrophosphate $Li_aMP_2O_7$ or $M_b(P_2O_7)_c$ electrically neutral; and M in each of the crystalline pyrophosphates $Li_aMP_2O_7$ and $M_b(P_2O_7)_c$ is independently one or more elements selected from Fe, Ni, Mg, Co, Cu, Zn, Ti, Ag, Zr, Nb, or Al;

the second coating layer comprises crystalline phosphate $XPO_4$ in which X is one or more elements selected from Li, Fe, Ni, Mg, Co, Cu, Zn, Ti, Ag, Zr, Nb, or Al; and the third coating layer is carbon; and the conductive undercoat layer comprises a first polymer, a first aqueous binder, and a first conductive agent, wherein the first polymer comprises:

a first monomeric unit represented by formula 1;

a second monomeric unit including at least one selected from the group consisting of a monomeric unit represented by formula 2 and a monomeric unit represented by formula 3;

a third monomeric unit including at least one selected from the group consisting of a monomeric unit represented by formula 4 and a monomeric unit represented by formula 5; and a fourth monomeric unit represented by formula 6, in which $R^1$, $R^2$, and $R^3$ each independently represent H, carboxyl, an ester group, and the following groups which are substituted or unsubstituted: C1-C10 alkyl, C1-C10 alkoxy, C2-C10 alkenyl, and C6-C10 aryl, and $R^4$ represents H and the following groups which are substituted or unsubstituted: C1-C10 alkyl, C1-C10 alkoxy, C2-C10 alkenyl, and C6-C10 aryl;

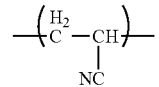

formula 1

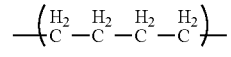

formula 2

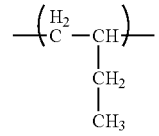

formula 3

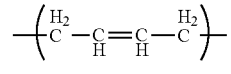

formula 4

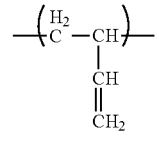

formula 5

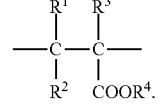

formula 6.

In some embodiments, based on the total mass of the first polymer, the mass percentage content of the first monomeric unit is M1, and M1 is 10-55%, optionally 25-55%; and/or the mass percentage content of the second monomeric unit is M2, and M2 is 40-80%, optionally 50-70%; and/or the mass percentage content of the third monomeric unit is M3, and M3 is 0-10%, optionally 0.001-2%; and/or the mass percentage content of the fourth monomeric unit is M4, and M4 is 0-10%, optionally 0.1-1%.

In some embodiments, M3/(M2+M3) is 0-5%, optionally 0.001-1%.

In some embodiments, the first polymer includes one or more selected from hydrogenated acrylonitrile-butadiene rubber and hydrogenated carboxylated acrylonitrile-butadiene rubber; and/or the weight-average molecular weight of the first polymer is 50,000 to 1,500,000, optionally 200,000 to 400,000.

In some embodiments, the first aqueous binder includes one or more selected from an aqueous polyacrylic resin and derivatives thereof, an aqueous amino-modified polypropylene resin and derivatives thereof, and polyvinyl alcohol and derivatives thereof, and optionally an aqueous acrylic acid-acrylate copolymer; and/or the weight-average molecular weight of the first aqueous binder is 200,000-1,500,000, optionally 300,000-400,000.

In some embodiments, the first conductive agent includes one or more selected from superconducting carbon, conductive graphite, acetylene black, carbon black, Ketjen black, carbon dots, carbon nanotubes, graphene, and carbon nanofibers, and optionally one or more selected from carbon nanotubes, graphene, and carbon nanofibers.

In some embodiments, based on the total mass of the conductive undercoat layer, the mass percentage content of the first polymer is X1, and X1 is 5-20%, optionally 5-10%; and/or the mass percentage content of the first aqueous binder is X2, and X2 is 30-80%, optionally 40-50%; and/or the mass percentage content of the first conductive agent is X3, and X3 is 10-50%, optionally 40-50%.

In some embodiments, the thickness of the conductive undercoat layer is 1-20 μm, optionally 3-10 μm.

In some embodiments, the positive electrode film layer further comprises one or more selected from an infiltration agent and a dispersing agent, and optionally, the positive electrode film layer further comprises both an infiltration agent and a dispersing agent.

In some embodiments, the surface tension of the infiltration agent is 20-40 mN/m, and optionally, the infiltration agent comprises at least one of the following functional groups: —CN, —NH$_2$, —NH—, —N—, —OH, —COO—, and —C(=O)—O—C(=O)—.

In some embodiments, the infiltration agent includes one or more selected from a small molecular organic solvent and a low-molecular-weight polymer, optionally, the small molecular organic solvent includes one or more selected from an alcohol amine compound, an alcohol compound, and a nitrile compound, and optionally, the carbon atom number of the alcohol amine compound is 1-16, optionally 2-6;

optionally, the low-molecular-weight polymer includes one or more selected from a maleic anhydride-styrene copolymer, polyvinyl pyrrolidone, and polysiloxane, and optionally, the weight-average molecular weight of the low-molecular-weight polymer is 6,000 or less, optionally 3,000-6,000.

In some embodiments, the dispersing agent comprises a second polymer, and the second polymer comprises:

a fifth monomeric unit represented by formula 7;

a sixth monomeric unit including at least one selected from the group consisting of a monomeric unit represented by formula 8 and a monomeric unit represented by formula 9; and a seventh monomeric unit including at least one selected from the group consisting of a monomeric unit represented by formula 10 and a monomeric unit represented by formula 11;

formula 7
$$-\!\!\left(\!\!\begin{array}{c}H_2\\C\end{array}\!\!-\!CH\!\!\right)\!\!-$$
$$\quad\quad\quad\quad|$$
$$\quad\quad\quad NC$$

formula 8
$$-\!\!\left(\!\!\begin{array}{cccc}H_2 & H_2 & H_2 & H_2\\C & -C & -C & -C\end{array}\!\!\right)\!\!-$$

formula 9
$$-\!\!\left(\!\!\begin{array}{c}H_2\\C\end{array}\!\!-\!CH\!\!\right)\!\!-$$
$$\quad\quad\quad\quad|$$
$$\quad\quad\quad CH_2$$
$$\quad\quad\quad\quad|$$
$$\quad\quad\quad CH_3$$

formula 10
$$-\!\!\left(\!\!\begin{array}{cccc}H_2 & & & H_2\\C & -C=C & -C\\ & H & H\end{array}\!\!\right)\!\!-$$

formula 11
$$-\!\!\left(\!\!\begin{array}{c}H_2\\C\end{array}\!\!-\!CH\!\!\right)\!\!-\cdot$$
$$\quad\quad\quad\quad|$$
$$\quad\quad\quad CH$$
$$\quad\quad\quad\|$$
$$\quad\quad\quad CH_2$$

In some embodiments, based on the total mass of the second polymer, the mass percentage content of the fifth monomeric unit is M5, and M5 is 10-55%, optionally 25-55%; and/or the mass percentage content of the sixth monomeric unit is M6, and M6 is 40-80%, optionally 50-70%; and/or the mass percentage content of the seventh monomeric unit is M7, and M7 is 0-10%, optionally 0.001-2%.

In some embodiments, M7/(M6+M7) is 0-5%, optionally 0.001-1%.

In some embodiments, the second polymer is hydrogenated acrylonitrile-butadiene rubber; and/or the weight-average molecular weight of the second polymer is 50,000 to 500,000, optionally 150,000 to 350,000.

In some embodiments, based on the total mass of the positive electrode film layer, the mass percentage content of the dispersing agent is Y1, and Y1 is 0.05-1%, optionally 0.1-0.5%; and/or the mass percentage content of the infiltration agent is Y2, and Y2 is 0.05-2%, optionally 0.2-0.8%.

In some embodiments, Y1/Y2 is 0.05-20, optionally 0.1-1, further 0.3-0.8.

In some embodiments, in the positive electrode plate, the mass ratio of the first polymer to the second polymer is 1.5-5, optionally 2-3.

In some embodiments, the crystalline pyrophosphate in the first coating layer has an interplanar spacing range of 0.293-0.470 nm and an included angle range of 18.00°-32.00° for the crystal orientation (111); and the crystalline phosphate in the second coating layer has an interplanar spacing range of 0.244-0.425 nm and an included angle range of 20.00°-37.00° for the crystal orientation (111).

In some embodiments, in the inner core, the ratio of y to 1-y is 1:10 to 1:1, optionally 1:4 to 1:1; and/or
in the inner core, the ratio of z to 1-z is 1:9 to 1:999, optionally 1:499 to 1:249.

In some embodiments, the carbon in the third coating layer is a mixture of SP2-form carbon and SP3-form carbon, and optionally, the molar ratio of the SP2-form carbon to the SP3-form carbon is any value within a range of 0.1 to 10, optionally any value within a range of 2.0 to 3.0.

In some embodiments, the coating amount of the first coating layer is greater than 0 and less than or equal to 6 wt %, optionally greater than 0 and less than or equal to 5.5 wt %, more optionally greater than 0 and less than or equal to 2 wt %, based on the weight of the inner core; and/or
the coating amount of the second coating layer is greater than 0 and less than or equal to 6 wt %, optionally greater than 0 and less than or equal to 5.5 wt %, more optionally 2-4 wt %, based on the weight of the inner core; and/or
the coating amount of the third coating layer is greater than 0 and less than or equal to 6 wt %, optionally greater than 0 and less than or equal to 5.5 wt %, more optionally greater than 0 and less than or equal to 2 wt %, based on the weight of the inner core.

In some embodiments, the thickness of the first coating layer is 1-10 nm; and/or
the thickness of the second coating layer is 2-15 nm; and/or
the thickness of the third coating layer is 2-25 nm.

In some embodiments, based on the weight of the positive electrode active material, the content of the element manganese is in a range of 10-35 wt %, optionally in a range of 15-30 wt %, more optionally in a range of 17-20 wt %, the content of the element phosphorus is in a range of 12-25 wt %, optionally in a range of 15-20 wt %, and the weight ratio of the element manganese to the element phosphorus is in a range of 0.90-1.25, optionally 0.95-1.20.

In some embodiments, the positive electrode active material with a core-shell structure has a lattice change rate of 4% or less, optionally 3.8% or less, more optionally 2.0-3.8%, before and after complete lithium de-intercalation.

In some embodiments, the positive electrode active material with a core-shell structure has an Li/Mn antisite defect concentration of 4% or less, optionally 2.2% or less, more optionally 1.5-2.2%.

In some embodiments, the positive electrode active material with a core-shell structure has a compacted density under 3 T of 2.2 g/cm$^3$ or more, optionally 2.2 g/cm$^3$ or more and 2.8 g/cm$^3$ or less.

In some embodiments, the positive electrode active material with a core-shell structure has a surface oxygen valence state of −1.90 or less, optionally −1.90 to −1.98.

In some embodiments, the specific surface area of the positive electrode active material is 15-25 m$^2$/g, and the coating weight on one side of the positive electrode current collector is 20-40 mg/cm$^2$. When the specific surface area of the positive electrode active material is 15-25 m$^2$/g and the coating weight on one side of the positive electrode current collector is 20-40 mg/cm$^2$, a demolding phenomenon easily occurs during the coating process. In the present application, the use of the novel conductive undercoat layer increases the bonding strength between the positive electrode active material layer and the current collector.

In a second aspect, the present application provides a secondary battery comprising the positive electrode plate described in any one of the above.

In a third aspect, the present application provides a power consuming device comprising the above-mentioned secondary battery.

With regard to the novel positive electrode active material doped with lithium manganese phosphate and having a core-shell structure The present application provides a novel positive electrode active material doped with lithium manganese phosphate and having a core-shell structure, whereby a secondary battery in which this positive electrode active material is applied has a higher gram capacity, a good cycling performance and safety performance.

In order to achieve the above object, the present application provides a positive electrode active material having a core-shell structure, with the positive electrode active material comprising an inner core and a shell coating the inner core, wherein
the inner core has a chemical formula of $Li_{1+x}Mn_{1-y}A_yP_{1-z}R_zO_4$ in which x is any value in a range of −0.100 to 0.100, y is any value in a range of 0.001 to 0.500, z is any value in a range of 0.001 to 0.100, A is one or more elements selected from Zn, Al, Na, K, Mg, Mo, W, Ti, V, Zr, Fe, Ni, Co, Ga, Sn, Sb, Nb, and Ge, optionally one or more elements of Fe, Ti, V, Ni, Co, and Mg, R is one or more elements selected from B, Si, N, and S, and optionally, R is an element selected from B, Si, N, and S,
with the values of x, y, and z satisfying the following condition: keeping the entire inner core electrically neutral;
the shell comprises a first coating layer coating the inner core, a second coating layer coating the first coating layer, and a third coating layer coating the second coating layer, wherein
the first coating layer comprises crystalline pyrophosphate $Li_aMP_2O_7$ and/or $M_b(P_2O_7)_c$ in which
$0 \leq a \leq 2$, $1 \leq b \leq 4$, and $1 \leq c \leq 6$, with the values of a, b, and c satisfying the following condition: keeping the crystalline pyrophosphate $Li_aMP_2O_7$ or $M_b(P_2O_7)_c$ electrically neutral;
M in each of the crystalline pyrophosphates $Li_aMP_2O_7$ and $M_b(P_2O_7)_c$ is independently one or more elements selected from Fe, Ni, Mg, Co, Cu, Zn, Ti, Ag, Zr, Nb, or Al;
the second coating layer comprises crystalline phosphate $XPO_4$ in which X is one or more elements selected from Li, Fe, Ni, Mg, Co, Cu, Zn, Ti, Ag, Zr, Nb, or Al; and
the third coating layer is carbon.

Herein, the crystalline state means that the crystallinity is 50% or more, i.e., 50-100%. A crystalline state with a crystallinity less than 50% is referred to as a glassy state. The crystallinity of the crystalline pyrophosphate and crystalline phosphate of the present application is 50% to 100%. The pyrophosphate and phosphate with a certain crystallinity can not only give full play to the ability of the pyrophosphate coating layer to prevent the dissolution of manganese and the excellent ability of the phosphate coating layer to conduct lithium ions, as well as the reduction of the interfacial side reaction, but can also enable better lattice matching between the pyrophosphate coating layer and the phosphate coating layer, such that tight bonding between the coating layer and the coating layer can be achieved.

The present application, by doping element A at the manganese site of lithium manganese phosphate and doping element R at the phosphorus site to obtain a doped lithium manganese phosphate inner core and sequentially coating the surface of the inner core with three layers, provides a novel lithium manganese phosphate positive electrode active material with a core-shell structure, and the application of the positive electrode active material to a secondary battery can significantly improve the high-temperature cycling performance, cycling stability and high-temperature storage performance of the secondary battery.

In any embodiment, the crystalline pyrophosphate in the first coating layer has an interplanar spacing range of 0.293-0.470 nm and an included angle range of 18.00°-32.00° for the crystal orientation (111); and the crystalline phosphate in the second coating layer has an interplanar spacing range of 0.244-0.425 nm and an included angle range of 20.00°-37.00° for the crystal orientation (111).

Both the first coating layer and the second coating layer in the positive electrode active material of the present application are crystalline substances, and the interplanar spacing and included angle ranges thereof are within the above ranges. Thus, an impurity phase in the coating layer can be effectively avoided, thereby improving the gram capacity, cycling performance and rate performance of the material.

In any embodiment, in the inner core, the ratio of y to 1-y is 1:10 to 1:1, optionally 1:4 to 1:1. Thus, the cycling performance and rate performance of the secondary battery are further improved.

In any embodiment, in the inner core, the ratio of z to 1-z is 1:999 to 1:9, optionally 1:499 to 1:249. Thus, the cycling performance and rate performance of the secondary battery are further improved.

In any embodiment, the carbon in the third coating layer is a mixture of SP2-form carbon and SP3-form carbon, and optionally, the molar ratio of the SP2-form carbon to the SP3-form carbon is any value within a range of 0.1 to 10, optionally any value within a range of 2.0 to 3.0.

In the present application, the overall performance of the secondary battery is improved by limiting the molar ratio of the SP2-form carbon to the SP3-form carbon within the above range.

In any embodiment, the coating amount of the first coating layer is greater than 0 and less than or equal to 6 wt %, optionally greater than 0 and less than or equal to 5.5 wt %, more optionally greater than 0 and less than or equal to 2 wt %, based on the weight of the inner core; and/or the coating amount of the second coating layer is greater than 0 and less than or equal to 6 wt %, optionally greater than 0 and less than or equal to 5.5 wt %, more optionally 2-4 wt %, based on the weight of the inner core; and/or the coating amount of the third coating layer is greater than 0 and less than or equal to 6 wt %, optionally greater than 0 and less than or equal to 5.5 wt %, more optionally greater than 0 and less than or equal to 2 wt %, based on the weight of the inner core.

In the positive electrode active material with a core-shell structure of the present application, the coating amounts of the three coating layers in the present application are within the above ranges, thus enabling the inner core to be fully coated, while further improving the kinetic performance and safety performance of the secondary battery without sacrificing the gram capacity of the positive electrode active material.

In any embodiment, the thickness of the first coating layer is 1-10 nm; and/or the thickness of the second coating layer is 2-15 nm; and/or the thickness of the third coating layer is 2-25 nm.

In the present application, when the thickness of the first coating layer is in the range of 1-10 nm, adverse effects on the dynamic performance of the material that may occur when it is too thick can be avoided, and the problem that the migration of transition metal ions cannot be effectively hindered when it is too thin can be avoided.

When the thickness of the second coating layer is in the range of 2-15 nm, the surface structure of the second coating layer is stable, and the side reaction with the electrolyte solution is small, so that the interfacial side reaction can be effectively reduced, thereby improving the high-temperature performance of the secondary battery.

When the thickness of the third coating layer is in the range of 2-20 nm, the electrical conductivity of the material can be improved and the compacted density performance of the battery electrode plate prepared by using the positive electrode active material can be improved.

In any embodiment, based on the weight of the positive electrode active material with a core-shell structure, the content of the element manganese is in a range of 10-35 wt %, optionally in a range of 15-30 wt %, more optionally in a range of 17-20 wt %, the content of the element phosphorus is in a range of 12-25 wt %, optionally in a range of 15-20 wt %, and the weight ratio of the element manganese to the element phosphorus is in a range of 0.90-1.25, optionally 0.95-1.20.

In the positive electrode active material having a core-shell structure of the present application, the content of the element manganese is within the above range, which can effectively avoid problems such as poor structural stability and density reduction that may be caused if the content of the element manganese is too large, thereby improving the performance of the secondary battery, such as cycling, storage and compacted density; and problems such as a low voltage platform that may be caused when the content of the element manganese is too small can be avoided, thereby improving the energy density of the secondary battery.

In the positive electrode active material having a core-shell structure of the present application, the content of the element phosphorus is within the above range, which can effectively avoid the following situations: if the content of the element phosphorus is too large, the covalency of P—O may be too strong to affect the conductivity of small polaron, thereby affecting the electrical conductivity of the material; and if the content of the element phosphorus is too small, the stability of the inner core and the lattice structure of the pyrophosphate in the first coating layer and/or the phosphate in the second coating layer may decrease, thereby affecting the overall stability of the material.

In the positive electrode active material having a core-shell structure of the present application, the weight ratio of the element manganese to the element phosphorus is within the above range, which can effectively avoid the following situations: if the weight ratio is too large, the transition metal dissolution may increase, which affects the stability of the material and the cycling and storage performance of the secondary battery; and if the weight ratio is too small, the discharge voltage plateau of the material may decrease, thereby reducing the energy density of the secondary battery.

In any embodiment, the positive electrode active material with a core-shell structure has a lattice change rate of 4% or less, optionally 3.8% or less, more optionally 2.0-3.8%, before and after complete lithium de-intercalation.

The positive electrode active material having a core-shell structure of the present application can achieve a lattice change rate of 4% or less before and after lithium de-intercalation. Therefore, the use of the positive electrode active material can improve the gram capacity and rate performance of the secondary battery.

In any embodiment, the positive electrode active material with a core-shell structure has an Li/Mn antisite defect concentration of 4% or less, optionally 2.2% or less, more optionally 1.5-2.2%. The Li/Mn antisite defect concentration within the above range can avoid the prevention of transport of $Li^+$ by $Mn^{2+}$, while increasing the gram capacity and rate performance of the positive electrode active material.

In any embodiment, the positive electrode active material with a core-shell structure has a compacted density under 3 T (tons) of 2.2 g/cm³ or more, optionally 2.2 g/cm³ or more and 2.8 g/cm³ or less. Thus, the increased compacted density increases the weight of the active material per unit volume, which is more conducive to increasing the volumetric energy density of the secondary battery.

In any embodiment, the positive electrode active material with a core-shell structure has a surface oxygen valence state of −1.90 or less, optionally −1.90 to −1.98. Therefore, by limiting the surface oxygen valence state of the positive electrode active material within the above range, as described above, the interfacial side reaction between the positive electrode material and the electrolyte solution can be reduced, thereby improving the performance, such as cycling, high-temperature storage and gas production, of the battery cell.

In a second aspect, the present application provides a method for preparing a positive electrode active material, the method comprising the following steps:

a step of providing an inner core material, wherein the inner core has a chemical formula of $Li_{1+x}Mn_{1-y}A_yP_{1-z}R_zO_4$ in which x is any value in a range of −0.100 to 0.100, y is any value in a range of 0.001 to 0.500, z is any value in a range of 0.001 to 0.100, A is one or more elements selected from Zn, Al, Na, K, Mg, Mo, W, Ti, V, Zr, Fe, Ni, Co, Ga, Sn, Sb, Nb, and Ge, optionally one or more elements of Fe, Ti, V, Ni, Co, and Mg, R is one or more elements selected from B, Si, N, and S, and optionally, R is an element selected from B, Si, N, and S;

a coating step, involving respectively providing $Li_aMP_2O_7$ and/or $M_b(P_2O_7)_c$ and $XPO_4$ turbid suspensions, adding the inner core material to the above turbid suspensions, and mixing and sintering same to obtain a positive electrode active material in which 0≤a≤2, 1≤b≤4, and 1≤c≤6, with the values of a, b, and c satisfying the following condition: keeping the crystalline pyrophosphate $Li_aMP_2O_7$ or $M_b(P_2O_7)_c$ electrically neutral; each M is independently one or more elements selected from Fe, Ni, Mg, Co, Cu, Zn, Ti, Ag, Zr, Nb, or Al; and X is one or more elements selected from Li, Fe, Ni, Mg, Co, Cu, Zn, Ti, Ag, Zr, Nb, or Al, wherein the positive electrode active material has a core-shell structure comprising an inner core and a shell coating the inner core, with the shell comprising a first coating layer coating the inner core, a second coating layer coating the first coating layer, and a third coating layer coating the second coating layer, wherein the first coating layer comprises crystalline pyrophosphate $Li_aMP_2O_7$ and/or $M_b(P_2O_7)_c$, the second coating layer comprises crystalline phosphate $XPO_4$, and the third coating layer is carbon.

In any embodiment, the step of providing the inner core material comprises the following steps:

step (1): mixing and stirring a manganese source, an element A dopant, and an acid in a container to obtain manganese salt particles doped with element A; and step (2): mixing the manganese salt particles doped with element A with a lithium source, a phosphorus source, and an element R dopant in a solvent to obtain a slurry, and sintering the slurry under inert gas atmosphere protection to obtain an inner core doped with element A and element R, wherein the inner core doped with element A and element R is $Li_{1+x}Mn_{1-y}A_yP_{1-z}R_zO_4$ in which x is any value in a range of −0.100-0.100, y is any value in a range of 0.001-0.500, z is any value in a range of 0.001-0.100, A is one or more elements selected from Zn, Al, Na, K, Mg, Mo, W, Ti, V, Zr, Fe, Ni, Co, Ga, Sn, Sb, Nb, and Ge, optionally one or more elements of Fe, Ti, V, Ni, Co, and Mg, R is one or more elements selected from B, Si, N, and S, and optionally, R is an element selected from B, Si, N, and S.

In any embodiment, the element A dopant is one or more of the respective elementary substances, carbonates, sulfates, chlorides, nitrates, organic acid salts, oxides, and hydroxides of one or more elements selected from Zn, Al, Na, K, Mg, Mo, W, Ti, V, Zr, Fe, Ni, Co, Ga, Sn, Sb, Nb, and Ge.

In any embodiment, the element R dopant is one or more of the respective inorganic acids, -ous acids, organic acids, sulfates, chlorides, nitrates, organic acid salts, oxides, and hydroxides of one or more elements selected from B, Si, N, and S.

In any embodiment, in step (1), the mixing is carried out at a temperature of 20-120° C., optionally 40-120° C.; and/or in step (1), the stirring is carried out at 400-700 rpm for 1-9 h, optionally for 3-7 h.

When the heating temperature and stirring time during the preparation of the inner core particles are within the above ranges, the prepared inner core and the positive electrode active material prepared therefrom have fewer lattice defects, which is beneficial to inhibiting manganese dissolution and reducing the interfacial side reaction between the positive electrode active material and the electrolyte solution, thereby improving the cycling performance and safety performance of the secondary battery.

In any embodiment, in step (2), the mixing is carried out at a temperature of 20-120° C., optionally 40-120° C., for 1-12 h.

In any embodiment, the coating step comprises:

a first coating step, involving: dissolving an element M source, a phosphorus source, an acid, and optionally a lithium source to obtain a first coating layer turbid suspension; and fully mixing the inner core obtained in the inner core step with the first coating layer turbid suspension obtained in the first coating step, and drying and then sintering the mixture to obtain a first-coating-layer-coated material;

a second coating step, involving: dissolving an element X source, a phosphorus source, and an acid in a solvent to obtain a second coating layer turbid suspension; and fully mixing the first-coating-layer-coated material obtained in the first coating step with the second coating layer turbid suspension obtained in the second coating step, and drying and then sintering the mixture to obtain a two-coating-layer-coated material; and a third coating step, involving: dissolving the carbon source in a solvent, and after the carbon source is fully dissolved, a third coating layer solution is obtained; and then adding the two-coating-layer-coated material obtained in the second coating step to the third coating layer solution, mixing the mixture until uniform, and drying and then sintering the mixture to obtain a three-coating-layer-coated material, i.e., the positive electrode active material.

In any embodiment, the element M source is one or more of the respective elementary substances, carbonates, sulfates, chlorides, nitrates, organic acid salts, oxides, and hydroxides of one or more elements selected from Fe, Ni, Mg, Co, Cu, Zn, Ti, Ag, Zr, Nb, or Al.

In any embodiment, the element X source is one or more of the respective elementary substances, carbonates, sulfates, chlorides, nitrates, organic acid salts, oxides, and hydroxides of one or more elements selected from Li, Fe, Ni, Mg, Co, Cu, Zn, Ti, Ag, Zr, Nb, or Al.

In the present application, the added amounts of the respective sources of elements A, R, M, and X depend on the target doping amount, and the ratio between the amounts of the lithium source, the manganese source, and the phosphorus source conforms to a stoichiometric ratio.

In any embodiment, in the first coating step, the pH of the solution in which the element M source, the phosphorus source, the acid, and optionally the lithium source are dissolved is controlled to be 3.5-6.5, the solution is then stirred and reacted for 1-5 h, and the solution is then heated to 50-120° C. and maintained at this temperature for 2-10 h and/or sintered at 650-800° C. for 2-6 hours.

By controlling the conditions of the first coating step within the above ranges, the gram capacity, cycling and high-temperature storage performance, gram capacity and rate performance, etc., of the secondary battery prepared with the positive electrode active material can be guaranteed or even improved.

In any embodiment, the second coating step, an element X source, a phosphorus source, and an acid are dissolved in a solvent, the solution is then stirred and reacted for 1-10 h, and the solution is then heated to 60-150° C. and maintained at this temperature for 2-10 h and/or sintered at 500-700° C. for 6-10 hours.

In the step of providing the inner core material, the first coating step, and the second coating step, before sintering, i.e., during the preparation of the inner core material with chemical reactions (steps (1)-(2)) and during the preparation of the first coating layer suspension and the second coating layer suspension, the following situations can be avoided by selecting the selected reaction temperature and reaction time as described above: when the reaction temperature is too low, no reaction can occur or the reaction rate is relatively slow; when the temperature is too high, the product decomposes or forms an impurity phase; when the reaction time is too long, the particle size of the product becomes larger, which may increase the time and difficulty of the subsequent process; and when the reaction time is too short, the reaction is incomplete and less product is obtained.

In any embodiment, the sintering in the third coating step is carried out at 700-800° C. for 6-10 hours.

By controlling the conditions of the first coating step within the above ranges, the gram capacity and compacted density of the secondary battery prepared with the positive electrode active material can be guaranteed or even improved.

The preparation method for the positive electrode active material of the present application has a wide range of raw material sources, low costs, and a simple process, facilitating industrialization.

A positive electrode plate provided by any solution of the present application comprises a positive electrode current collector and a positive electrode film layer arranged on at least one surface of the positive electrode current collector, wherein the positive electrode film layer comprises the positive electrode active material having a core-shell structure described in the first aspect of the present application or a positive electrode active material prepared by the method described in any solution of the present application, and the content of the positive electrode active material in the positive electrode film layer is 90-99.5 wt %, in some embodiments 95-99.5 wt %, based on the total weight of the positive electrode film layer.

The use of the positive electrode plate of any solution of the present application in a battery improves the high-temperature cycling performance, rate performance and safety performance of the secondary battery.

The positive electrode plate, secondary battery, battery module, battery pack, and power consuming device in any solution of the present application comprise the positive electrode active material described in the present application and thus have a higher gram capacity, a good cycling performance and safety performance.

Beneficial Effects

One or more embodiments of the present application have one or more of the following beneficial effects:

(1) By doping lithium manganese phosphate with element A at the manganese site and with element R at the phosphorus site to obtain a doped lithium manganese phosphate inner core and sequentially coating the surface of the inner core with three layers, the present application provides a novel doped positive electrode active material with a core-shell structure, and the application of the positive electrode active material to a secondary battery can significantly improve the high-temperature cycling performance, cycling stability and high-temperature storage performance of the secondary battery.

(2) When the BET specific surface area of the positive electrode active material is larger and there are more small particles, a weaker bonding strength between the positive electrode active material and the current collector (aluminum foil) and a film demolding phenomenon occurring during coating are easily caused. In the present application, the use of the novel conductive undercoat layer increases the bonding strength between the positive electrode active material layer and the current collector.

(3) During the process of coating the surface of the conductive undercoat layer with a positive electrode active material slurry (containing the solvent N-methylpyrrolidone, abbreviated as NMP), the first polymer in the conductive undercoat layer will dissolve again after coming into contact with the solvent NMP, leading to mutual diffusion with the positive electrode active material slurry, and after curing, the active material layer can be integrated with the undercoat, thus effectively increasing the bonding strength between the positive electrode film layer and the positive electrode current collector.

(4) When the acrylic acid-acrylate copolymer (weight-average molecular weight: 200,000-1,500,000) is used as the first aqueous binder in the conductive undercoat layer, the relatively strong polarity of the binder can achieve good adhesion to the current collector (aluminum foil). In addition, the acrylic acid-acrylate copolymer has good stability in the electrolyte solution, high temperature resistance, corrosion resistance, and low electrolyte solution absorption efficiency (low swelling degree).

(5) When the conductive agent in the conductive undercoat layer is selected from one or two of carbon black, acetylene black, carbon fibers, graphite, and carbon nanotubes, the interfacial resistance can be reduced, the charge and discharge rate performance of the battery can be improved, and the cycle life of the battery can be prolonged.

LIST OF REFERENCE SIGNS

Figure 1:
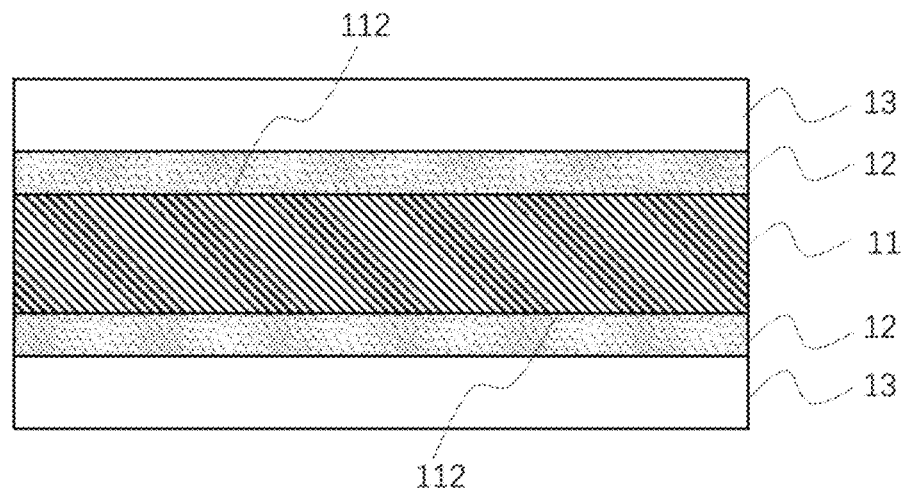
FIG. 1 is a schematic diagram of a positive electrode plate according to an embodiment of the present application.

1 battery pack; 2 upper case body; 3 lower case body; 4 battery module; 5 secondary battery; 51 housing; 52 electrode assembly; 53 top cover assembly; 11 positive electrode current collector; 112 surface; 12 conductive undercoat layer; 13 positive electrode film layer; 510 steel plate; 520 double-sided adhesive tape; and 530 electrode plate.

DETAILED DESCRIPTION OF EMBODIMENTS

Hereinafter, embodiments of the positive electrode active material and the preparation method therefor, the positive electrode plate, the negative electrode plate, the secondary battery, the battery module, the battery pack, and the device of the present application are illustrated in detail and specifically disclosed with reference to the accompanying drawings as appropriate. However, unnecessary detailed illustrations may be omitted in some instances. For example, there are situations where detailed description of well known items and repeated description of actually identical structures are omitted. This is to prevent the following description from being unnecessarily verbose, and facilitates understanding by those skilled in the art. Moreover, the accompanying drawings and the descriptions below are provided for enabling those skilled in the art to fully understand the present application, rather than limiting the subject matter disclosed in claims.

The "ranges" disclosed in the present application are defined in the form of lower and upper limits, and a given range is defined by selection of a lower limit and an upper limit, the selected lower and upper limits defining the boundaries of the particular range. The ranges defined in this manner may be inclusive or exclusive, and may be arbitrarily combined, that is, any lower limit may be combined with any upper limit to form a range. For example, if the ranges of 60-120 and 80-110 are listed for a particular parameter, it should be understood that the ranges of 60-110 and 80-120 are also contemplated. Additionally, if the minimum range values 1 and 2 and the maximum range values 3, 4, and 5 are listed, the following ranges are all contemplated: 1-3, 1-4, 1-5, 2-3, 2-4, and 2-5. In the present application, unless stated otherwise, the numerical range "a-b" denotes an abbreviated representation of any combination of real numbers between a and b, where both a and b are real numbers. For example, the numerical range "0-5" means that all real numbers between "0-5" have been listed herein, and "0-5" is just an abbreviated representation of combinations of these numerical values. In addition, when a parameter is expressed as an integer≥2, it is equivalent to disclosing that the parameter is, for example, an integer of 2, 3, 4, 5, 6, 7, 8, 9, 10, 11, 12, etc.

All the embodiments and optional embodiments of the present application can be combined with one another to form new technical solutions, unless otherwise stated.

All the technical features and optional technical features of the present application can be combined with one another to form a new technical solution, unless otherwise stated.

Unless otherwise stated, all the steps of the present application can be carried out sequentially or randomly, in some embodiments sequentially. For example, a method comprising steps (a) and (b) indicates that the method may comprise steps (a) and (b) that are performed in this order, or may also comprise steps (b) and (a) that are performed in this order. For example, reference to the expression "the method may further comprise step (c)" indicates that step (c) may be added to the method in any order, e.g., the method may comprise steps (a), (b) and (c), or steps (a), (c) and (b), or steps (c), (a) and (b), etc.

The terms "comprise" and "include" mentioned in the present application are open-ended, unless otherwise stated. For example, "comprise" and "include" may mean that other components not listed may or may not be further comprised or included.

In the present application, the term "or" is inclusive, unless otherwise stated. For example, the phrase "A or B" means "A, B, or both A and B". More specifically, condition "A or B" is satisfied by any one of the following: A is true (or present) and B is false (or not present); A is false (or not present) and B is true (or present); or both A and B are true (or present). In this disclosure, the phrases "at least one of A, B, and C" and "at least one of A, B, or C" both mean only A, only B, only C, or any combination of A, B, and C.

[Secondary Battery]

A secondary battery, also known as a rechargeable battery or an accumulator, refers to a battery in which an active material can be activated by means of charging for reuse after the battery is discharged.

Generally, the secondary battery comprises a positive electrode plate, a negative electrode plate, a separator, and an electrolyte solution. During the charge/discharge process of the battery, active ions (e.g., lithium ions) are intercalated and de-intercalated back and forth between the positive electrode plate and the negative electrode plate. The separator is arranged between the positive electrode plate and the negative electrode plate, and mainly plays a role of preventing the positive and negative electrodes from short-circuiting while enabling the active ions to pass through. The electrolyte solution is arranged between the positive electrode plate and the negative electrode plate and mainly plays a role of active ion conduction.

[Positive Electrode Plate]

In some embodiments, the present application provides a positive electrode plate, comprising a positive electrode current collector, a positive electrode film layer arranged on at least one surface of the positive electrode current collector, and a conductive undercoat layer positioned between the positive electrode current collector and the positive electrode film layer, wherein the positive electrode film layer comprises a positive electrode active material having a core-shell structure, with the positive electrode active material comprising an inner core and a shell coating the inner core, wherein the inner core has a chemical formula of $Li_{1+x}Mn_{1-y}A_yP_{1-z}R_zO_4$ in which x is any value in a range of −0.100 to 0.100, y is any value in a range of 0.001 to 0.500, z is any value in a range of 0.001 to 0.100, A is one or more elements selected from Zn, Al, Na, K, Mg, Mo, W, Ti, V, Zr, Fe, Ni, Co, Ga, Sn, Sb, Nb, and Ge, optionally one or more elements of Fe, Ti, V, Ni, Co, and Mg, R is one or more elements selected from B, Si, N, and S, and optionally, R is an element selected from B, Si, N, and S, with the values of x, y, and z satisfying the following condition: keeping the entire inner core electrically neutral;

the shell comprises a first coating layer coating the inner core, a second coating layer coating the first coating layer, and a third coating layer coating the second coating layer, wherein the first coating layer comprises crystalline pyrophosphate $Li_aMP_2O_7$ and/or $M_b(P_2O_7)_c$ in which $0 \leq a \leq 2$, $1 \leq b \leq 4$, and $1 \leq c \leq 6$, with the values of a, b, and c satisfying the following condition: keeping the crystalline pyrophosphate $Li_aMP_2O_7$ or $M_b(P_2O_7)_c$ electrically neutral; and M in each of the crystalline pyrophosphates $Li_aMP_2O_7$ and $M_b(P_2O_7)_c$ is independently one or more elements selected from Fe, Ni, Mg, Co, Cu, Zn, Ti, Ag, Zr, Nb, or Al;

the second coating layer comprises crystalline phosphate $XPO_4$ in which X is one or more elements selected from Li, Fe, Ni, Mg, Co, Cu, Zn, Ti, Ag, Zr, Nb, or Al; and the third coating layer is carbon; and the conductive undercoat layer comprises a first polymer, a first aqueous binder, and a first conductive agent, wherein the first polymer comprises:

a first monomeric unit represented by formula 1;

a second monomeric unit including at least one selected from the group consisting of a monomeric unit represented by formula 2 and a monomeric unit represented by formula 3;

a third monomeric unit including at least one selected from the group consisting of a monomeric unit represented by formula 4 and a monomeric unit represented by formula 5; and a fourth monomeric unit represented by formula 6, in which $R^1$, $R^2$, and $R^3$ each independently represent H, carboxyl, an ester group, and the following groups which are substituted or unsubstituted: C1-C10 alkyl, C1-C10 alkoxy, C2-C10 alkenyl, and C6-C10 aryl, and $R^4$ represents H and the following groups which are substituted or un substituted: C1-C10 alkyl, C1-C10 alkoxy, C2-C10 alkenyl, and C6-C10 aryl;

formula 1

$$-\left(\begin{array}{c}H_2\\C\\|\\NC\end{array}-CH\right)-$$

formula 2

$$-\left(\begin{array}{cccc}H_2&H_2&H_2&H_2\\C&-C&-C&-C\end{array}\right)-$$

formula 3

$$-\left(\begin{array}{c}H_2\\C-CH\\|\\CH_2\\|\\CH_3\end{array}\right)-$$

formula 4

$$-\left(\begin{array}{ccc}H_2&&H_2\\C-C=C-C\\&H&H\end{array}\right)-$$

formula 5

$$-\left(\begin{array}{c}H_2\\C-CH\\|\\CH\\||\\CH_2\end{array}\right)-$$

formula 6

$$-\begin{array}{c}R^1\\|\\-C-\\|\\R^2\end{array}\begin{array}{c}R^3\\|\\C-\\|\\COOR^4\end{array}.$$

In the positive electrode plate based on the above solution, the bonding strength between the positive electrode film layer and the positive electrode current collector is enhanced. Without being bound by theory, during the process of coating the surface of the conductive undercoat layer with a positive electrode active material slurry (containing the solvent N-methylpyrrolidone, abbreviated as NMP), the first polymer in the conductive undercoat layer will dissolve again after coming into contact with the solvent NMP, leading to mutual diffusion with the positive electrode active material slurry, and after curing, the active material layer can be integrated with the undercoat, thus effectively increasing the bonding strength between the positive electrode film layer and the positive electrode current collector.

In some embodiments, the first polymer is a random copolymer.

Acrylonitrile-butadiene rubber (NBR) is a random copolymer formed by the polymerization (e.g., emulsion polymerization) of acrylonitrile and butadiene monomers, and has a general structural formula of:

$$-(H_2C-HC=CH-CH_2)_{\overline{m}}-(H_2C-CH)_{\overline{m}}-$$
$$\phantom{-(H_2C-HC=CH-CH_2)_{\overline{m}}-(H_2C-}|$$
$$\phantom{-(H_2C-HC=CH-CH_2)_{\overline{m}}-(H_2C-}C$$
$$\phantom{-(H_2C-HC=CH-CH_2)_{\overline{m}}-(H_2C-}|||$$
$$\phantom{-(H_2C-HC=CH-CH_2)_{\overline{m}}-(H_2C-}N$$

In acrylonitrile-butadiene rubber, the connection modes for the linkage of butadiene (B) and acrylonitrile (A) are generally the triads BAB, BBA or ABB, ABA and BBB. However, with the increase of the acrylonitrile content, the connection as the pentad AABAA is also possible, or even a bulk polymer of acrylonitrile is formed. In acrylonitrile-butadiene rubber, the sequence distribution of butadiene is mainly trans-1,4 structure, and the microstructure thereof is related to polymerization conditions.

Hydrogenated acrylonitrile-butadiene rubber (HNBR) refers to a product obtained by the hydrogenation of carbon-carbon double bonds in the molecular chain of acrylonitrile-butadiene rubber to partial or full saturation. The fully saturated hydrogenated acrylonitrile-butadiene rubber has a chemical formula of $$-(CH_2-CH)_{\overline{a}}(CH_2-CH_2-CH_2-CH_2)_{\overline{b}}(CH_2-CH)_{\overline{c}}-$$
$$\phantom{-(CH_2-}|\phantom{)_{\overline{a}}(CH_2-CH_2-CH_2-CH_2)_{\overline{b}}(CH_2-}|$$
$$\phantom{-(CH_2-}C\phantom{)_{\overline{a}}(CH_2-CH_2-CH_2-CH_2)_{\overline{b}}(CH_2-}CH_2$$
$$\phantom{-(CH_2-}|||\phantom{)_{\overline{a}}(CH_2-CH_2-CH_2-CH_2)_{\overline{b}}(CH_2-}|$$
$$\phantom{-(CH_2-}N\phantom{)_{\overline{a}}(CH_2-CH_2-CH_2-CH_2)_{\overline{b}}(CH_2-}CH_3$$

There are three main preparation methods for hydrogenated acrylonitrile-butadiene rubber (HNBR): ethylene-acrylonitrile copolymerization, NBR solution hydrogenation, and NBR emulsion hydrogenation.

Hydrogenated carboxyl acrylonitrile-butadiene rubber (HXNBR) is a polymer prepared by the copolymerization of a nitrile (e.g., acrylonitrile), a conjugated diene (e.g., butadiene), and an ester of an unsaturated carboxylic acid to form a polymer and then selective hydrogenation of C=C.

The so-called hydrogenated carboxyl acrylonitrile-butadiene rubber is based on hydrogenated acrylonitrile-butadiene rubber, to which a carboxyl group is further introduced.

The ester of the unsaturated carboxylic acid is, for example, an ester of an α,β-unsaturated monocarboxylic acid. Esters of α,β-unsaturated monocarboxylic acids that can be used are alkyl esters and alkoxyalkyl esters thereof. Alkyl esters, e.g., C1-C18 alkyl esters, of α,β-unsaturated monocarboxylic acids can be selected, and alkyl esters, e.g., C1-C18 alkyl esters, of acrylic acid or methacrylic acid can be selected, e.g., methyl acrylate, ethyl acrylate, propyl acrylate, n-butyl acrylate, tert-butyl acrylate, 2-ethylhexyl acrylate, n-dodecyl acrylate, methyl methacrylate, ethyl methacrylate, butyl methacrylate, and 2-ethylhexyl methacrylate. Alkoxyalkyl esters of α,β-unsaturated monocarboxylic acids can also be selected, alkoxyalkyl esters of acrylic acid or methacrylic acid can be selected, e.g., C2-C12-alkoxyalkyl esters of acrylic acid or methacrylic acid, and methoxymethyl acrylate, methoxyethyl (meth)acrylate, ethoxyethyl (meth)acrylate, and methoxyethyl (meth)acrylate can be further selected. Mixtures of alkyl esters (e.g., those mentioned above) and alkoxyalkyl esters (e.g., in the form of those mentioned above) can also be used. Hydroxyalkyl acrylate and hydroxyalkyl methacrylate with 1-12 carbon atoms in the hydroxyalkyl group can also be used, and 2-hydroxyethyl acrylate, 2-hydroxyethyl methacrylate, and 3-hydroxypropyl acrylate can be selected. Likewise, epoxy-containing esters, such as glycidyl methacrylate, can be used. Cyanoalkyl acrylate and cyanoalkyl methacrylate with 2-12 C atoms in the cyanoalkyl group can also be used, and α-cyanoethyl acrylate, β-cyanoethyl acrylate and cyanobutyl methacrylate can be selected. Acrylate or methacrylate containing fluorine-substituted benzyl can also be used, and fluorobenzyl acrylate and fluorobenzyl methacrylate can be selected. Acrylate and methacrylate containing fluoroalkyl groups can also be used, and trifluoroethyl acrylate and tetrafluoropropyl methacrylate can be selected. Amino-containing α,β-unsaturated carboxylates, such as dimethylaminomethyl acrylate and diethylaminoethyl acrylate, may also be used.

In some embodiments, based on the total mass of the first polymer, the mass percentage content of the first monomeric unit is M1, and M1 is 10-55%, optionally 25-55%; and/or the mass percentage content of the second monomeric unit is M2, and M2 is 40-80%, optionally 50-70%; and/or the mass percentage content of the third monomeric unit is M3, and M3 is 0-10%, optionally 0.001-2%; and/or the mass percentage content of the fourth monomeric unit is M4, and M4 is 0-10%, optionally 0.1-1%.

The conductive undercoat layer based on this solution can be appropriately dissolved during the coating process, and in turn forms enhanced bonding with the positive electrode film layer.

In some embodiments, based on the total mass of the first polymer, the mass percentage content of the first monomeric unit is M1, and M1 is 10-55%, optionally 10-15%, 15-20%, 20-25%, 25-30%, 30-35%, 35-40%, 40-45%, 45-50%, or 50-55%; and/or the mass percentage content of the second monomeric unit is M2, and M2 is 40-80%, optionally 40-45%, 45-50%, 50-55%, 55-60%, 60-65%, 65-70%, 70-75%, or 75-80%; and/or the mass percentage content of the third monomeric unit is M3, and M3 is 0-10%, optionally 0.001-1%, 1-2%, 2-3%, 3-4%, 4-5%, 5-6%, 6-7%, 7-8%, 8-9%, or 9-10%; and/or the mass percentage content of the fourth monomeric unit is M4, and M4 is 0-10%, optionally 0.01-1%, 1-2%, 2-3%, 3-4%, 4-5%, 5-6%, 6-7%, 7-8%, 8-9%, or 9-10%. The positive electrode plate based on this solution is used in a secondary battery, and one or more properties of the secondary battery are significantly improved. The conductive undercoat layer based on this solution can be appropriately dissolved during the coating process, and in turn forms enhanced bonding with the positive electrode film layer.

In some embodiments, M3/(M2+M3) is 0-5%, optionally 0.001-1%. The positive electrode plate based on this solution is used in a secondary battery, and one or more properties of the secondary battery are significantly improved.

In some embodiments, M3/(M2+M3) is 0.01-1%, 1-2%, 2-3%, 3-4%, or 4-5%.

In some embodiments, the first polymer includes one or more selected from hydrogenated acrylonitrile-butadiene rubber and hydrogenated carboxylated acrylonitrile-butadiene rubber; and/or the weight-average molecular weight of the first polymer is 50,000 to 1,500,000, optionally 200,000 to 400,000. The positive electrode plate based on this solution is used in a secondary battery, and one or more properties of the secondary battery are significantly improved.

In some embodiments, the weight-average molecular weight of the first polymer is 100,000-300,000, 300,000-500,000, 500,000-700,000, 700,000-900,000, 900,000-1,100,000, 1,100,000-1,300,000, or 1,300,000-1,500,000.

In some embodiments, the first aqueous binder includes one or more selected from an aqueous polyacrylic resin and derivatives thereof, an aqueous amino-modified polypropylene resin and derivatives thereof, and polyvinyl alcohol and derivatives thereof, and optionally an aqueous acrylic acid-acrylate copolymer; and/or the weight-average molecular weight of the first aqueous binder is 200,000-1,500,000, optionally 300,000-400,000. The positive electrode plate based on this solution is used in a secondary battery, and one or more properties of the secondary battery are significantly improved.

In some embodiments, the weight-average molecular weight of the first aqueous binder is 100,000-300,000, 300,000-500,000, 500,000-700,000, 700,000-900,000, 900,000-1,100,000, or 1,100,000-1,300,000.

In some embodiments, the first conductive agent includes one or more selected from superconducting carbon, conductive graphite, acetylene black, carbon black, Ketjen black, carbon dots, carbon nanotubes, graphene, and carbon nanofibers, and optionally one or more selected from carbon nanotubes, graphene, and carbon nanofibers. The positive electrode plate based on this solution is used in a secondary battery, and one or more properties of the secondary battery are significantly improved.

In some embodiments, based on the total mass of the conductive undercoat layer, the mass percentage content of the first polymer is X1, and X1 is 5-20%, optionally 5-10%; and/or the mass percentage content of the first aqueous binder is X2, and X2 is 30-80%, optionally 40-50%; and/or the mass percentage content of the first conductive agent is X3, and X3 is 10-50%, optionally 40-50%. The positive electrode plate based on this solution is used in a secondary battery, and one or more properties of the secondary battery are significantly improved.

In some embodiments, the thickness of the conductive undercoat layer is 1-20 μm, optionally 3-10 μm. The positive electrode plate based on this solution is used in a secondary battery, and one or more properties of the secondary battery are significantly improved.

In some embodiments, the positive electrode film layer further comprises one or more selected from an infiltration agent and a dispersing agent, and optionally, the positive electrode film layer further comprises both an infiltration agent and a dispersing agent. The positive electrode plate based on this solution is used in a secondary battery, and one or more properties of the secondary battery are significantly improved.

In some embodiments, the surface tension of the infiltration agent is 20-40 mN/m, and optionally, the infiltration agent comprises at least one of the following functional groups: —CN, —NH$_2$, —NH—, —N—, —OH, —COO—, and —C(=O)—O—C(=O)—. The positive electrode plate based on this solution is used in a secondary battery, and one or more properties of the secondary battery are significantly improved.

In some embodiments, the surface tension can be measured by using a platinum plate method (Wilhelmy Plate Method). For the specific test steps, reference can be made to general standards in the art, such as GBT/22237-2008 Surface Active Agents—Determination of Surface Tension, e.g., ASTM D1331-14. Standard Test Methods for Surface and Interfacial Tension of Solutions of Paints, Solvents, Solutions of Surface-Active Agents, and Related Materials.

In some embodiments, the infiltration agent includes one or more selected from a small molecular organic solvent and a low-molecular-weight polymer, and optionally, the small molecular organic solvent includes one or more selected from an alcohol amine compound, an alcohol compound, and a nitrile compound, and optionally, the carbon atom number of the alcohol amine compound is 1-16, optionally 2-6; optionally, the low-molecular-weight polymer includes one or more selected from a maleic anhydride-styrene copolymer, polyvinyl pyrrolidone, and polysiloxane, and optionally, the weight-average molecular weight of the low-molecular-weight polymer is 6,000 or less, optionally 3,000-6,000. The positive electrode plate based on this solution is used in a secondary battery, and one or more properties of the secondary battery are significantly improved.

In some embodiments, the dispersing agent comprises a second polymer, and the second polymer comprises:

a fifth monomeric unit represented by formula 7;

a sixth monomeric unit including at least one selected from the group consisting of a monomeric unit represented by formula 8 and a monomeric unit represented by formula 9; and a seventh monomeric unit including at least one selected from the group consisting of a monomeric unit represented by formula 10 and a monomeric unit represented by formula 11;

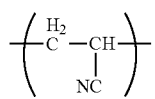

formula 7

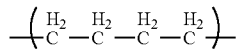

formula 8

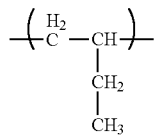

formula 9

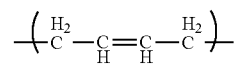

formula 10

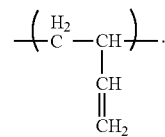

formula 11

The positive electrode plate based on this solution is used in a secondary battery, and one or more properties of the secondary battery are significantly improved.

In some embodiments, based on the total mass of the second polymer, the mass percentage content of the fifth monomeric unit is M5, and M5 is 10-55%, optionally 25-55%; and/or the mass percentage content of the sixth monomeric unit is M6, and M6 is 40-80%, optionally 50-70%; and/or the mass percentage content of the seventh monomeric unit is M7, and M7 is 0-10%, optionally 0.001-2%. The positive electrode plate based on this solution is used in a secondary battery, and one or more properties of the secondary battery are significantly improved.

In some embodiments, based on the total mass of the second polymer, the mass percentage content of the fifth monomeric unit is M5, and M5 is 10-55%, optionally 10-15%, 15-20%, 20-25%, 25-30%, 30-35%, 35-40%, 40-45%, 45-50%, or 50-55%; and/or the mass percentage content of the sixth monomeric unit is M6, and M6 is 40-80%, optionally 40-45%, 45-50%, 50-55%, 55-60%, 60-65%, 65-70%, 70-75%, or 75-80%; and/or the mass percentage content of the seventh monomeric unit is M7, and M7 is 0-10%, optionally 0.01-1%, 1-2%, 2-3%, 3-4%, 4-5%, 5-6%, 6-7%, 7-8%, 8-9%, or 9-10%.

In some embodiments, M7/(M6+M7) is 0-5%, optionally 0.001-1%. The positive electrode plate based on this solution is used in a secondary battery, and one or more properties of the secondary battery are significantly improved.

In some embodiments, the second polymer is hydrogenated acrylonitrile-butadiene rubber; and/or the weight-average molecular weight of the second polymer is 50,000 to 500,000, optionally 150,000 to 350,000. The positive electrode plate based on this solution is used in a secondary battery, and one or more properties of the secondary battery are significantly improved.

In some embodiments, based on the total mass of the positive electrode film layer, the mass percentage content of the dispersing agent is Y1, and Y1 is 0.05-1%, optionally 0.1-0.5%; and/or the mass percentage content of the infiltration agent is Y2, and Y2 is 0.05-2%, optionally 0.2-0.8%. The positive electrode plate based on this solution is used in a secondary battery, and one or more properties of the secondary battery are significantly improved.

In some embodiments, Y1/Y2 is 0.05-20, optionally 0.1-1, further 0.3-0.8. The positive electrode plate based on this solution is used in a secondary battery, and one or more properties of the secondary battery are significantly improved.

In some embodiments, in the positive electrode plate, the mass ratio of the first polymer to the second polymer is 1.5-5, optionally 2-3. The positive electrode plate based on this solution is used in a secondary battery, and one or more properties of the secondary battery are significantly improved.

In some embodiments, the crystalline pyrophosphate in the first coating layer has an interplanar spacing range of 0.293-0.470 nm and an included angle range of 18.00°-32.00° for the crystal orientation (111); and the crystalline phosphate in the second coating layer has an interplanar spacing range of 0.244-0.425 nm and an included angle range of 20.00°-37.00° for the crystal orientation (111). The positive electrode plate based on this solution is used in a secondary battery, and one or more properties of the secondary battery are significantly improved.

In some embodiments, in the inner core, the ratio of y to 1-y is 1:10 to 1:1, optionally 1:4 to 1:1; and/or in the inner core, the ratio of z to 1-z is 1:9 to 1:999, optionally 1:499 to 1:249. The positive electrode plate based on this solution is used in a secondary battery, and one or more properties of the secondary battery are significantly improved.

In some embodiments, the carbon in the third coating layer is a mixture of SP2-form carbon and SP3-form carbon, and optionally, the molar ratio of the SP2-form carbon to the SP3-form carbon is any value within a range of 0.1 to 10, optionally any value within a range of 2.0 to 3.0. The positive electrode plate based on this solution is used in a secondary battery, and one or more properties of the secondary battery are significantly improved.

In some embodiments, the coating amount of the first coating layer is greater than 0 and less than or equal to 6 wt %, optionally greater than 0 and less than or equal to 5.5 wt %, more optionally greater than 0 and less than or equal to 2 wt %, based on the weight of the inner core; and/or the coating amount of the second coating layer is greater than 0 and less than or equal to 6 wt %, optionally greater than 0 and less than or equal to 5.5 wt %, more optionally 2-4 wt %, based on the weight of the inner core; and/or the coating amount of the third coating layer is greater than 0 and less than or equal to 6 wt %, optionally greater than 0 and less than or equal to 5.5 wt %, more optionally greater than 0 and less than or equal to 2 wt %, based on the weight of the inner core. The positive electrode plate based on this solution is used in a secondary battery, and one or more properties of the secondary battery are significantly improved.

In some embodiments, the thickness of the first coating layer is 1-10 nm; and/or the thickness of the second coating layer is 2-15 nm; and/or the thickness of the third coating layer is 2-25 nm. The positive electrode plate based on this solution is used in a secondary battery, and one or more properties of the secondary battery are significantly improved.

In some embodiments, based on the weight of the positive electrode active material, the content of the element manganese is in a range of 10-35 wt %, optionally in a range of 15-30 wt %, more optionally in a range of 17-20 wt %, the content of the element phosphorus is in a range of 12-25 wt %, optionally in a range of 15-20 wt %, and the weight ratio of the element manganese to the element phosphorus is in a range of 0.90-1.25, optionally 0.95-1.20. The positive electrode plate based on this solution is used in a secondary battery, and one or more properties of the secondary battery are significantly improved.

In some embodiments, the positive electrode active material with a core-shell structure has a lattice change rate of 4% or less, optionally 3.8% or less, more optionally 2.0-3.8%, before and after complete lithium de-intercalation. The positive electrode plate based on this solution is used in a secondary battery, and one or more properties of the secondary battery are significantly improved.

In some embodiments, the positive electrode active material with a core-shell structure has an Li/Mn antisite defect concentration of 4% or less, optionally 2.2% or less, more optionally 1.5-2.2%. The positive electrode plate based on this solution is used in a secondary battery, and one or more properties of the secondary battery are significantly improved.

In some embodiments, the positive electrode active material with a core-shell structure has a compacted density under 3 T of 2.2 g/cm$^3$ or more, optionally 2.2 g/cm$^3$ or more and 2.8 g/cm$^3$ or less. The positive electrode plate based on this solution is used in a secondary battery, and one or more properties of the secondary battery are significantly improved.

In some embodiments, the positive electrode active material with a core-shell structure has a surface oxygen valence state of −1.90 or less, optionally −1.90 to −1.98. The positive electrode plate based on this solution is used in a secondary battery, and one or more properties of the secondary battery are significantly improved.

In some embodiments, the present application provides a secondary battery comprising any one of the above positive electrode plates.

In some embodiments, the present application provides a power consuming device comprising the above-mentioned secondary battery.

[Positive Electrode Active Material]

In a first aspect, the present application provides a novel positive electrode active material having a core-shell structure comprising an inner core and a shell coating the inner core, wherein the inner core has a chemical formula of $Li_{1+x}Mn_{1-y}A_yP_{1-z}R_zO_4$ in which x is any value in a range of −0.100 to 0.100, y is any value in a range of 0.001 to 0.500, z is any value in a range of 0.001 to 0.100, A is one or more elements selected from Zn, Al, Na, K, Mg, Mo, W, Ti, V, Zr, Fe, Ni, Co, Ga, Sn, Sb, Nb, and Ge, optionally one or more elements of Fe, Ti, V, Ni, Co, and Mg, R is one or more elements selected from B, Si, N, and S, and optionally, R is an element selected from B, Si, N, and S;

with the values of x, y, and z satisfying the following condition: keeping the entire inner core electrically neutral;

the shell comprises a first coating layer coating the inner core, a second coating layer coating the first coating layer, and a third coating layer coating the second coating layer, wherein the first coating layer comprises crystalline pyrophosphate $Li_aMP_2O_7$ and/or $M_b(P_2O_7)_c$ in which 0≤a≤2, 1≤b≤4, and 1≤c≤6, with the values of a, b, and c satisfying the following condition: keeping the crystalline pyrophosphate $Li_aMP_2O_7$ or $M_b(P_2O_7)_c$ electrically neutral;

M in each of the crystalline pyrophosphates $Li_aMP_2O_7$ and $M_b(P_2O_7)_c$ is independently one or more elements selected from Fe, Ni, Mg, Co, Cu, Zn, Ti, Ag, Zr, Nb, or Al;

the second coating layer comprises crystalline phosphate $XPO_4$ in which

X is one or more elements selected from Li, Fe, Ni, Mg, Co, Cu, Zn, Ti, Ag, Zr, Nb, or Al, the third coating layer is carbon.

The inventors of the present application have found in practical procedures that the existing lithium manganese phosphate positive electrode active material at present has relatively serious manganese dissolution during deep charging and discharging. Although there is an attempt in the related art to coat lithium manganese phosphate with lithium iron phosphate in order to reduce the interfacial side reaction, this coating cannot prevent the dissolved manganese from continued migration to the electrolyte solution. The dissolved manganese is reduced to the metal manganese after migration to the negative electrode. The metal manganese thus produced is equivalent to a "catalyst", which can catalyze the decomposition of an SEI film (solid electrolyte interphase) on the surface of the negative electrode to produce a by-product; part of the by-product is gaseous and thus causes the secondary battery to expand, which affects the safety performance of the secondary battery; in addition, the other part of the by-product is deposited on the surface of the negative electrode, which hinders the passage of lithium ions in and out of the negative electrode, resulting in an increase in the impedance of the secondary battery, thus affecting the dynamic performance of the secondary battery. In addition, in order to make compensation for the lost SEI film, active lithium in the electrolyte solution and inside the battery are continuously consumed, which brings irreversible influence on the capacity retention rate of the secondary battery.

After extensive research, the inventors have found that a novel positive electrode active material having a core-shell structure can be obtained by modifying lithium manganese phosphate and coating the lithium manganese phosphate with multiple layers, and the positive electrode active material can achieve significantly reduced manganese dissolution and reduced lattice change rate and can be used in a secondary battery to improve the cycling performance, rate performance and safety performance of the battery and increase the capacity of the battery.

It should be noted that herein, the term "coating layer" refers to a substance layer coating the lithium manganese phosphate inner core, which substance layer can completely or partially coat the lithium manganese phosphate inner core. The use of the "coating layer" is only for convenience of description and is not intended to limit the present disclosure. Likewise, the term "the thickness of the coating layer" refers to the thickness of the substance layer coating the lithium manganese phosphate inner core in the radial direction of the lithium manganese phosphate inner core.

Unless otherwise stated, in the chemical formula of the above-mentioned inner core, when A is a combination of at least two of the above-mentioned elements, the above definition of the numerical range of y not only represents a definition of the stoichiometric number of each element as A, but also represents a definition of the sum of the stoichiometric numbers of all the elements as A. For example, when A is a combination of two or more elements A1, A2 ... An as mentioned above, the stoichiometric numbers y1, y2 ... yn of A1, A2 ... An each fall within the numerical range of y defined in the present application, and the sum of y1, y2 ... yn shall also fall within this numerical range. Likewise, when R is two or more of the above-mentioned elements, the definition of the numerical range of the stoichiometric number of R in the present application also has the above-mentioned meaning.

In an optional embodiment, when A is one, two, three, or four elements selected from Zn, Al, Na, K, Mg, Mo, W, Ti, V, Zr, Fe, Ni, Co, Ga, Sn, Sb, Nb, and Ge, $A_y$ is $Q_{n1}D_{n2}E_{n3}K_{n4}$ in which $n1+n2+n3+n4=y$ and $n1$, $n2$, $n3$, and $n4$ are all positive numbers and are not zero at the same time, Q, D, E, and K are each independently selected from one of Zn, Al, Na, K, Mg, Mo, W, Ti, V, Zr, Fe, Ni, Co, Ga, Sn, Sb, Nb, and Ge, and optionally, at least one of Q, D, E, and K is Fe. Optionally, one of n1, n2, n3, and n4 is zero, and the others are not zero; more optionally, two of n1, n2, n3, and n4 are zero, and the others are not zero; and further optionally, three of n1, n2, n3, and n4 are zero, and the others are not zero. In the inner core of $Li_{1+x}Mn_{1-y}A_yP_{1-z}R_zO_4$, it is beneficial to doping with one, two, three, or four of the above-mentioned elements A at the manganese site, and optionally, doping with one, two, or three of the above-mentioned elements A; in addition, it is beneficial to dope with one or two elements R at the phosphorus site, which is beneficial to making the doping elements evenly distributed.

In the inner core of $Li_{1+x}Mn_{1-y}A_yP_{1-z}R_zO_4$, the magnitude of x is affected by the magnitudes of the valence states of A and R and the magnitudes of y and z, so as to ensure that the whole system is electrically neutral. If the value of x is too small, a reduced content of lithium in the whole inner core system will be caused and affect the gram capacity of the material. The value of y limits the total amount of all doping elements. If y is too small, that is, the doping amount is too small, the doping elements will not work, and if y exceeds 0.5, the Mn content in the system will be relatively small, which affects the voltage platform of the material. The doping with element R is in the position of P, and since the P—O tetrahedron is relatively stable and the excessive z value will affect the stability of the material, the value of z is defined as being 0.001-0.100.

The positive electrode active material of the present application can improve the gram capacity, cycling performance and safety performance of the secondary battery. Although the mechanism remains unclear, it is speculated that the lithium manganese phosphate positive electrode active material of the present application has a core-shell structure, wherein doping the lithium manganese phosphate inner core with elements A and R at the manganese and phosphorus sites can not only effectively reduce the dissolution of manganese to thereby reduce the migration of manganese ions to the negative electrode, reduce the consumption of the electrolyte solution due to the decomposition of the SEI film, and improve the cycling performance and safety performance of the secondary battery, but can also promote the adjustment of Mn—O bonds to reduce the migration barrier of lithium ions, facilitating the migration of lithium ions, and improve the rate performance of the secondary battery. Coating the inner core with a first coating layer containing crystalline pyrophosphate can further increase the migration resistance of manganese, and reduce the dissolution thereof, the content of lithium impurity on the surface, and the contact between the inner core and the electrolyte solution, thereby reducing the interfacial side reaction, reducing gas production, and improving the high-temperature storage performance, cycling performance and safety performance of the secondary battery. By further coating with a crystalline phosphate coating layer with excellent lithium ion conductivity, the interfacial side reaction on the surface of the positive electrode active material can be effectively reduced, thereby improving the high-temperature cycling and storage performance of the secondary battery. By further coating with a carbon layer as the third coating layer, the safety performance and kinetic performance of the secondary battery can be further improved.

In addition, in the inner core, element A doped at the manganese site of lithium manganese phosphate also facilitates reducing the lattice change rate of the lithium manganese phosphate during the process of lithium de-intercalation, and improves the structural stability of the lithium manganese phosphate positive electrode material, greatly reducing the dissolution of manganese and reducing the oxygen activity on the particle surface. Doping with element R at the phosphorus site also facilitates changing the difficulty of the change of the Mn—O bond length, thereby improving the electron conductivity and reducing the migration barrier of lithium ions, promoting the migration of lithium ions, and improving the rate performance of the secondary battery.

In addition, the entire inner core system keeps electrical neutrality, which can ensure that the defects and impurity phases in the positive electrode active material are as less as possible. If there is an excess of a transition metal (such as manganese) in the positive electrode active material, since the structure of the material system itself is relatively stable, the excess transition metal is likely prone to precipitate in the form of an elementary substance, or form impurity phases inside the lattice to keep the electrical neutrality, so that such an impurity can be as less as possible. In addition, ensuring the electrical neutrality of the system can also result in lithium vacancies in the material in some cases, so that the kinetic performance of the material is more excellent.

The inner core prepared in the present application has an average particle size of 50-500 nm and a Dv50 of 200-300 nm. The primary particle size of the inner core is in the range of 50-500 nm, and the Dv50 is 200-300 nm. If the average particle size of the inner core is too large (more than 500 nm), the gram capacity of the secondary battery in which this material is used will be affected; and if the average particle size of the inner core is too small, the specific surface area thereof will be larger and agglomeration will easily occur, which makes it difficult to achieve uniform coating.

In the present application, the median particle size Dv50 refers to the corresponding particle size when the cumulative volume distribution percentage of the material reaches 50%. In the present application, the median particle size Dv50 of a material can be determined using a laser diffraction particle size analysis method. For example, the determination may be carried out with reference to the standard GB/T 19077-2016 using a laser particle size analyzer (e.g., Malvern Master Size 3000).

By means of process control (for example, sufficient mixing and grinding of various source materials), it can be ensured that each element is uniformly distributed in the lattice without aggregation. The positions of the main characteristic peaks in an XRD pattern of lithium manganese phosphate doped with elements A and R are consistent with those of undoped $LiMnPO_4$, indicating that no impurity phase is introduced during the doping process, and the improved performance of the inner core is mainly attributed to the doping with the elements, rather than an impurity phase. After preparing the positive electrode active material of the present application, the inventors of the present application cut out a middle area of the prepared positive electrode active material particles by focus ion beam (abbreviated as FIB), and tested through transmission electron microscope (abbreviated as TEM) and X-ray energy dispersive spectrum (abbreviated as EDS) analysis and found that the elements are uniformly distributed without aggregation.

In the present application, the crystalline state means that the crystallinity is 50% or more, i.e., 50-100%. A crystalline state with a crystallinity less than 50% is referred to as a glassy state. The crystallinity of the crystalline pyrophosphate and crystalline phosphate of the present application is 50% to 100%. The pyrophosphate and phosphate with a certain crystallinity can not only give full play to the ability of the pyrophosphate coating layer to prevent the dissolution of manganese and the excellent ability of the phosphate coating layer to conduct lithium ions, as well as the reduction of the interfacial side reaction, but can also enable better lattice matching between the pyrophosphate coating layer and the phosphate coating layer, such that tighter bonding with the coating layer can be achieved.

In the present application, the crystallinity of the crystalline pyrophosphate in the substance of the first coating layer and the crystalline phosphate in the substance of the second coating layer in the positive electrode active material can be tested by conventional technical means in the art, e.g., measured by a density method, infrared spectroscopy, differential scanning calorimetry, and nuclear magnetic resonance absorption method, or may also be tested by X-ray diffraction method, for example.

The specific method for testing the crystallinity of the crystalline pyrophosphate in the first coating layer and the crystalline phosphate in the second coating layer of the positive electrode active material by X-ray diffraction method may comprise the following steps:

taking a certain amount of a positive electrode active material powder, and measuring the overall scattering intensity by X-rays, i.e., the sum scattering intensity of the substance in the whole space, which is only related to the intensity of primary rays, the chemical structure of the positive electrode active material powder, and the total number of electrons participating in diffraction, i.e., the magnitude of the mass, and is independent of the ordered state of the sample. Then, the crystalline scattering and non-crystalline scattering are separated from the diffraction pattern. The crystallinity is the ratio of the scattering intensity of the crystalline part to the overall scattering intensity.

It should be noted that in the present application, the crystallinity of the pyrophosphate and phosphate in the coating layers can be adjusted, for example, by adjusting the process conditions of the sintering process, such as the sintering temperature and sintering time.

In the present application, since it is difficult for metal ions to migrate in the pyrophosphate, the pyrophosphate as the first coating layer can effectively isolate the doping metal ions from the electrolyte solution. The structure of the crystalline pyrophosphate is stable, and therefore, coating with the crystalline pyrophosphate can effectively inhibit the dissolution of transition metals, thereby improving the cycling performance.

The bonding between the first coating layer and the core is similar to heterojunction, and the firmness of the bonding is limited by the degree of lattice matching. When the lattice mismatch is 5% or less, the lattice matching is relatively good and the two are prone to tight bonding. Tight bonding can ensure that the coating layer do not fall off during the subsequent cycling process, which is conducive to ensuring the long-term stability of the material. The measurement of the degree of bonding between the first coating layer and the core is mainly carried out by calculating the mismatch between the lattice constants of the core and the coating. In the present application, after doping the inner core with elements A and R, the degree of matching between the inner core and the first coating layer is improved when compared with no doping with the elements, and the inner core and the pyrophosphate coating layer can be more tightly bonded together.

The selection of crystalline phosphate as the second coating layer is due to the fact that firstly, it has a higher degree of lattice matching with the crystalline pyrophosphate of the first coating layer (with the mismatch degree being only 3%); and secondly, the stability of the phosphate itself is better than that of the pyrophosphate, and coating the pyrophosphate with the phosphate is beneficial to improving the stability of the material. The crystalline phosphate has a stable structure and excellent lithium ion conductivity. Therefore, coating with the crystalline phosphate can effectively reduce the interfacial side reaction on the surface of the positive electrode active material, thus improving the high-temperature cycling and storage performance of the secondary battery. The mode of lattice matching, etc., between the second coating layer and the first coating layer is similar to the bonding between the first coating layer and the core. When the lattice mismatch is 5% or less, the lattice matching is relatively good and the two are prone to tight bonding.

The main reason why carbon is used as the third layer of coating is that the carbon layer has a better electronic conductivity. Since an electrochemical reaction occurs during the service of the secondary battery, electrons need to participate. Therefore, in order to increase the electron transport between particles and between different positions on the particle, carbon with excellent electrical conductivity can be used to coat the positive electrode active material. Coating with carbon can effectively improve the electrical conductivity and desolvation capacity of the positive electrode active material.

Figure 9:
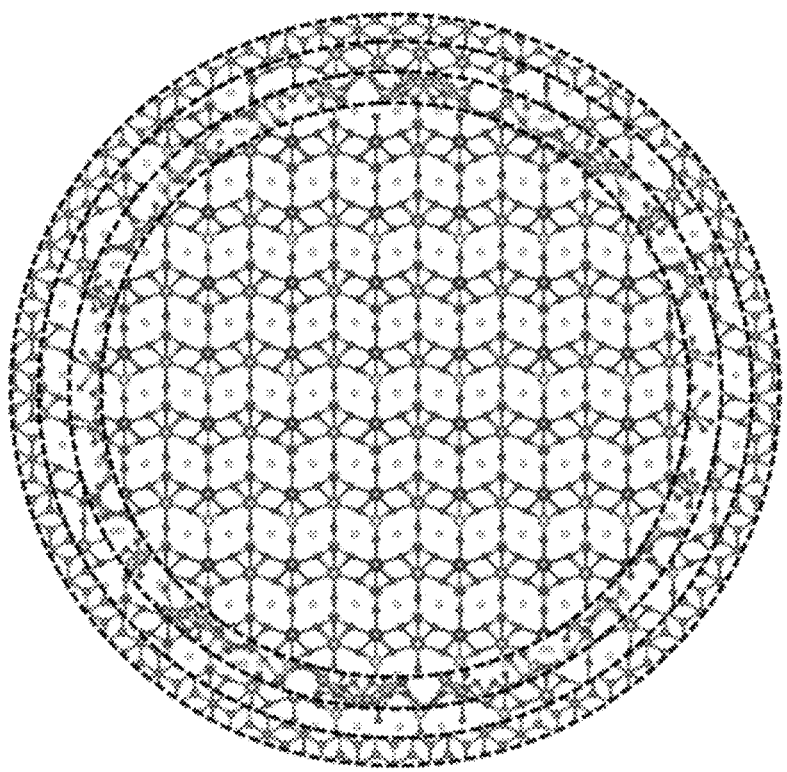
FIG. 9 is a schematic diagram of an ideal positive electrode active material with a three-layer coating structure according to an embodiment of the present application.

FIG. 9 is a schematic diagram of an ideal positive electrode active material with a three-layer coating structure according to some embodiments. As shown in the figure, the innermost circle schematically represents the inner core, and the first coating layer, the second coating layer, and the third coating layer are sequentially arranged from inside to outside. This figure represents an ideal state in which each layer involves complete coating; however, in practice, each coating layer may completely or partially coat.

In some embodiments, primary particles in the positive electrode active material have an average particle size range of 50-500 nm and a volume median particle size Dv50 range of 200-300 nm. Since the particles may agglomerate, the size of secondary particles after agglomeration may be 500-40,000 nm. The particle size of the positive electrode active material may affect the processing of the material and the compacted density performance of an electrode plate. By selecting the average particle size of the primary particles within the above range, the following situations can be avoided: If the average particle size of the primary particles of the positive electrode active material is too small, particle agglomeration and dispersion difficulty may be caused, and more binder is needed, resulting in poor brittleness of the electrode plate; and if the average particle size of the primary particles of the positive electrode active material is too large, the gap between the particles may be large and the compacted density may be reduced.

By means of the above solution, the lattice change rate of lithium manganese phosphate and Mn dissolution during lithium de-intercalation can be effectively suppressed, thereby improving the high-temperature cycling stability and high-temperature storage performance of the secondary battery.

In some embodiments, the crystalline pyrophosphate in the first coating layer has an interplanar spacing range of 0.293-0.470 nm and an included angle range of 18.00°-32.00° for the crystal orientation (111); and the crystalline phosphate in the second coating layer has an interplanar spacing range of 0.244-0.425 nm and an included angle range of 20.00°-37.00° for the crystal orientation (111).

Both the first coating layer and the second coating layer in the positive electrode active material of the present application are crystalline substances. The crystalline pyrophosphate and crystalline phosphate in the coating layers can be characterized either by conventional technical means in the art or by means of transmission electron microscope (TEM), for example. Under TEM, the inner core and the coating layer can be distinguished by testing the interplanar spacing.

The specific testing method for the interplanar spacings and included angles of the crystalline pyrophosphate and crystalline phosphate in the coating layers can comprise the following steps:

taking a certain amount of a coated positive electrode active material sample powder in a test tube, injecting a solvent such as alcohol into the test tube, then fully stirring and dispersing the mixture, then using a clean disposable plastic straw to take an appropriate amount of the above solution, and dropping the solution onto a 300-mesh copper mesh when part of the powder remains on the copper mesh; and transferring the copper mesh along with the sample to a TEM sample chamber for testing to obtain an original picture from the TEM test, and saving the original picture.

The original picture obtained from the above TEM test is opened in a diffractometer software, Fourier transform is performed to obtain a diffraction pattern, the distance from a diffraction spot to the center position in the diffraction pattern is measured to obtain the interplanar spacing, and the included angle is calculated according to Bragg's equation.

The range of the interplanar spacing of the crystalline pyrophosphate is different from that of the crystalline phosphate, which can be directly judged by the value of the interplanar spacing.

By means of the crystalline pyrophosphate and crystalline phosphate within the above interplanar spacing and included angle ranges, the lattice change rate of lithium manganese phosphate and Mn dissolution during lithium de-intercalation can be more effectively suppressed, thereby improving the high-temperature cycling performance, cycling stability and high-temperature storage performance of the secondary battery.

In some embodiments, in the inner core, the ratio of y to 1-y is 1:10 to 1:1, optionally 1:4 to 1:1. Here, y denotes the sum of the stoichiometric numbers of doping element A at the Mn site. When the above conditions are satisfied, the energy density and cycling performance of the secondary battery in which the positive electrode active material is used can be further improved.

In some embodiments, in the inner core, the ratio of z to 1-z is 1:9 to 1:999, optionally 1:499 to 1:249. Here, z denotes the sum of the stoichiometric numbers of doping element R at the P site. When the above conditions are satisfied, the energy density and cycling performance of the secondary battery in which the positive electrode active material is used can be further improved.

In some embodiments, the carbon in the third coating layer is a mixture of SP2-form carbon and SP3-form carbon, and optionally, the molar ratio of the SP2-form carbon to the SP3-form carbon is any value within a range of 0.1 to 10, optionally any value within a range of 2.0 to 3.0.

In some embodiments, the molar ratio of the SP2-form carbon to SP3-form carbon can be about 0.1, about 0.2, about 03, about 0.4, about 0.5, about 0.6, about 0.7, about 0.8, about 0.9, about 1, about 2, about 3, about 4, about 5, about 6, about 7, about 8, about 9, or about 10, or within any range of any of the above values.

In the present application, "about" a numerical value means a range, i.e., a range of ±10% of the numerical value.

The comprehensive electrical performance of the secondary battery is improved by selecting the form of carbon in the carbon coating layer. Specifically, by using a mixed form of SP2-form carbon and SP3-form carbon and limiting the ratio of SP2-form to SP3-form carbon within a certain range, the following situations can be avoided: if the carbon in the coating layer is in the form of amorphous SP3, the electrical conductivity is poor; and if all the carbon is in a graphitized SP2-form, although the electrical conductivity is good, there are few lithium ion paths, which is not conducive to the de-intercalation of lithium. In addition, limiting the molar ratio of the SP2-form carbon to the SP3-form carbon within the above range can not only achieve good electrical conductivity, but can also ensure the passage of lithium ions, which is beneficial to the realization of the function of the secondary battery and the cycling performance thereof.

The mixing ratio of the SP2-form and the SP3-form carbon in the third coating layer can be controlled by sintering conditions such as the sintering temperature and sintering time. For example, in the case of using sucrose as a carbon source for preparing the third coating layer, after the sucrose is cracked at a high temperature, it is deposited on the second coating layer, and at the same time, under the action of the high temperature, a carbon coating layer having both the SP3 form and SP2 form will be produced. The ratio of the SP2-form carbon to the SP3-form carbon can be adjusted by selecting high temperature cracking conditions and sintering conditions.

The structure and characteristics of the carbon in the third coating layer can be determined by Raman spectroscopy, and the specific test method involves: subjecting the energy spectrum of the Raman test to peaking splitting to obtain Id/Ig (where Id is the peak intensity of the SP3-form carbon, and Ig is the peak intensity of the SP2-form carbon), thus confirming the molar ratio of the two forms.

In some embodiments, the coating amount of the first coating layer is greater than 0 and less than or equal to 6 wt %, optionally greater than 0 and less than or equal to 5.5 wt %, more optionally greater than 0 and less than or equal to 2 wt %, based on the weight of the inner core; and/or the coating amount of the second coating layer is greater than 0 and less than or equal to 6 wt %, optionally greater than 0 and less than or equal to 5.5 wt %, more optionally 2-4 wt %, based on the weight of the inner core; and/or the coating amount of the third coating layer is greater than 0 and less than or equal to 6 wt %, optionally greater than 0 and less than or equal to 5.5 wt %, more optionally greater than 0 and less than or equal to 2 wt %, based on the weight of the inner core.

In the present application, none of the coating amounts of the layers is zero.

In the positive electrode active material with a core-shell structure of the present application, the coating amounts of the three coating layers in the present application are within the above ranges, thus enabling the inner core to be fully coated, while further improving the kinetic performance and safety performance of the secondary battery without sacrificing the gram capacity of the positive electrode active material.

For the first coating layer, the coating amount within the above range can avoid the following situations: the coating amount is too small, meaning that the thickness of the coating layer is thiner, which may not effectively hinder the migration of the transition metal; and the coating amount is too large, meaning that the coating layer is too thick, which will affect the migration of $Li^+$ and in turn the rate performance of the material.

For the second coating layer, the coating amount within the above range can avoid the following situations: the coating amount is too much, which may affect the platform voltage of the whole material; and the coating amount is too small, which may not achieve a sufficient coating effect.

For the third coating layer, carbon coating mainly plays a role of enhancing the electron transport between particles. However, since the structure also contains a large amount of amorphous carbon, the density of carbon is relatively low, so if the coating amount is too large, the compacted density of the electrode plate will be affected.

In some embodiments, the thickness of the first coating layer is 1-10 nm; and/or the thickness of the second coating layer is 2-15 nm; and/or the thickness of the third coating layer is 2-25 nm.

In some embodiments, the thickness of the first coating layer can be about 2 nm, about 3 nm, about 4 nm, about 5 nm, about 6 nm, about 7 nm, about 8 nm, about 9 nm, or about 10 nm, or within any range of any of the above values.

In some embodiments, the thickness of the second coating layer can be about 2 nm, about 3 nm, about 4 nm, about 5 nm, about 6 nm, about 7 nm, about 8 nm, about 9 nm, about 10 nm, about 11 nm, about 12 nm, about 13 nm, about 14 nm, about 15 nm, or within any range of any of the above numerical values.

In some embodiments, the thickness of the third coating layer can be about 2 nm, about 3 nm, about 4 nm, about 5 nm, about 6 nm, about 7 nm, about 8 nm, about 9 nm, about 10 nm, about 11 nm, about 12 nm, about 13 nm, about 14 nm, about 15 nm, about 16 nm, about 17 nm, about 18 nm, about 19 nm, about 20 nm, about 21 nm, about 22 nm, about 23 nm, about 24 nm or about 25 nm, or within any range of any of the above numerical values.

When the thickness of the first coating layer is in the range of 1-10 nm, adverse effects on the dynamic performance of the material that may occur when it is too thick can be avoided, and the problem that the migration of transition metal ions cannot be effectively hindered when it is too thin can be avoided.

When the thickness of the second coating layer is in the range of 2-15 nm, the surface structure of the second coating layer is stable, and the side reaction with the electrolyte solution is small, so that the interfacial side reaction can be effectively reduced, thereby improving the high-temperature performance of the secondary battery.

When the thickness of the third coating layer is in the range of 2-25 nm, the electrical conductivity of the material can be improved and the compacted density performance of the battery electrode plate prepared by using the positive electrode active material can be improved.

The thickness of the coating layer is mainly tested by FIB, and the specific method may comprise the following steps: randomly selecting a single particle from the positive electrode active material powder to be tested, cutting out a thin slice with a thickness of about 100 nm from the middle position or near the middle position of the selected particle, then conducting a TEM test on the slice, and measuring the thickness of the coating layer, with 3-5 positions being measured for averaging.

In some embodiments, based on the weight of the positive electrode active material, the content of the element manganese is in a range of 10-35 wt %, optionally in a range of 15-30 wt %, more optionally in a range of 17-20 wt %, the content of the element phosphorus is in a range of 12-25 wt %, optionally in a range of 15-20 wt %, and the weight ratio of the element manganese to the element phosphorus is in a range of 0.90-1.25, optionally 0.95-1.20.

In the present application, where manganese is contained only in the inner core of the positive electrode active material, the content of manganese may correspond to that of the inner core.

In the present application, limiting the content of the element manganese within the above range can effectively avoid problems such as the poor structural stability and reduced density of the material which may be caused if the content of the element manganese is too large, thereby improving the performance of the secondary battery, such as cycling, storage and compacted density; and problems such as a low voltage platform that may be caused when the content of the element manganese is too small can be avoided, thereby improving the energy density of the secondary battery.

In the present application, limiting the content of the element phosphorus within the above range can effectively avoid the following situations: if the content of the element phosphorus is too large, the covalency of P—O may be too strong to affect the conductivity of small polaron, thereby affecting the electrical conductivity of the material; and if the content of phosphorus is too small, the stability of the inner core and the lattice structure of the pyrophosphate in the first coating layer and/or the phosphate in the second coating layer may decrease, thereby affecting the overall stability of the material.

The weight ratio of the content of manganese to the content of phosphorus has the following effects on the performance of the secondary battery: the weight ratio is too large, meaning that the element manganese is too much and the dissolution of manganese increases, which affects the stability and gram capacity of the positive electrode active material and in turn the cycling performance and storage performance of the secondary battery; and the weight ratio is too small, meaning that the element phosphorus is too much, leading to easy formation of impurity phases, whereupon the discharge voltage plateau of the material may decrease, thereby reducing the energy density of the secondary battery.

The determination of the elements manganese and phosphorus can be carried out by conventional technical means in the art. In particular, the following methods are used to determine the contents of the elements manganese and phosphorus: dissolving the material in dilute hydrochloric acid (concentration 10-30%), measuring the content of each element in the solution using ICP, and then measuring and converting the manganese content to obtain the weight percentage thereof.

In some embodiments, the positive electrode active material with a core-shell structure has a lattice change rate of 4% or less, optionally 3.8% or less, more optionally 2.0-3.8%, before and after complete lithium de-intercalation.

The lithium de-intercalation process in lithium manganese phosphate ($LiMnPO_4$) is a two-phase reaction. The interfacial stress of the two phases is determined by the lattice change rate before and after lithium de-intercalation. The smaller the lattice change rate, the smaller the interfacial stress and the easier the $Li^+$ transport. Therefore, reducing the lattice change rate of the inner core will be beneficial to enhancing the $Li^+$ transport capacity, thus improving the rate performance of the secondary battery. The positive electrode active material having a core-shell structure of the present application can achieve a lattice change rate of 4% or less before and after lithium de-intercalation, and therefore, the use of the positive electrode active material can improve the rate performance of the secondary battery. The lattice change rate may be measured by a method known in the art, e.g., X-ray diffraction (XRD).

In some embodiments, the positive electrode active material with a core-shell structure has an Li/Mn antisite defect concentration of 4% or less, optionally 2.2% or less, more optionally 1.5-2.2%.

The so-called Li/Mn antisite defects described in the present application means that the positions of $Li^+$ and $Mn^{2+}$ have been exchanged in the $LiMnPO_4$ lattice. Accordingly, the Li/Mn antisite defect concentration refers to the percentage of $Li^+$ exchanged with $Mn^{2+}$ relative to the total amount of $Li^+$. In the present application, the Li/Mn antisite defect concentration can be tested according to JIS K 0131-1996, for example.

The positive electrode active material having a core-shell structure of the present application can achieve the above-mentioned lower Li/Mn antisite defect concentration. Although the mechanism remains quite unclear, the inventors of the present application have speculated that since $Li^+$ and Mn' in the lattice of $LiMnPO_4$ exchange positions and the passage of the $Li^+$ transport is one-dimensional, $Mn^{2+}$ will hardly migrate in the $Li^+$ passage, thereby hindering the $Li^+$ transport. Thus, since the Li/Mn antisite defect concentration of the positive electrode active material having a core-shell structure of the present application is relatively low and within the above range, the prevention of transport of $Li^+$ by $Mn^{2+}$ can be avoided, while increasing the gram capacity and rate performance of the positive electrode active material.

In some embodiments, the positive electrode active material has a compacted density under 3 T of 2.2 $g/cm^3$ or more, optionally 2.2 $g/cm^3$ or more and 2.8 $g/cm^3$ or less. The higher the compacted density, the greater the weight of the active material per unit volume, and therefore, the increased compacted density is beneficial to increasing the volumetric energy density of a battery cell. The compacted density may be measured in accordance with GB/T 24533-2009.

In some embodiments, the positive electrode active material has a surface oxygen valence state of −1.90 or less, optionally −1.90 to −1.98.

The stable valence state of oxygen is originally a valence of −2. The closer the valence state to the valence of −2, the stronger the ability thereof to obtain electrons, that is, the stronger the oxidability thereof. Usually, the surface valence state thereof is −1.7 or less. In the present application, by limiting the surface oxygen valence state of the positive electrode active material within the above range, as described above, the interfacial side reaction between the positive electrode material and the electrolyte solution can be reduced, thereby improving the performance, such as cycling, high-temperature storage and gas production, of the battery cell.

The surface oxygen valence state may be measured by a method known in the art, e.g., by electron energy loss spectroscopy (EELS).

In a second aspect, the present application provides a method for preparing a positive electrode active material, the method comprising the following steps:

a step of providing an inner core material, wherein the inner core has a chemical formula of $Li_{1+x}Mn_{1-y}A_yP_{1-z}R_zO_4$ in which x is any value in a range of −0.100 to 0.100, y is any value in a range of 0.001 to 0.500, z is any value in a range of 0.001 to 0.100, A is one or more elements selected from Zn, Al, Na, K, Mg, Mo, W, Ti, V, Zr, Fe, Ni, Co, Ga, Sn, Sb, Nb, and Ge, optionally one or more elements of Fe, Ti, V, Ni, Co, and Mg, R is one or more elements selected from B, Si, N, and S, and optionally, R is an element selected from B, Si, N, and S;

a coating step, involving respectively providing $Li_aMP_2O_7$ and/or $M_b(P_2O_7)_c$ and $XPO_4$ turbid suspensions, adding the inner core material to the above turbid suspensions, and mixing and sintering same to obtain a positive electrode active material in which $0 \leq a \leq 2$, $1 \leq b \leq 4$, and $1 \leq c \leq 6$, with the values of a, b, and c satisfying the following condition: keeping the crystalline pyrophosphate $Li_aMP_2O_7$ or $M_b(P_2O_7)_c$ electrically neutral; each M is independently one or more elements selected from Fe, Ni, Mg, Co, Cu, Zn, Ti, Ag, Zr, Nb, or Al; and X is one or more elements selected from Li, Fe, Ni, Mg, Co, Cu, Zn, Ti, Ag, Zr, Nb, or Al, wherein the positive electrode active material has a core-shell structure comprising an inner core and a shell coating the inner core, with the shell comprising a first coating layer coating the inner core, a second coating layer coating the first coating layer, and a third coating layer coating the second coating layer, wherein the first coating layer comprises crystalline pyrophosphate $Li_aMP_2O_7$ and/or $M_b(P_2O_7)_c$, the second coating layer comprises crystalline phosphate $XPO_4$, and the third coating layer is carbon.

In some embodiments, the step of providing the inner core material comprises the following steps:

step (1): mixing and stirring a manganese source, an element A dopant, and an acid in a container to obtain manganese salt particles doped with element A; and step (2): mixing the manganese salt particles doped with element A with a lithium source, a phosphorus source, and an element R dopant in a solvent to obtain a slurry, and sintering the slurry under inert gas atmosphere protection to obtain an inner core doped with element A and element R, wherein the inner core doped with element A and element R is $Li_{1+x}Mn_{1-y}A_yP_{1-z}R_zO_4$ in which x is any value in a range of −0.100-0.100, y is any value in a range of 0.001-0.500, z is any value in a range of 0.001 to 0.100, A is one or more elements selected from Zn, Al, Na, K, Mg, Mo, W, Ti, V, Zr, Fe, Ni, Co, Ga, Sn, Sb, Nb, and Ge, optionally one or more elements of Fe, Ti, V, Ni, Co, and Mg, R is one or more elements selected from B, Si, N, and S, and optionally, R is an element selected from B, Si, N, and S.

The preparation method of the present application has no special limitation on the source of the material. The source of an element may include one or more of the elementary substance, sulfate, halide, nitrate, organic acid salt, oxide, or hydroxide of the element, provided that the source can achieve the purpose of the preparation method of the present application.

In some embodiments, the element A dopant is one or more of the respective elementary substances, carbonates, sulfates, chlorides, nitrates, organic acid salts, oxides, and hydroxides of one or more elements selected from Zn, Al, Na, K, Mg, Mo, W, Ti, V, Zr, Fe, Ni, Co, Ga, Sn, Sb, Nb, and Ge.

In some embodiments, the element R dopant is one or more of the respective inorganic acids, -ous acids, organic acids, sulfates, chlorides, nitrates, organic acid salts, oxides, and hydroxides of one or more elements selected from B, Si, N, and S.

In the present application, the manganese source can be a manganese-containing substance known in the art that can be used for preparing lithium manganese phosphate. By way of example, the manganese source may be one or more selected from elemental manganese, manganese dioxide, manganese phosphate, manganese oxalate, and manganese carbonate.

In the present application, the acid can be one or more selected from inorganic acids, such as hydrochloric acid, sulfuric acid, nitric acid, phosphoric acid, silicic acid, siliceous acid; and organic acids, such as oxalic acid. In some embodiments, the acid is a dilute organic acid with a concentration of 60 wt % or less.

In the present application, the lithium source can be a lithium-containing substance known in the art that can be used for preparing lithium manganese phosphate. By way of example, the lithium source is one or more selected from lithium carbonate, lithium hydroxide, lithium phosphate, and lithium dihydrogen phosphate.

In the present application, the phosphorus source can be a phosphorus-containing substance known in the art that can be used for preparing lithium manganese phosphate. By way of example, the phosphorus source is one or more selected from diammonium hydrogen phosphate, ammonium dihydrogen phosphate, ammonium phosphate, and phosphoric acid.

In some optional embodiments, after the manganese source, the element A dopant and the acid react in a solvent to obtain a suspension of a manganese salt doped with element A, the suspension is filtered, dried and sanded to obtain manganese salt particles doped with element A with a particle size of 50-200 nm.

In some optional embodiments, the slurry in step (2) is dried to obtain a powder, and the powder is then sintered to obtain an inner core doped with elements A and R.

In some embodiments, in step (1), the mixing is carried out at a temperature of 20-120° C., optionally 40-120° C.; and/or in step (1), the stirring is carried out at 400-700 rpm for 1-9 h, optionally for 3-7 h.

Optionally, the reaction temperature in step (1) can be carried out at about 30° C., about 50° C., about 60° C., about 70° C., about 80° C., about 90° C., about 100° C., about 110° C., or about 120° C.; the stirring in step (1) is carried out for about 2 hours, about 3 hours, about 4 hours, about hours, about 6 hours, about 7 hours, about 8 hours, or about 9 hours; and optionally, the reaction temperature and stirring time in step (1) can be within any range of any of the above numerical values.

In some embodiments, in step (2), the mixing is carried out at a temperature of 20-120° C., optionally 40-120° C., for 1-12 h. Optionally, the reaction temperature in step (2) can be carried out at about 30° C., about 50° C., about 60° C., about 70° C., about 80° C., about 90° C., about 100° C., about 110° C., or about 120° C.; the mixing in step (2) is carried out for about 2 hours, about 3 hours, about 4 hours, about 5 hours, about 6 hours, about 7 hours, about 8 hours, about 9 hours, about 10 hours, about 11 hours, or about 12 hours; and optionally, the reaction temperature and mixing time in step (2) can be within any range of any of the above numerical values.

When the temperature and time during the preparation of the inner core particles are within the above ranges, the prepared inner core and the positive electrode active material prepared therefrom have fewer lattice defects, which is beneficial to inhibiting manganese dissolution and reducing the interfacial side reaction between the positive electrode active material and the electrolyte solution, thereby improving the cycling performance and safety performance of the secondary battery.

In some embodiments, optionally, during the preparation of dilute acid manganese particles doped with elements A and R, the pH of the solution is controlled to be 3.5-6; optionally, the pH of the solution is controlled to be 4-6; and even more optionally, the pH of the solution is controlled to be 4-5. It should be noted that in the present application, the pH of the obtained mixture can be adjusted by a method commonly used in the art, e.g., by adding an acid or alkali.

In some embodiments, optionally, in step (2), the molar ratio of the manganese salt particles to the lithium source to the phosphorus source is 1:0.5-2.1:0.5-2.1, and more optionally, the molar ratio of the manganese salt particles doped with element A to the lithium source to the phosphorus source is about 1:1:1.

In some embodiments, optionally, the sintering conditions during the preparation of lithium manganese phosphate doped with elements A and R are as follows: sintering at 600-950° C. for 4-10 hours in an atmosphere of an inert gas or an inert gas mixed with hydrogen; optionally, the sintering may be performed at about 650° C., about 700° C., about 750° C., about 800° C., about 850° C., or about 900° C. for about 2 hours, about 3 hours, about 4 hours, about 5 hours, about 6 hours, about 7 hours, about 8 hours, about 9 hours, or about 10 hours; and optionally, the sintering temperature and sintering time can be within any range of any of the above numerical values. During the preparation of lithium manganese phosphate doped with elements A and R, when the sintering temperature is too low and the sintering time is too short, the crystallinity of the inner core of the material will be relatively low, thereby affecting the overall performance, and when the sintering temperature is too high, impurity phases easily appear in the inner core of the material, thereby affecting the overall performance; and when the sintering time is too long, the inner core particles of the material grow larger, thereby affecting the gram capacity, compacted density, rate performance, etc.

In some optional embodiments, optionally, the protective atmosphere is a mixed gas of 70-90 vol % nitrogen and 10-30 vol % hydrogen.

In some embodiments, the coating step comprises:

a first coating step, involving: dissolving an element M source, a phosphorus source and an acid, and optionally a lithium source in a solvent to obtain a first coating layer turbid suspension; fully mixing the inner core obtained in the inner core step with the first coating layer turbid suspension obtained in the first coating step, and drying and then sintering the mixture to obtain a first-coating-layer-coated material;

a second coating step, involving: dissolving an element X source, a phosphorus source, and an acid in a solvent to obtain a second coating layer turbid suspension; and fully mixing the first-coating-layer-coated material obtained in the first coating step with the second coating layer turbid suspension obtained in the second coating step, and drying and then sintering the mixture to obtain a two-coating-layer-coated material; and a third coating step, involving: dissolving the carbon source in a solvent, and after the carbon source is fully dissolved, a third coating layer solution is obtained; and then adding the two-coating-layer-coated material obtained in the second coating step to the third coating layer solution, mixing the mixture until uniform, and drying and then sintering the mixture to obtain a three-coating-layer-coated material, i.e., the positive electrode active material.

In some embodiments, the element M source is one or more of the respective elementary substances, carbonates, sulfates, chlorides, nitrates, organic acid salts, oxides, and hydroxides of one or more elements selected from Fe, Ni, Mg, Co, Cu, Zn, Ti, Ag, Zr, Nb, or Al.

In some embodiments, the element X source is one or more of the respective elementary substances, carbonates, sulfates, chlorides, nitrates, organic acid salts, oxides, and hydroxides of one or more elements selected from Li, Fe, Ni, Mg, Co, Cu, Zn, Ti, Ag, Zr, Nb, or Al.

The added amounts of the respective sources of elements A, R, M, and X depend on the target doping amount, and the ratio between the amounts of the lithium source, the manganese source, and the phosphorus source conforms to a stoichiometric ratio.

By way of example, the carbon source is one or more selected from starch, sucrose, glucose, polyvinyl alcohol, polyethylene glycol, and citric acid.

In some embodiments, in the first coating step, the pH of the solution in which the element M source, the phosphorus source, the acid, and optionally the lithium source are dissolved is controlled to be 3.5-6.5, the solution is then stirred and reacted for 1-5 h, and the solution is then heated to 50-120° C. and maintained at this temperature for 2-10 h and/or sintered at 650-800° C. for 2-6 hours.

Optionally, in the first coating step, the reaction is fully carried out. Optionally, in the first coating step, the reaction is carried out for about 1.5 hours, about 2 hours, about 3 hours, about 4 hours, about 4.5 hours, or about 5 hours. Optionally, in the first coating step, the reaction time of the reaction can be within any range of any of the above numerical values.

Optionally, in the first coating step, the pH of the solution is controlled to be 4-6. Optionally, in the first coating step, the solution is heated to about 55° C., about 60° C., about 70° C., about 80° C., about 90° C., about 100° C., about 110° C., or about 120° C. and maintained at this temperature for about 2 hours, about 3 hours, about 4 hours, about 5 hours, about 6 hours, about 7 hours, about 8 hours, about 9 hours, or about 10 hours; and Optionally, in the first coating step, the temperature raised to and the maintaining time is can be within any range of any of the above numerical values.

Optionally, in the first coating step, the sintering can be carried out at about 650° C., about 700° C., about 750° C., or about 800° C. for about 2 hours, about 3 hours, about 4 hours, about 5 hours, or about 6 hours; and optionally, the sintering temperature and sintering time can be within any range of any of the above numerical values.

In the first coating step, by controlling the sintering temperature and time within the above ranges, the following situations can be avoided: when the sintering temperature in the first coating step is too low and the sintering time is too short, the crystallinity of the first coating layer is low and there are more amorphous substances, leading to compromised effect of inhibiting metal dissolution, thereby affecting the cycling performance and high-temperature storage performance of the secondary battery; when the sintering temperature is too high, impurity phases appear in the first coating layer, and its effect of inhibiting metal dissolution will also be affected, thereby affecting the cycling, high-temperature storage performance, etc., of the secondary battery; and when the sintering time is too long, the thickness of the first coating layer increases, which affects the migration of Li+, thereby affecting the gram capacity, rate performance, etc., of the material.

In some embodiments, the second coating step, an element X source, a phosphorus source, and an acid are dissolved in a solvent, the solution is then stirred and reacted for 1-10 h, and the solution is then heated to 60-150° C. and maintained at this temperature for 2-10 h and/or sintered at 500-700° C. for 6-10 hours.

Optionally, in the second coating step, the reaction is fully carried out. Optionally, in the second coating step, the reaction is carried out for about 1.5 hours, about 2 hours, about 3 hours, about 4 hours, about 4.5 hours, about 5 hours, about 6 hours, about 7 hours, about 8 hours, about 9 hours, or about 10 hours. Optionally, in the second coating step, the reaction time of the reaction can be within any range of any of the above numerical values.

Optionally, in the second coating step, the solution is heated to about 65° C., about 70° C., about 80° C., about 90° C., about 100° C., about 110° C., about 120° C., about 130° C., about 140° C., or about 150° C. and maintained at this temperature for about 2 hours, about 3 hours, about 4 hours, about 5 hours, about 6 hours, about 7 hours, about 8 hours, about 9 hours, or about 10 hours; and optionally, in the second coating step, the temperature raised to and the maintaining time is can be within any range of any of the above numerical values.

In the step of providing the inner core material, the first coating step, and the second coating step, before sintering, i.e., during the preparation of the inner core material with chemical reactions (steps (1)-(2)) and during the preparation of the first coating layer suspension and the second coating layer suspension, the following situations can be avoided by selecting the selected appropriate reaction temperature and reaction time as described above: when the reaction temperature is too low, no reaction can occur or the reaction rate is relatively slow; when the temperature is too high, the product decomposes or forms an impurity phase; when the reaction time is too long, the particle size of the product becomes larger, which may increase the time and difficulty of the subsequent process; and when the reaction time is too short, the reaction is incomplete and less product is obtained.

Optionally, in the second coating step, the sintering can be carried out at about 550° C., about 600° C., or about 700° C. for about 6 hours, about 7 hours, about 8 hours, about 9 hours, or about 10 hours; and optionally, the sintering temperature and sintering time can be within any range of any of the above numerical values.

In the second coating step, by controlling the sintering temperature and time within the above ranges, the following situations can be avoided: when the sintering temperature in the second coating step is too low and the sintering time is too short, the crystallinity of the second coating layer is low and there are more amorphous substances, leading to compromised performance in terms of reducing the surface reactivity of the material, thereby affecting the cycling and high-temperature storage performance, etc., of the secondary battery; when the sintering temperature is too high, impurity phases appear in the second coating layer, and its effect of reducing the surface reactivity of the material will also be affected, thereby affecting the cycling, high-temperature storage performance, etc., of the secondary battery; and when the sintering time is too long, the thickness of the second coating layer increases, which affects the voltage platform of the material, thereby reducing the energy density, etc., of the material.

In some embodiments, the sintering in the third coating step is carried out at 700-800° C. for 6-10 hours. Optionally, in the third coating step, the sintering can be carried out at about 700° C., about 750° C., or about 800° C. for about 6 hours, about 7 hours, about 8 hours, about 9 hours, or about 10 hours; and optionally, the sintering temperature and sintering time can be within any range of any of the above numerical values.

In the third coating step, by controlling the sintering temperature and time within the above ranges, the following situations can be avoided: when the sintering temperature in the third coating step is too low, the graphitization degree of the third coating layer decreases, which affects the electrical conductivity thereof, thereby affecting the gram capacity of the material; when the sintering temperature is too high, the graphitization degree of the third coating layer will be too high, which affects the Li$^+$ transport, thereby affecting the gram capacity, etc., of the material; when the sintering time is too short, the coating layer will be too thin, which affects the electrical conductivity thereof, thereby affecting the gram capacity of the material; and when the sintering time is too long, the coating layer will be too thick, which affects the compacted density, etc., of the material.

In all the above first coating step, the second coating step and the third coating step, the drying is carried out at a drying temperature of 100° C. to 200° C., optionally 110° C. to 190° C., more optionally 120° C. to 180° C., even more optionally 120° C. to 170° C., and most optionally 120° C. to 160° C., and the drying time is 3-9 h, optionally 4-8 h, more optionally 5-7 h, and most optionally about 6 h.

After cycling of a secondary battery manufactured using a positive electrode active material prepared by the method for preparing a positive electrode active material of the present application, the dissolution of Mn and the doping element at the Mn site is reduced, and the high-temperature stability, high-temperature cycling performance and rate performance are improved. In addition, it has a wide range of raw material sources, low costs, and a simple process, facilitating industrialization.

In some embodiments, the positive electrode plate generally comprises a positive electrode current collector and a positive electrode film layer arranged on at least one surface of the positive electrode current collector, wherein the positive electrode film layer comprises a positive electrode active material.

FIG. 1 shows a schematic diagram of a positive electrode plate according to one embodiment. As shown in the figure, a positive electrode plate is provided, comprising a positive electrode current collector 11, a positive electrode film layer 13 arranged on at least one surface 112 of the positive electrode current collector 11, and a conductive undercoat layer 12 positioned between the positive electrode current collector 11 and the positive electrode film layer 13.

By way of example, the positive electrode current collector has two surfaces opposite in its own thickness direction, and the positive electrode film layer is arranged on either or both of the opposite surfaces of the positive electrode current collector.

In some embodiments, the positive electrode current collector can be a metal foil or a composite current collector. For example, as the metal foil, an aluminum foil can be used. The composite current collector may comprise a polymer material substrate layer and a metal layer formed on at least one surface of the polymer material substrate layer. The composite current collector can be formed by forming a metal material (aluminum, an aluminum alloy, nickel, a nickel alloy, titanium, a titanium alloy, silver and a silver alloy, etc.) on a polymer material substrate (such as polypropylene (PP), polyethylene terephthalate (PET), polybutylene terephthalate (PBT), polystyrene (PS), polyethylene (PE), etc.).

In some embodiments, the positive electrode film layer further optionally comprises a binder. By way of example, the binder may include at least one of polyvinylidene fluoride (PVDF), polytetrafluoroethylene (PTFE), vinylidene fluoride-tetrafluoroethylene-propylene terpolymer, vinylidene fluoride-hexafluoropropylene-tetrafluoroethylene terpolymer, tetrafluoroethylene-hexafluoropropylene copolymer, and fluorine-containing acrylate resin.

In some embodiments, the positive electrode film layer further optionally comprises a conductive agent. By way of example, the conductive agent may include at least one of superconducting carbon, acetylene black, carbon black, Ketjen black, carbon dots, carbon nanotubes, graphene, and carbon nanofibers.

In some embodiments, the positive electrode plate can be prepared by: dispersing the above-mentioned components for preparing the positive electrode plate, such as a positive electrode active material, a conductive agent, a binder and any other components, in a solvent (e.g., N-methyl pyrrolidone) to form a positive electrode slurry; and coating the positive electrode current collector with the positive electrode slurry, followed by procedures such as drying and cold pressing to obtain the positive electrode plate.

[Negative Electrode Plate]

The negative electrode plate comprises a negative electrode current collector and a negative electrode film layer arranged on at least one surface of the negative electrode current collector, wherein the negative electrode film layer comprises a negative electrode active material.

By way of example, the negative electrode current collector has two surfaces opposite in its own thickness direction, and the negative electrode film layer is arranged on either or both of the two opposite surfaces of the negative electrode current collector.

In some embodiments, the negative electrode current collector may be a metal foil or a composite current collector. For example, as the metal foil, a copper foil can be used. The composite current collector may comprise a polymer material substrate layer and a metal layer formed on at least one surface of the polymer material substrate. The composite current collector can be formed by forming a metal material (copper, a copper alloy, nickel, a nickel alloy, titanium, a titanium alloy, silver and a silver alloy, etc.) on a polymer material substrate (e.g., polypropylene (PP), polyethylene terephthalate (PET), polybutylene terephthalate (PBT), polystyrene (PS), polyethylene (PE), etc.).

In some embodiments, the negative electrode active material can be a negative electrode active material known in the art for batteries. By way of example, the negative electrode active material may include at least one of the following materials: artificial graphite, natural graphite, soft carbon, hard carbon, a silicon-based material, a tin-based material and lithium titanate, etc. The silicon-based material may be at least one selected from elemental silicon, silicon-oxygen compounds, silicon carbon composites, silicon nitrogen composites and silicon alloys. The tin-based material may be at least one selected from elemental tin, tin-oxygen compounds, and tin alloys. However, the present application is not limited to these materials, and other conventional materials that can be used as negative electrode active materials for batteries can also be used. These negative electrode active materials may be used alone or as a combination of two or more.

In some embodiments, the negative electrode film layer further optionally comprise a binder. By way of example, the binder may be at least one selected from a styrene butadiene rubber (SBR), polyacrylic acid (PAA), sodium polyacrylate (PAAS), polyacrylamide (PAM), polyvinyl alcohol (PVA), sodium alginate (SA), polymethacrylic acid (PMAA), and carboxymethyl chitosan (CMCS).

In some embodiments, the negative electrode film layer further optionally comprises a conductive agent. By way of example, the conductive agent may be at least one selected from superconducting carbon, acetylene black, carbon black, Ketjen black, carbon dots, carbon nanotubes, graphene, and carbon nanofibers.

In some embodiments, the negative electrode film layer further optionally comprises other auxiliary agents, such as a thickening agent (e.g. sodium carboxymethyl cellulose (CMC-Na)).

In some embodiments, the negative electrode plate can be prepared by: dispersing the above-mentioned components for preparing the negative electrode plate, such as a negative electrode active material, a conductive agent, a binder and any other components, in a solvent (e.g., deionized water) to form a negative electrode slurry; and coating a negative electrode current collector with the negative electrode slurry, followed by procedures such as drying and cold pressing to obtain the negative electrode plate.

[Electrolyte]

The electrolyte functions to conduct ions between the positive electrode plate and the negative electrode plate. The type of the electrolyte is not specifically limited in the present application and can be selected according to actual requirements. For example, the electrolyte may be in a liquid state, a gel state, or an all-solid state.

In some embodiments, the electrolyte is liquid and comprises an electrolyte salt and a solvent.

In some embodiments, the electrolyte salt may be at least one selected from lithium hexafluorophosphate, lithium tetrafluoroborate, lithium perchlorate, lithium hexafluoroarsenate, lithium bisfluorosulfonimide, lithium bistrifluoromethanesulfonimide, lithium trifluoromethanesulfonate, lithium difluorophosphate, lithium difluorooxalate borate, lithium dioxalate borate, lithium difluorodioxalate phosphate, and lithium tetrafluorooxalate phosphate.

In some embodiments, the solvent may be at least one selected from ethylene carbonate, propylene carbonate, ethyl methyl carbonate, diethyl carbonate, dimethyl carbonate, dipropyl carbonate, methyl propyl carbonate, ethyl propyl carbonate, butylene carbonate, fluoroethylene carbonate, methyl formate, methyl acetate, ethyl acetate, propyl acetate, methyl propionate, ethyl propionate, propyl propionate, methyl butyrate, ethyl butyrate, 1,4-butyrolactone, sulfolane, dimethyl sulfone, ethyl methyl sulfone, and diethyl sulfone.

In some embodiments, the electrolyte solution further optionally comprises an additive. By way of example, the additive may include a negative electrode film-forming additive and a positive electrode film-forming additive, and may further include an additive that can improve some properties of a battery, such as an additive that improves the overcharge performance of a battery, or an additive that improves the high-temperature performance or low-temperature performance of a battery.

[Separator]

In some embodiments, the secondary battery further comprises a separator. The type of the separator is not particularly limited in the present application, and any well known porous-structured separator with good chemical stability and mechanical stability may be selected.

In some embodiments, the material of the separator may be at least one selected from glass fibers, non-woven fabrics, polyethylene, polypropylene, and polyvinylidene fluoride. The separator may be either a single-layer thin film or a multi-layer composite thin film and is not particularly limited. When the separator is a multi-layer composite thin film, the materials in the respective layers may be same or different are not particularly limited.

In some embodiments, an electrode assembly may be formed by a positive electrode plate, a negative electrode plate, and a separator by a winding process or a stacking process.

In some embodiments, the secondary battery may comprise an outer package. The outer package can be used to encapsulate the above-mentioned electrode assembly and electrolyte.

In some embodiments, the outer package of the secondary battery can be a hard shell, such as a hard plastic shell, an aluminum shell, or a steel shell. The outer package of the secondary battery may also be a soft bag, such as a pouch-type soft bag. The material of the soft bag may be a plastic, and examples of the plastic may include polypropylene, polybutylene terephthalate, polybutylene succinate, etc.

Figure 3:
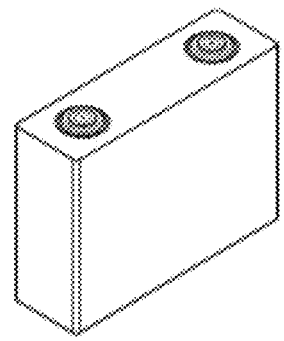
FIG. 3 is a schematic diagram of a secondary battery according to an embodiment of the present application.

The shape of the secondary battery is not particularly limited in the present application and may be cylindrical, square, or any other shape. For example, FIG. 3 shows a secondary battery 5 with an exemplary square structure.

Figure 4:
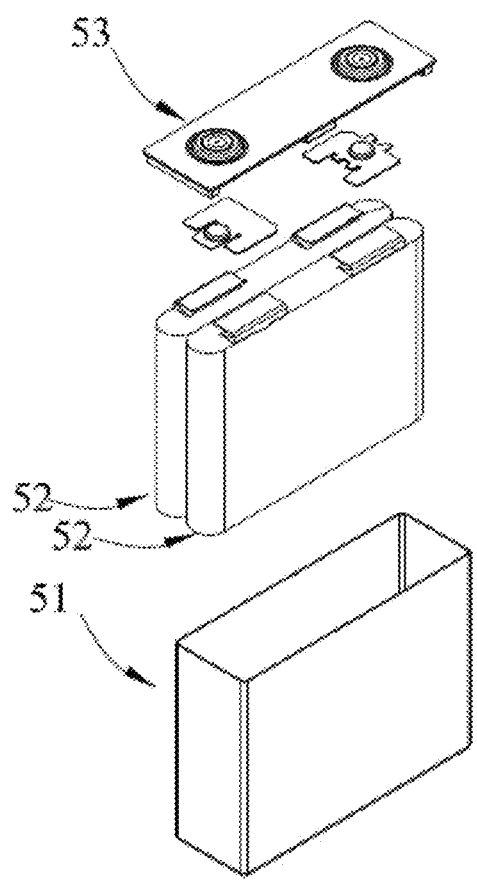
FIG. 4 is an exploded view of a secondary battery according to an embodiment of the present application as shown in FIG. 3.

In some embodiments, with reference to FIG. 4, the outer package may comprise a housing 51 and a cover plate 53. Herein, the housing 51 may comprise a bottom plate and side plates connected to the bottom plate, and the bottom plate and the side plates enclose to form an accommodating cavity. The housing 51 has an opening in communication with the accommodating cavity, and the cover plate 53 can cover the opening to close the accommodating cavity. The positive electrode plate, the negative electrode plate, and the separator can be subjected to a winding process or a stacking process to form an electrode assembly 52. The electrode assembly 52 is encapsulated in the accommodating cavity. The electrolyte solution infiltrates the electrode assembly 52. The number of the electrode assemblies 52 contained in the secondary battery 5 may be one or more and can be selected by those skilled in the art according to actual requirements.

In some embodiments, the secondary battery can be assembled into a battery module, the number of the secondary batteries contained in the battery module may be one or more, and the specific number can be selected by those skilled in the art according to the application and capacity of the battery module.

Figure 5:
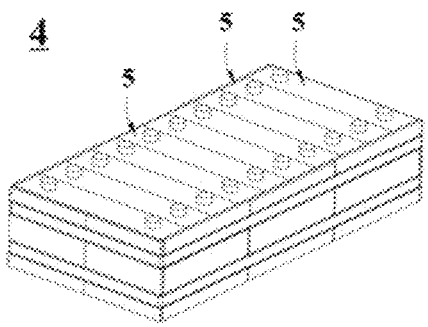
FIG. 5 is a schematic diagram of a battery module according to an embodiment of the present application.

FIG. 5 is an exemplary battery module 4. Referring to FIG. 5, in the battery module 4, a plurality of secondary batteries 5 may be sequentially arranged in the length direction of the battery module 4. Apparently, the secondary batteries may also be arranged in any other manner. Furthermore, the plurality of secondary batteries 5 may be fixed by fasteners.

Optionally, the battery module 4 may further comprise a housing with an accommodating space, and a plurality of secondary batteries 5 are accommodated in the accommodating space.

In some embodiments, the above battery module may also be assembled into a battery pack, the number of the battery modules contained in the battery pack may be one or more, and the specific number can be selected by those skilled in the art according to the application and capacity of the battery pack.

Figure 6:
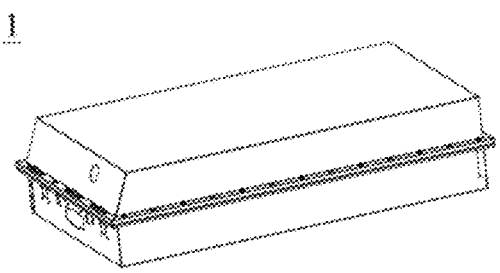
FIG. 6 is a schematic diagram of a battery pack according to an embodiment of the present application.
Figure 7:
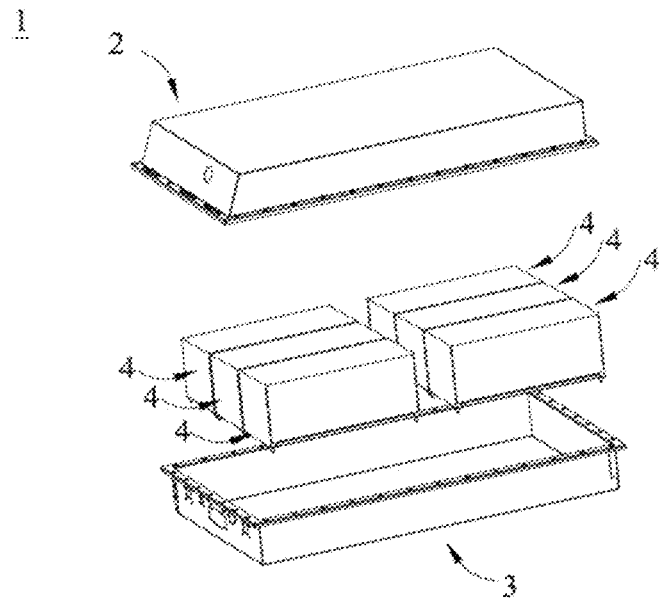
FIG. 7 is an exploded view of a battery pack according to an embodiment of the present application as shown in FIG. 6.

FIGS. 6 and 7 show an exemplary battery pack 1. Referring to FIG. 6 and FIG. 7, the battery pack 1 may comprise a battery case and a plurality of battery modules 4 arranged in the battery case. The battery case comprises an upper case body 2 and a lower case body 3, wherein the upper case body 2 can cover the lower case body 3 to form a closed space for accommodating the battery modules 4. A plurality of battery modules 4 may be arranged in the battery case in any manner.

In addition, the present application further provides a power consuming device. The power consuming device comprises at least one of the secondary battery, battery module, or battery pack provided by the present application. The secondary battery, battery module or battery pack can be used as a power source of the power consuming device or as an energy storage unit of the power consuming device. The power consuming device may include a mobile device (e.g., a mobile phone, a laptop computer, etc.), an electric vehicle (e.g., a pure electric vehicle, a hybrid electric vehicle, a plug-in hybrid electric vehicle, an electric bicycle, an electric scooter, an electric golf cart, an electric truck, etc.), an electric train, ship, and satellite, an energy storage system, etc., but is not limited thereto.

As for the power consuming device, the secondary battery, battery module or battery pack can be selected according to the usage requirements thereof.

Figure 8:
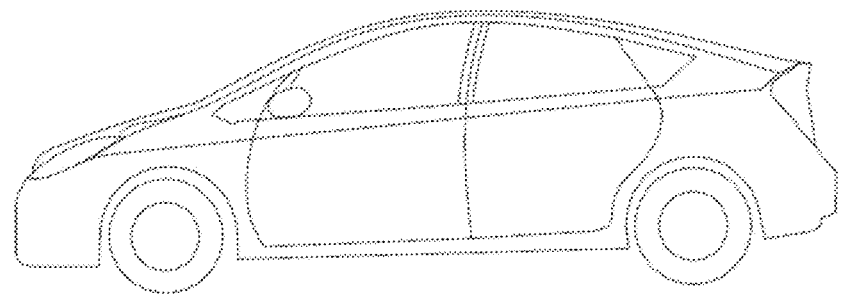
FIG. 8 is a schematic diagram of a power consuming device, in which a secondary battery is used as a power source, according to an embodiment of the present application.

FIG. 8 shows an exemplary power consuming device. The power consuming device may be a pure electric vehicle, a hybrid electric vehicle, a plug-in hybrid electric vehicle, etc. In order to meet the requirements of the power consuming device for a high power and a high energy density of a secondary battery, a battery pack or a battery module may be used.

Specific examples about the novel positive electrode active material

Hereinafter, the examples of the present application will be explained. The examples described below are exemplary, are merely for explaining the present application, and should not be construed as limiting the present application. Examples in which no specific techniques or conditions are indicated are based on techniques or conditions described in documents in the art or according to product instructions. The reagents or instruments used therein for which no manufacturers are not specified are all conventional products that are commercially available. The content of each component in the examples of the present disclosure is based on the mass without crystal water, unless otherwise stated.

The sources of the raw materials involved in the examples of the present application are as follows:

| Name | Chemical formula | Manufacturer | Specification |
|---|---|---|---|
| Manganese carbonate | $MnCO_3$ | Shandong Xiya Chemical Industry Co., Ltd. | 1 Kg |
| Lithium carbonate | $Li_2CO_3$ | Shandong Xiya Chemical Industry Co., Ltd. | 1 Kg |
| Magnesium carbonate | $MgCO_3$ | Shandong Xiya Chemical Industry Co., Ltd. | 1 Kg |
| Zinc carbonate | $ZnCO_3$ | Wuhan Xinru Chemical Co., Ltd. | 25 Kg |
| Ferrous carbonate | $FeCO_3$ | Xi'an Lanzhiguang Fine Materials Co., Ltd. | 1 Kg |
| Nickel sulfate | $NiCO_3$ | Shandong Xiya Chemical Industry Co., Ltd. | 1 Kg |
| Titanium sulfate | $Ti(SO_4)_2$ | Shandong Xiya Chemical Industry Co., Ltd. | 1 Kg |
| Cobalt sulfate | $CoSO_4$ | Xiamen Zhixin Chemical Co., Ltd. | 500 g |
| Vanadium dichloride | $VCl_2$ | Shanghai Jinjinle Industrial Co., Ltd. | 1 Kg |
| Oxalic acid dihydrate | $C_2H_2O_4 \cdot 2(H_2O)$ | Shanghai Jinjinle Industrial Co., Ltd. | 1 Kg |
| Ammonium dihydrogen phosphate | $NH_4H_2PO_4$ | Shanghai Chengshao Biotechnology Co., Ltd. | 500 g |

| Name | Chemical formula | Manufacturer | Specification |
|---|---|---|---|
| Sucrose | $C_{12}H_{22}O_{11}$ | Shanghai Yuanye Biotechnology Co., Ltd. | 100 g |
| Dilute sulfuric acid | $H_2SO_4$ | Shenzhen Hisian Biotechnology Co., Ltd. | Mass fraction 60% |
| Dilute nitric acid | $HNO_3$ | Anhui Lingtian Fine Chemical Co., Ltd. | Mass fraction 60% |
| Siliceous acid | $H_2SiO_3$ | Shanghai Yuanye Biotechnology Co., Ltd. | 100 g, mass fraction 99.8% |

I. Manufacturing of Battery

Example 1

Step 1: Preparation of Positive Electrode Active Material

Step S1: Preparation of Fe, Co, V, and S Co-Doped Manganese Oxalate 689.6 g of manganese carbonate, 455.27 g of ferrous carbonate, 4.65 g of cobalt sulfate, and 4.87 g of vanadium dichloride were fully mixed for 6 h in a mixer. The resulting mixture was then transferred to a reaction kettle, 5 L of deionized water and 1260.6 g of oxalic acid dihydrate were added, heated to 80° C., then fully stirred for 6 h at a rotation speed of 500 rpm and uniformly mixed until the reaction was completed (no bubbles were generated) to obtain an Fe, Co, and V co-doped manganese oxalate suspension. Then, the suspension was filtered, dried at 120° C., and then sanded to obtain manganese oxalate particles with a particle size of 100 nm.

Step S2: Preparation of Inner Core $Li_{0.997}Mn_{0.60}Fe_{0.393}V_{0.004}Co_{0.003}P_{0.997}S_{0.003}O_4$ 1793.1 g of manganese oxalate prepared in (1), 368.3 g of lithium carbonate, 1146.6 g of ammonium dihydrogen phosphate, and 4.9 g of dilute sulfuric acid were added to 20 L of deionized water, fully stirred, uniformly mixed and reacted at 80° C. for 10 h to obtain a slurry. The slurry was transferred to a spray drying apparatus for spray-drying granulation and dried at a temperature of 250° C. to obtain a powder. In a protective atmosphere (90% of nitrogen and 10% of hydrogen), the powder was sintered in a roller kiln at 700° C. for 4 h to obtain the above inner core material.

Step S3: Preparation of First Coating Layer Turbid Suspension

Preparation of a $Li_2FeP_2O_7$ solution: 7.4 g of lithium carbonate, 11.6 g of ferrous carbonate, 23.0 g of ammonium dihydrogen phosphate, and 12.6 g of oxalic acid dihydrate were dissolved in 500 mL of deionized water, the pH was controlled to be 5, the mixture was then stirred and reacted at room temperature for 2 h to obtain a solution, and the solution was then heated to 80° C. and maintained at this temperature for 4 h to obtain a first coating layer turbid suspension.

Step S4: Coating with First Coating Layer 1571.9 g of the doped lithium manganese phosphate inner core material obtained in step S2 was added to the first coating layer turbid suspension (the content of the coating substance was 15.7 g) obtained in step S3, fully stirred and mixed for 6 h; and after being uniformly mixed, the mixture was transferred to an oven at 120° C., dried for 6 h, and then sintered at 650° C. for 6 h to obtain a pyrophosphate-coated material.

Step S5: Preparation of Second Coating Layer Turbid Suspension 3.7 g of lithium carbonate, 11.6 g of ferrous carbonate, 11.5 g of ammonium dihydrogen phosphate, and 12.6 g of oxalic acid dihydrate were dissolved in 1500 mL of deionized water, these materials were stirred and reacted for 6 h to obtain a solution, and then, the solution was heated to 120° C. and maintained at this temperature for 6 h to obtain a second coating layer turbid suspension.

Step S6: Coating with Second Coating Layer 1586.8 g of the pyrophosphate-coated material obtained in step S4 was added to the second coating layer turbid suspension (the content of the coating substance was 47.1 g) obtained in step S5, fully stirred and mixed for 6 h; and after being uniformly mixed, the mixture was transferred to an oven at 120° C., dried for 6 h, and then sintered at 700° C. for 8 h to obtain a two-layer-coated material.

Step S7: Preparation of Aqueous Solution for Third Coating Layer 37.3 g of sucrose was dissolved in 500 g of deionized water, then stirred and fully dissolved to obtain an aqueous sucrose solution.

Step S8: Coating with Third Coating Layer 1633.9 g of the two-layer-coated material obtained in step S6 was added to the sucrose solution obtained in step S7, stirred together and mixed for 6 h; and after being uniformly mixed, the mixture was transferred to an oven at 150° C., dried for 6 h, and then sintered at 700° C. for 10 h to obtain a three-layer-coated material.

Step 2: Preparation of Positive Electrode Plate

The three-layer-coated positive electrode active material prepared above, the conductive agent acetylene black, and the binder polyvinylidene fluoride (PVDF) were added to N-methylpyrrolidone (NMP) at a weight ratio of 97.0:1.2:1.8, and after stirring and uniform mixing, a positive electrode slurry was obtained. The positive electrode slurry was uniformly applied to an aluminum foil at 0.280 g/1540.25 $mm^2$, and after drying, cold pressing, and slitting, the positive electrode plate was obtained.

Step 3: Preparation of Negative Electrode Plate

The negative electrode active substances artificial graphite and hard carbon, the conductive agent acetylene black, the binder styrene butadiene rubber (SBR), and the thickening agent sodium carboxymethylcellulose (CMC) were dissolved in deionized water as a solvent at a weight ratio of 90:5:2:2:1, and after stirring and uniform mixing, a negative electrode slurry was prepared. The negative electrode slurry was uniformly applied to a negative electrode current collector copper foil at 0.117 g/1540.25 $mm^2$, and after drying, cold pressing, and slitting, the negative electrode plate was obtained.

Step 4: Preparation of Electrolyte Solution

In an argon atmosphere glove box ($H_2O<0.1$ ppm and $O_2<0.1$ ppm), the organic solvent ethylene carbonate (EC)/ethyl methyl carbonate (EMC) was uniformly mixed at a volume ratio of 3/7, and 12.5 wt % (based on the weight of the solvent ethylene carbonate/ethyl methyl carbonate) of $LiPF_6$ was dissolved in the above organic solvent and uniformly stirred to obtain the electrolyte solution.

Step 5: Preparation of Separator

A commercially available PP-PE copolymer microporous thin film having a thickness of 20 μm and an average pore size of 80 nm (Model 20, from Zhuogao Electronic Technology Co. Ltd.) was used.

Step 6: Manufacturing of Full Battery

The above obtained positive electrode plate, separator, and negative electrode plate were stacked in this order, such that the separator was located between the positive electrode plate and the negative electrode plate and played a role of isolation, and the stack was then wound to obtain a bare battery cell. The bare battery cell was placed in an outer package, which was injected with the above electrolyte solution and packaged to obtain the full battery (hereinafter also referred to as "quandian" in Chinese).

[Manufacturing of Button-Type Battery]

The positive electrode active material prepared above, polyvinylidene fluoride (PVDF) and acetylene black at a weight ratio of 90:5:5 were added to N-methylpyrrolidone (NMP) and stirred in a drying room to make a slurry. An aluminum foil was coated with the above slurry, and after drying and cold pressing, a positive electrode plate was obtained. The applying amount was 0.02 $g/cm^2$ and the compacted density was 2.0 $g/cm^3$.

A lithium plate was used as a negative electrode, a solution of 1 mol/L $LiPF_6$ in ethylene carbonate (EC), diethyl carbonate (DEC) and dimethyl carbonate (DMC) at a volume ratio of 1:1:1 was used as an electrolyte solution, and the lithium plate and the electrolyte solution were assembled, together with the positive electrode plate prepared above, in a button battery case to form a button-type battery (hereinafter also referred to as "button battery").

Examples 2-27 and Comparative Examples 1-19

The positive electrode active materials and batteries in Examples 2 to 27 and Comparative Examples 1 to 19 were prepared in a manner similar to Example 1, except for the preparation of the positive electrode active material, as shown in Tables 1-6, wherein in Comparative Examples 1-2, 4-10, and 12, no first layer was applied, so there were no steps S3 and S4; and in Comparative Examples 1-11, no second layer was applied, so there were no steps S5-S6.

Note: In all the examples and comparative examples of the present application, if not indicated, the first coating layer substance and/or the second coating layer substance used were crystalline by default.

TABLE 1

Raw materials for the preparation of the inner core

| No. | Inner core | Raw materials used in step S1 | Raw materials used in step S2 |
| --- | --- | --- | --- |
| Comparative Examples 1 and 13 | $LiMnPO_4$ | Manganese carbonate, 1149.3 g; water, 5 L; oxalic acid dihydrate, 1260.6 g; | Manganese oxalate dihydrate obtained in step S1 (as $C_2O_4Mn \cdot 2H_2O$), 1789.6 g; lithium carbonate, 369.4 g; ammonium dihydrogen phosphate, 1150.1 g; water, 20 L |
| Comparative Example 2 | $LiMn_{0.60}Fe_{0.40}PO_4$ | Manganese carbonate, 689.6 g; ferrous carbonate, 463.4 g; water, 5 L; oxalic acid dihydrate, 1260.6 g; | Iron manganese oxalate dihydrate obtained in step S1 (as $C_2O_4Mn_{0.60}Fe_{0.40} \cdot 2H_2O$), 1793.2 g; lithium carbonate, 369.4 g; ammonium dihydrogen phosphate, 1150.1 g; water, 20 L |
| Comparative Example 3 | $LiMn_{0.80}Fe_{0.20}PO4$ | Manganese carbonate, 919.4 g; ferrous carbonate, 231.7 g; water, 5 L; oxalic acid dihydrate, 1260.6 g; | Iron manganese oxalate dihydrate obtained in step S1 (as $C_2O_4Mn_{0.80}Fe_{0.20} \cdot 2H_2O$), 1791.4 g; lithium carbonate, 369.4 g; ammonium dihydrogen phosphate, 1150.1 g; water, 20 L |
| Comparative Example 4 | $LiMn_{0.70}Fe_{0.295}V_{0.005}PO_4$ | Manganese carbonate, 804.5 g; ferrous carbonate, 341.8 g; vanadium dichloride, 6.1 g; water, 5 L; oxalic acid dihydrate, 1260.6 g; | Vanadium iron manganese oxalate dihydrate obtained in step S1 (as $C_2O_4Mn_{0.70}Fe_{0.295}V_{0.005} \cdot 2H_2O$), 1792.0 g; lithium carbonate, 369.4 g; ammonium dihydrogen phosphate, 1150.1 g; water, 20 L |
| Comparative Examples 5 and 15 | $LiMn_{0.60}Fe_{0.395}Mg_{0.005}PO_4$ | Manganese carbonate, 689.6 g; ferrous carbonate, 457.6 g; magnesium carbonate, 4.2 g; water, 5 L; oxalic acid dihydrate, 1260.6 g; | Magnesium iron manganese oxalate dihydrate obtained in step S1 (as $C_2O_4Mn_{0.60}Fe_{0.395}Mg_{0.005} \cdot 2H_2O$), 1791.6 g; lithium carbonate, 369.4 g; ammonium dihydrogen phosphate, 1150.1 g; water, 20 L |
| Comparative Example 6 | $LiMn_{0.60}Fe_{0.35}Ni_{0.05}PO_4$ | Manganese carbonate, 689.6 g; ferrous carbonate, 405.4 g; nickel carbonate, 59.3 g; water, 5 L; oxalic acid dihydrate, 1260.6 g; | Nickel manganese oxalate dihydrate obtained in step S1 (as $C_2O_4Mn_{0.60}Fe_{0.35}Ni_{0.05} \cdot 2H_2O$), 1794.6 g; lithium carbonate, 369.4 g; ammonium dihydrogen phosphate, 1150.1 g; water, 20 L |
| Comparative Examples 7 and 9 | $LiMn_{0.60}Fe_{0.395}V_{0.002}Ni_{0.003}PO_4$ | Manganese carbonate, 689.6 g; ferrous carbonate, 457.6 g; vanadium dichloride, | Nickel vanadium iron manganese oxalate dihydrate obtained in step S1 (as $C_2O_4Mn_{0.60}Fe_{0.395}V_{0.002}Ni_{0.003} \cdot 2H_2O$), |

TABLE 1-continued

Raw materials for the preparation of the inner core

| No. | Inner core | Raw materials used in step S1 | Raw materials used in step S2 |
|---|---|---|---|
| Comparative Example 8 | $LiMn_{0.60}Fe_{0.395}V_{0.002}Mg_{0.003}PO_4$ | 2.4 g; nickel carbonate, 3.6 g; water, 5 L; oxalic acid dihydrate, 1260.6 g; Manganese carbonate, 689.6 g; ferrous carbonate, 457.6 g; vanadium dichloride, 2.4 g; magnesium carbonate, 2.53 g; water, 5 L; oxalic acid dihydrate, 1260.6 g; | 1793.2 g; lithium carbonate, 369.4 g; ammonium dihydrogen phosphate, 1150.1 g; water, 20 L Magnesium vanadium iron manganese oxalate dihydrate obtained in step S1 (as $C_2O_4Mn_{0.60}Fe_{0.395}V_{0.002}Mg_{0.003} \cdot 2H_2O$), 1792.1 g; lithium carbonate, 369.4 g; ammonium dihydrogen phosphate, 1150.1 g; water, 20 L |
| Comparative Examples 10-12, 16, and 17 and Examples 1-10 | $Li_{0.997}Mn_{0.60}Fe_{0.393}V_{0.004}Co_{0.003}P_{0.997}S_{0.003}O_4$ | Manganese carbonate, 689.6 g; ferrous carbonate, 455.3 g; cobalt sulfate, 4.7 g; vanadium dichloride, 4.9 g; water, 5 L; oxalic acid dihydrate, 1260.6 g; | Cobalt vanadium iron manganese oxalate dihydrate obtained in step S1 (as $C_2O_4Mn_{0.60}Fe_{0.393}V_{0.004}Co_{0.003} \cdot 2H_2O$), 1793.1 g; lithium carbonate, 368.3 g; ammonium dihydrogen phosphate, 1146.6 g; dilute sulfuric acid, 4.9 g; water, 20 L |
| Comparative Example 14 | $Li_{1.2}MnP_{0.8}Si_{0.2}O_4$ | Manganese carbonate, 1149.3 g; water, 5 L; oxalic acid dihydrate, 1260.6 g; | Manganese oxalate dihydrate obtained in step S1 (as $C_2O_4Mn \cdot 2H_2O$), 1789.6 g; lithium carbonate, 443.3 g; ammonium dihydrogen phosphate, 920.1 g; Siliceous acid, 156.2 g; water, 20 L |
| Example 11 | $Li_{1.001}Mn_{0.60}Fe_{0.393}V_{0.004}Co_{0.003}P_{0.999}Si_{0.001}O_4$ | Manganese carbonate, 689.6 g; ferrous carbonate, 455.3 g; cobalt sulfate, 4.7 g; vanadium dichloride, 4.9 g; water, 5 L; oxalic acid dihydrate, 1260.6 g; | Cobalt vanadium iron manganese oxalate dihydrate obtained in step S1 (as $C_2O_4Mn_{0.60}Fe_{0.393}V_{0.004}Co_{0.003} \cdot 2H_2O$), 1793.1 g; lithium carbonate, 369.8 g; ammonium dihydrogen phosphate, 1148.9 g; Siliceous acid, 0.8 g; water, 20 L |
| Example 12 | $LiMn_{0.60}Fe_{0.393}V_{0.004}Co_{0.003}P_{0.998}N_{0.002}O_4$ | Manganese carbonate, 689.6 g; ferrous carbonate, 455.3 g; cobalt sulfate, 4.7 g; vanadium dichloride, 4.9 g; water, 5 L; oxalic acid dihydrate, 1260.6 g; | Cobalt vanadium iron manganese oxalate dihydrate obtained in step S1 (as $C_2O_4Mn_{0.60}Fe_{0.393}V_{0.004}Co_{0.003} \cdot 2H_2O$), 1793.1 g; lithium carbonate, 369.4 g; ammonium dihydrogen phosphate, 1147.8 g; dilute nitric acid, 2.7 g; water, 20 L |
| Example 13 | $Li_{0.995}Mn_{0.65}Fe_{0.341}V_{0.004}Co_{0.005}P_{0.995}S_{0.005}O_4$ | Manganese carbonate, 747.1 g; ferrous carbonate, 395.1 g; cobalt sulfate, 7.8 g; vanadium dichloride, 4.9 g; water, 5 L; oxalic acid dihydrate, 1260.6 g; | Cobalt vanadium iron manganese oxalate dihydrate obtained in step S1 (as $C_2O_4Mn_{0.65}Fe_{0.341}V_{0.004}Co_{0.005} \cdot 2H_2O$), 1792.7 g; lithium carbonate, 367.6 g; ammonium dihydrogen phosphate, 1144.3 g; dilute sulfuric acid, 8.2 g; water, 20 L |
| Example 14 | $Li_{1.002}Mn_{0.70}Fe_{0.293}V_{0.004}Co_{0.003}P_{0.998}Si_{0.002}O_4$ | Manganese carbonate, 804.6 g; ferrous carbonate, 339.5 g; cobalt sulfate, 4.7 g; vanadium dichloride, 4.9 g; water, 5 L; oxalic acid dihydrate, 1260.6 g; | Cobalt vanadium iron manganese oxalate dihydrate obtained in step S1 (as $C_2O_4Mn_{0.70}Fe_{0.293}V_{0.004}Co_{0.003} \cdot 2H_2O$), 1792.2 g; lithium carbonate, 370.2 g; 1147.8; Siliceous acid, 1.6 g; water, 20 L |
| Examples 15 and 17 | $LiMn_{0.60}Fe_{0.393}V_{0.004}Co_{0.003}P_{0.999}N_{0.001}O_4$ | Manganese carbonate, 689.6 g; ferrous carbonate, 455.3 g; cobalt sulfate, 4.7 g; vanadium dichloride, 4.9 g; water, 5 L; oxalic acid dihydrate, 1260.6 g; | Cobalt vanadium iron manganese oxalate dihydrate obtained in step S1 (as $C_2O_4Mn_{0.60}Fe_{0.393}V_{0.004}Co_{0.003} \cdot 2H_2O$), 1793.1 g; lithium carbonate, 369.4 g; ammonium dihydrogen phosphate, 1148.9 g; dilute nitric acid, 1.4 g; water, 20 L |
| Example 16 | $Li_{0.997}Mn_{0.60}Fe_{0.393}V_{0.004}Co_{0.003}P_{0.997}S_{0.003}O_4$ | Manganese carbonate, 689.6 g; ferrous | Cobalt vanadium iron manganese oxalate dihydrate |

TABLE 1-continued

Raw materials for the preparation of the inner core

| No. | Inner core | Raw materials used in step S1 | Raw materials used in step S2 |
|---|---|---|---|
| | | carbonate, 455.3 g; cobalt sulfate, 4.7 g; vanadium dichloride, 4.9 g; water, 5 L; oxalic acid dihydrate, 1260.6 g; | obtained in step S1 (as $C_2O_4Mn_{0.60}Fe_{0.393}V_{0.004}Co_{0.003} \cdot 2H_2O$), 1793.1 g; lithium carbonate, 368.7 g; ammonium dihydrogen phosphate, 1146.6 g; dilute sulfuric acid, 4.9 g; water, 20 L |
| Example 18 | $LiMn_{0.60}Fe_{0.393}V_{0.004}Mg_{0.003}P_{0.995}N_{0.005}O_4$ | Manganese carbonate, 689.6 g; ferrous carbonate, 455.3 g; magnesium carbonate, 2.5 g; vanadium dichloride, 4.9 g; water, 5 L; oxalic acid dihydrate, 1260.6 g; | Magnesium vanadium iron manganese oxalate dihydrate obtained in step S1 (as $C_2O_4Mn_{0.60}Fe_{0.393}V_{0.004}Mg_{0.003} \cdot 2H_2O$), 1791.1 g; lithium carbonate, 369.4 g; ammonium dihydrogen phosphate, 1144.3 g; dilute nitric acid, 7.0 g; water, 20 L |
| Example 19 | $Li_{0.999}Mn_{0.60}Fe_{0.393}V_{0.004}Mg_{0.003}P_{0.999}S_{0.001}O_4$ | Manganese carbonate, 689.6 g; ferrous carbonate, 455.3 g; magnesium carbonate, 2.5 g; vanadium dichloride, 4.9 g; water, 5 L; oxalic acid dihydrate, 1260.6 g; | Magnesium vanadium iron manganese oxalate dihydrate obtained in step S1 (as $C_2O_4Mn_{0.60}Fe_{0.393}V_{0.004}Mg_{0.003} \cdot 2H_2O$), 1791.1 g; lithium carbonate, 369.0 g; ammonium dihydrogen phosphate, 1148.9 g; dilute sulfuric acid, 1.6 g; water, 20 L |
| Example 20 | $Li_{0.998}Mn_{0.60}Fe_{0.393}V_{0.004}Ni_{0.003}P_{0.998}S_{0.002}O_4$ | Manganese carbonate, 689.6 g; ferrous carbonate, 455.3 g; nickel carbonate, 3.6 g; vanadium dichloride, 4.9 g; water, 5 L; oxalic acid dihydrate, 1260.6 g; | Nickel vanadium iron manganese oxalate dihydrate obtained in step S1 (as $C_2O_4Mn_{0.60}Fe_{0.393}V_{0.004}Ni_{0.003} \cdot 2H_2O$), 1792.2 g; lithium carbonate, 368.7 g; ammonium dihydrogen phosphate, 1147.8 g; dilute sulfuric acid, 3.2 g; water, 20 L |
| Examples 21-24 | $Li_{1.001}Mn_{0.60}Fe_{0.393}V_{0.004}Ni_{0.003}P_{0.999}Si_{0.001}O_4$ | Manganese carbonate, 689.6 g; ferrous carbonate, 455.3 g; nickel carbonate, 3.6 g; vanadium dichloride, 4.9 g; water, 5 L; oxalic acid dihydrate, 1260.6 g; | Nickel vanadium iron manganese oxalate dihydrate obtained in step S1 (as $C_2O_4Mn_{0.60}Fe_{0.393}V_{0.004}Ni_{0.003} \cdot 2H_2O$), 1793.1 g; lithium carbonate, 369.8 g; ammonium dihydrogen phosphate, 1148.9 g; Siliceous acid, 0.8 g; water, 20 L |
| Example 25 | $Li_{1.001}Mn_{0.50}Fe_{0.493}V_{0.004}Ni_{0.003}P_{0.999}Si_{0.001}O_4$ | Manganese carbonate, 574.7 g; ferrous carbonate, 571.2 g; nickel carbonate, 3.6 g; vanadium dichloride, 4.9 g; water, 5 L; oxalic acid dihydrate, 1260.6 g; | Nickel vanadium iron manganese oxalate dihydrate obtained in step S1 (as $C_2O_4Mn_{0.50}Fe_{0.493}V_{0.004}Ni_{0.003} \cdot 2H_2O$), 1794.0 g; lithium carbonate, 369.8 g; ammonium dihydrogen phosphate, 1148.9 g; Siliceous acid, 0.8 g; water, 20 L |
| Example 26 | $Li_{1.001}Mn_{0.999}Fe_{0.001}P_{0.999}Si_{0.001}O_4$ | Manganese carbonate, 1148.2 g; ferrous carbonate, 1.2 g; water, 5 L; oxalic acid dihydrate, 1260.6 g; | Iron manganese oxalate dihydrate obtained in step S1 (as $C_2O_4Mn_{0.999}Fe_{0.001} \cdot 2H_2O$), 1789.6 g; lithium carbonate, 369.8 g; ammonium dihydrogen phosphate, 1148.9 g; Siliceous acid, 0.8 g; water, 20 L |
| Example 27 | $LiMn_{0.60}Fe_{0.393}V_{0.004}Ni_{0.003}P_{0.9}N_{0.100}O_4$ | Manganese carbonate, 689.6 g; ferrous carbonate, 455.3 g; nickel carbonate, 3.6 g; vanadium dichloride, 4.9 g; water, 5 L; oxalic acid dihydrate, 1260.6 g; | Nickel vanadium iron manganese oxalate dihydrate obtained in step S1 (as $C_2O_4Mn_{0.60}Fe_{0.393}V_{0.004}Ni_{0.003} \cdot 2H_2O$), 1793.1 g; lithium carbonate, 369.4 g; ammonium dihydrogen phosphate, 1035.1 g; dilute nitric acid, 140.0 g; water, 20 L |
| Example 28 | $Li_{1.001}Mn_{0.40}Fe_{0.593}V_{0.004}Ni_{0.003}P_{0.999}Si_{0.001}O_4$ | Manganese carbonate, 459.7 g; ferrous carbonate, 686.9 g; vanadium dichloride, 4.8 g; nickel carbonate, 3.6 g; water, 5 L; oxalic acid | Nickel vanadium iron manganese oxalate dihydrate obtained in step S1 (as $C_2O_4Mn_{0.40}Fe_{0.593}V_{0.004}Ni_{0.003} \cdot 2H_2O$), 1794.9 g; lithium carbonate, 369.8 g; ammonium dihydrogen phosphate, 1148.9 |

TABLE 1-continued

Raw materials for the preparation of the inner core

| No. | Inner core | Raw materials used in step S1 | Raw materials used in step S2 |
|---|---|---|---|
| Example 29 | $Li_{1.001}Mn_{0.40}Fe_{0.393}V_{0.204}Ni_{0.003}P_{0.999}Si_{0.001}O_4$ | Manganese carbonate, 459.7 g; ferrous carbonate, 455.2 g; vanadium dichloride, 248.6 g; nickel carbonate, 3.6 g; water, 5 L; oxalic acid dihydrate, 1260.6 g; | dihydrate, 1260.6 g; Siliceous acid, 0.8 g; water, 20 L Nickel vanadium iron manganese oxalate dihydrate obtained in step S1 (as $C_2O_4Mn_{0.40}Fe_{0.393}V_{0.204}Ni_{0.003} \cdot 2H_2O$), 1785.1 g; lithium carbonate, 369.8 g; ammonium dihydrogen phosphate, 1148.9 g; Siliceous acid, 0.8 g; water, 20 L |

TABLE 2

Preparation of first coating layer turbid suspension (step S3)

| Example No. | Coating substance of first coating layer | Preparation of first coating layer turbid suspension |
|---|---|---|
| Comparative Examples 3 and 16 | Amorphous $Li_2FeP_2O_7$ | 7.4 g of lithium carbonate; 11.6 g of ferrous carbonate; 23.0 g of ammonium dihydrogen phosphate; 12.6 g of oxalic acid dihydrate; controlling the pH to be 5 |
| Comparative Examples 11, 13-15, and 17 and Examples 1-14, 19, and 21-29 | Crystalline $Li_2FeP_2O_7$ | 7.4 g of lithium carbonate; 11.6 g of ferrous carbonate; 23.0 g of ammonium dihydrogen phosphate; 12.6 g of oxalic acid dihydrate; controlling the pH to be 5 |
| Examples 15 and 16 | Crystalline $Al_4(P_2O_7)_3$ | 53.3 g of aluminum chloride; 34.5 g of ammonium dihydrogen phosphate; 18.9 g of oxalic acid dihydrate; controlling the pH to be 4 |
| Examples 17, 18, and 20 | Crystalline $Li_2NiP_2O_7$ | 7.4 g of lithium carbonate; 11.9 g of nickel carbonate; 23.0 g of ammonium dihydrogen phosphate; 12.6 g of oxalic acid dihydrate; controlling the pH to be 5 |

TABLE 3

Coating with first coating layer (step S4)

| No. | Coating substance for the first coating layer and the amount thereof (based on the weight of the inner core) | The amount of the inner core added in step S4 | Amount of corresponding coating substance in first coating layer suspension | Mixing time (h) | Drying temperature (° C.) | Sintering temperature (° C.) | Sintering time (h) |
|---|---|---|---|---|---|---|---|
| Comparative Example 3 | 2% of amorphous $Li_2FeP_2O_7$ | 1570.4 g | 31.4 g | 6 | 120 | 500 | 4 |
| Comparative Example 11 | 1% of crystalline $Li_2FeP_2O_7$ | 1571.1 g | 15.7 g | 6 | 120 | 650 | 6 |
| Comparative Example 13 | 2% of crystalline $Li_2FeP_2O_7$ | 1568.5 g | 31.4 g | 6 | 120 | 650 | 6 |
| Comparative Example 14 | 2% of crystalline $Li_2FeP_2O_7$ | 1562.8 g | 31.2 g | 6 | 120 | 650 | 6 |
| Comparative Example 15 | 2% of crystalline $Li_2FeP_2O_7$ | 1570.6 g | 31.4 g | 6 | 120 | 650 | 6 |
| Comparative Example 16 | 2% of amorphous $Li_2FeP_2O_7$ | 1571.1 g | 31.4 g | 6 | 120 | 500 | 4 |
| Comparative Example 17 | 2% of crystalline $Li_2FeP_2O_7$ | 1571.1 g | 31.4 g | 6 | 120 | 650 | 6 |
| Examples 1-4 and 8-10 | 1% of $Li_2FeP_2O_7$ | 1571.9 g | 15.7 g | 6 | 120 | 650 | 6 |
| Example 5 | 2% of $Li_2FeP_2O_7$ | 1571.9 g | 31.4 g | 6 | 120 | 650 | 6 |
| Example 6 | 3% of $Li_2FeP_2O_7$ | 1571.1 g | 47.1 g | 6 | 120 | 650 | 6 |
| Example 7 | 5% of $Li_2FeP_2O_7$ | 1571.9 g | 78.6 g | 6 | 120 | 650 | 6 |
| Example 11 | 1% of $Li_2FeP_2O_7$ | 1572.1 g | 15.7 g | 6 | 120 | 650 | 6 |
| Example 12 | 1% of $Li_2FeP_2O_7$ | 1571.7 g | 15.7 g | 6 | 120 | 650 | 6 |
| Example 13 | 2% of $Li_2FeP_2O_7$ | 1571.4 g | 31.4 g | 6 | 120 | 650 | 6 |
| Example 14 | 2.5% of $Li_2FeP_2O_7$ | 1571.9 g | 39.3 g | 6 | 120 | 650 | 6 |
| Example 15 | 2% of $Al_4(P_2O_7)_3$ | 1571.9 g | 31.4 g | 6 | 120 | 680 | 8 |
| Example 16 | 3% of $Al_4(P_2O_7)_3$ | 1571.9 g | 47.2 g | 6 | 120 | 680 | 8 |
| Example 17 | 1.5% of $Li_2NiP_2O_7$ | 1571.9 g | 23.6 g | 6 | 120 | 630 | 6 |

TABLE 3-continued

Coating with first coating layer (step S4)

| No. | Coating substance for the first coating layer and the amount thereof (based on the weight of the inner core) | The amount of the inner core added in step S4 | Amount of corresponding coating substance in first coating layer suspension | Mixing time (h) | Drying temperature (° C.) | Sintering temperature(° C.) | Sintering time(h) |
|---|---|---|---|---|---|---|---|
| Example 18 | 1% of $Li_2NiP_2O_7$ | 1570.1 g | 15.7 g | 6 | 120 | 630 | 6 |
| Example 19 | 2% of $Li_2FeP_2O_7$ | 1571.0 g | 31.4 g | 6 | 120 | 650 | 6 |
| Example 20 | 1% of $Li_2NiP_2O_7$ | 1571.9 g | 15.7 g | 6 | 120 | 630 | 6 |
| Examples 21-24 | 2% of $Li_2FeP_2O_7$ | 1572.1 g | 31.4 g | 6 | 120 | 650 | 6 |
| Example 22 | 5.50% of $Li_2FeP_2O_7$ | 1572.1 g | 86.5 g | 6 | 120 | 650 | 6 |
| Example 25 | 1% of $Li_2FeP_2O_7$ | 1573.0 g | 15.7 g | 6 | 120 | 650 | 6 |
| Example 26 | 1% of $Li_2FeP_2O_7$ | 1568.6 g | 15.7 g | 6 | 120 | 650 | 6 |
| Example 27 | 1% of $Li_2FeP_2O_7$ | 1569.2 g | 15.7 g | 6 | 120 | 650 | 6 |
| Example 28 | 2% of crystalline $Li_2FeP_2O_7$ | 1573.9 g | 31.4 g | 6 | 120 | 650 | 6 |
| Example 29 | 2% of crystalline $Li_2FeP_2O_7$ | 1564.1 g | 31.2 g | 6 | 120 | 650 | 6 |

TABLE 4

Preparation of second coating layer turbid suspension (step S5)

| Example No. | Second coating layer substance | step S5: Preparation of second coating layer turbid suspension |
|---|---|---|
| Comparative Example 12 and Examples 1-14, 18, 19, and 25-27 | Crystalline $LiFePO_4$ | 3.7 g of lithium carbonate; 11.6 g of ferrous carbonate; 11.5 g of ammonium dihydrogen phosphate; 12.6 g of oxalic acid dihydrate |
| Comparative Examples 13-16; Examples 15, 17, 20, 21-24, 28, and 29 | Crystalline $LiCoPO_4$ | 3.7 g of lithium carbonate; 15.5 g of cobalt sulfate; 11.5 g of ammonium dihydrogen phosphate; 12.6 g of oxalic acid dihydrate |
| Comparative Example 17 | Amorphous $LiCoPO_4$ | 3.7 g of lithium carbonate; 15.5 g of cobalt sulfate; 11.5 g of ammonium dihydrogen phosphate; 12.6 g of oxalic acid dihydrate |
| Example 16 | Crystalline $LiNiPO_4$ | 3.7 g of lithium carbonate; 11.9 g of nickel carbonate; 11.5 g of ammonium dihydrogen phosphate; 12.6 g of oxalic acid dihydrate |

TABLE 5

Coating with second coating layer (step S6)

| No. | Second coating layer substance and the amount thereof (based on the weight of the inner core) | The amount of pyrophosphate-coated material added in step S6 (wherein Comparative Example 12 related to the amount of the inner core added) (g) | The amount of corresponding coating substance in second coating layer suspension (g) | Mixing time (h) | Drying temperature (° C.) | Sintering temperature (° C.) | Sintering time (h) |
|---|---|---|---|---|---|---|---|
| Comparative Example 12 | 3% of $LiFePO_4$ | 1571.1 | 47.1 | 6 | 120 | 700 | 8 |
| Comparative Example 13 | 4% of $LiCoPO_4$ | 1599.9 | 62.7 | 6 | 120 | 750 | 8 |
| Comparative Example 14 | 4% of $LiCoPO_4$ | 1594.0 | 62.5 | 6 | 120 | 750 | 8 |
| Comparative Example 15 | 4% of $LiCoPO_4$ | 1602.0 | 62.8 | 6 | 120 | 750 | 8 |
| Comparative Example 16 | 4% of $LiCoPO_4$ | 1602.5 | 62.8 | 6 | 120 | 750 | 8 |
| Comparative Example 17 | 4% of amorphous $LiCoPO_4$ | 1602.5 | 62.8 | 6 | 120 | 650 | 8 |
| Examples 1-4 | 3% of $LiFePO_4$ | 1586.8 | 47.1 | 6 | 120 | 700 | 8 |
| Example 5 | 3% of $LiFePO_4$ | 1602.5 | 47.1 | 6 | 120 | 700 | 8 |
| Example 6 | 3% of $LiFePO_4$ | 1618.2 | 47.1 | 6 | 120 | 700 | 8 |
| Example 7 | 3% of $LiFePO_4$ | 1649.6 | 47.1 | 6 | 120 | 700 | 8 |
| Example 8 | 1% of $LiFePO_4$ | 1586.8 | 15.7 | 6 | 120 | 700 | 8 |
| Example 9 | 4% of $LiFePO_4$ | 1586.8 | 62.8 | 6 | 120 | 700 | 8 |
| Example 10 | 5% of $LiFePO_4$ | 1586.8 | 78.6 | 6 | 120 | 700 | 8 |

TABLE 5-continued

| | | Coating with second coating layer (step S6) | | | | | |
|---|---|---|---|---|---|---|---|
| | Second coating layer substance and the amount thereof (based on the weight of the inner core) | The amount of pyrophosphate-coated material added in step S6 (wherein Comparative Example 12 related to the amount of the inner core added) (g) | step S6: Coating with second coating layer | | | | |
| No. | | | The amount of corresponding coating substance in second coating layer suspension (g) | Mixing time (h) | Drying temperature (° C.) | Sintering temperature (° C.) | Sintering time (h) |
| Example 11 | 2.50% of LiFePO$_4$ | 1587.8 | 39.3 | 6 | 120 | 700 | 8 |
| Example 12 | 3% of LiFePO$_4$ | 1587.4 | 47.2 | 6 | 120 | 700 | 8 |
| Example 13 | 2% of LiFePO$_4$ | 1602.8 | 31.4 | 6 | 120 | 700 | 8 |
| Example 14 | 3.50% of LiFePO$_4$ | 1610.5 | 55.0 | 6 | 120 | 700 | 8 |
| Example 15 | 2.5% of LiCoPO$_4$ | 1603.3 | 39.3 | 6 | 120 | 750 | 8 |
| Example 16 | 3% of LiNiPO$_4$ | 1619.0 | 47.2 | 6 | 120 | 680 | 8 |
| Example 17 | 2.5% of LiCoPO$_4$ | 1595.5 | 39.3 | 6 | 120 | 750 | 8 |
| Example 18 | 3% of LiFePO$_4$ | 1585.9 | 47.1 | 6 | 120 | 700 | 8 |
| Example 19 | 4% of LiFePO$_4$ | 1602.4 | 62.8 | 6 | 120 | 700 | 8 |
| Example 20 | 3% of LiCoPO$_4$ | 1587.7 | 47.2 | 6 | 120 | 750 | 8 |
| Example 21 | 4% of LiCoPO$_4$ | 1603.5 | 62.9 | 6 | 120 | 750 | 8 |
| Example 22 | 4% of LiCoPO$_4$ | 1658.6 | 62.9 | 6 | 120 | 750 | 8 |
| Example 23 | 5.50% of LiCoPO$_4$ | 1603.5 | 86.5 | 6 | 120 | 750 | 8 |
| Example 24 | 4% of LiCoPO$_4$ | 1603.5 | 62.9 | 6 | 120 | 750 | 8 |
| Example 25 | 3% of LiFePO$_4$ | 1588.7 | 47.2 | 6 | 120 | 700 | 8 |
| Example 26 | 3% of LiFePO$_4$ | 1584.3 | 47.1 | 6 | 120 | 700 | 8 |
| Example 27 | 3% of LiFePO$_4$ | 1584.9 | 47.1 | 6 | 120 | 700 | 8 |
| Example 28 | 4% of LiCoPO$_4$ | 1605.4 | 63.0 | 6 | 120 | 750 | 8 |
| Example 29 | 4% of LiCoPO$_4$ | 1605.4 | 63.0 | 6 | 120 | 750 | 8 |

TABLE 6

| | | | Coating with third coating layer (step S8) | | | | | |
|---|---|---|---|---|---|---|---|---|
| | Third coating layer | Molar ratio of SP2 to SP3 | The amount of the two-layer-coated material added in step S8 (wherein Comparative Examples 1, 2, and 4-10 related to the amount of the inner core added, and Comparative Example 11 related to the amount of the first-layer-coated material added) (g) | step S8: Coating with third coating layer | | | | |
| | | | | Amount of sucrose (g) | Mixing time (h) | Drying temperature (° C.) | Sintering temperature (° C.) | Sintering time (h) |
| Comparative Example 1 | 1% of carbon | 2.5 | 1568.5 | 37.3 | 6 | 150 | 650 | 8 |
| Comparative Example 2 | 2% of carbon | 2.8 | 1572.2 | 74.7 | 6 | 150 | 680 | 8 |
| Comparative Example 3 | 2% of carbon | 2.7 | 1601.8 | 74.6 | 6 | 150 | 680 | 7 |
| Comparative Example 4 | 1% of carbon | 2.4 | 1571.0 | 37.3 | 6 | 150 | 630 | 8 |
| Comparative Example 5 | 1.5% of carbon | 2.6 | 1570.6 | 56.0 | 6 | 150 | 650 | 7 |
| Comparative Example 6 | 2.5% of carbon | 2.8 | 1573.6 | 93.4 | 6 | 150 | 680 | 8 |
| Comparative Example 7 | 1% of carbon | 2.7 | 1572.2 | 37.3 | 6 | 150 | 680 | 7 |
| Comparative Example 8 | 1.5% of carbon | 2.9 | 1571.1 | 56.0 | 6 | 150 | 680 | 10 |
| Comparative Example 9 | 1% of carbon | 2.2 | 1572.2 | 37.3 | 6 | 150 | 600 | 8 |

TABLE 6-continued

Coating with third coating layer (step S8)

| | Third coating layer | Molar ratio of SP2 to SP3 | The amount of the two-layer-coated material added in step S8 (wherein Comparative Examples 1, 2, and 4-10 related to the amount of the inner core added, and Comparative Example 11 related to the amount of the first-layer-coated material added) (g) | Amount of sucrose (g) | Mixing time (h) | Drying temperature (° C.) | Sintering temperature (° C.) | Sintering time (h) |
|---|---|---|---|---|---|---|---|---|
| Comparative Example 10 | 1% of carbon | 2.4 | 1571.1 | 37.3 | 6 | 150 | 630 | 8 |
| Comparative Example 11 | 1% of carbon | 2.3 | 1586.8 | 37.3 | 6 | 150 | 620 | 8 |
| Comparative Example 12 | 1% of carbon | 2.1 | 1618.2 | 37.3 | 6 | 150 | 600 | 6 |
| Comparative Example 13 | 1% of carbon | 2 | 1662.6 | 37.3 | 6 | 120 | 600 | 6 |
| Comparative Example 14 | 1% of carbon | 1.8 | 1656.5 | 37.1 | 6 | 120 | 600 | 6 |
| Comparative Example 15 | 1% of carbon | 1.7 | 1664.8 | 37.3 | 6 | 100 | 600 | 6 |
| Comparative Example 16 | 1% of carbon | 3.1 | 1665.4 | 37.3 | 6 | 150 | 700 | 10 |
| Comparative Example 17 | 1% of carbon | 3.5 | 1665.4 | 37.3 | 6 | 150 | 750 | 10 |
| Example 1 | 1% of carbon | 2.2 | 1633.9 | 37.3 | 6 | 150 | 700 | 10 |
| Example 2 | 3% of carbon | 2.3 | 1633.9 | 111.9 | 6 | 150 | 600 | 9 |
| Example 3 | 4% of carbon | 2.1 | 1633.9 | 149.2 | 6 | 150 | 600 | 6 |
| Example 4 | 5% of carbon | 2.4 | 1633.9 | 186.5 | 6 | 150 | 630 | 8 |
| Example 5 | 1% of carbon | 2.5 | 1649.6 | 37.3 | 6 | 150 | 650 | 8 |
| Example 6 | 1% of carbon | 2.5 | 1665.3 | 37.3 | 6 | 150 | 650 | 8 |
| Example 7 | 1% of carbon | 2.4 | 1696.7 | 37.3 | 6 | 150 | 630 | 8 |
| Example 8 | 1% of carbon | 2.3 | 1602.5 | 37.3 | 6 | 150 | 600 | 9 |
| Example 9 | 1% of carbon | 2.2 | 1649.6 | 37.3 | 6 | 150 | 600 | 8 |
| Example 10 | 1% of carbon | 2.2 | 1665.3 | 37.3 | 6 | 150 | 600 | 9 |
| Example 11 | 1.5% of carbon | 2.3 | 1629.0 | 56.1 | 6 | 150 | 600 | 9 |
| Example 12 | 2% of carbon | 2.4 | 1634.6 | 74.7 | 6 | 150 | 630 | 8 |
| Example 13 | 2% of carbon | 2.5 | 1634.2 | 74.6 | 6 | 150 | 650 | 8 |
| Example 14 | 2.5% of carbon | 2.7 | 1665.5 | 93.3 | 6 | 150 | 680 | 7 |
| Example 15 | 2% of carbon | 2.8 | 1642.6 | 74.7 | 6 | 150 | 680 | 8 |
| Example 16 | 1% of carbon | 2.7 | 1666.2 | 37.3 | 6 | 150 | 680 | 7 |
| Example 17 | 1.5% of carbon | 2.3 | 1634.8 | 56.0 | 6 | 150 | 600 | 9 |
| Example 18 | 1% of carbon | 2.6 | 1633.0 | 37.3 | 6 | 150 | 650 | 7 |
| Example 19 | 1.5% of carbon | 2.4 | 1665.2 | 56.0 | 6 | 150 | 630 | 8 |
| Example 20 | 1.5% of carbon | 2.2 | 1634.8 | 56.0 | 6 | 150 | 600 | 9 |
| Example 21 | 1% of carbon | 2.2 | 1666.4 | 37.3 | 6 | 150 | 600 | 9 |
| Example 22 | 1% of carbon | 2.3 | 1721.4 | 37.3 | 6 | 150 | 600 | 9 |
| Example 23 | 1% of carbon | 2.4 | 1690.0 | 37.3 | 6 | 150 | 630 | 8 |
| Example 24 | 5.5% of carbon | 2.6 | 1666.4 | 205.4 | 6 | 150 | 650 | 7 |
| Example 25 | 1% of carbon | 2.4 | 1635.9 | 37.4 | 6 | 150 | 630 | 8 |
| Example 26 | 1% of carbon | 2.3 | 1631.3 | 37.3 | 6 | 150 | 600 | 9 |
| Example 27 | 1.5% of carbon | 2.1 | 1631.9 | 55.9 | 6 | 150 | 600 | 6 |
| Example 28 | 1% of carbon | 0.07 | 1668.3 | 37.4 | 6 | 80 | 600 | 6 |
| Example 29 | 1% of carbon | 13 | 1668.3 | 37.4 | 6 | 150 | 850 | 10 |

Examples 28-40: Investigation of Other Coating Layer Substances

Examples 28-40 were carried out in a manner similar to that in Example 1, except for the differences shown in Tables 7 and 8 below.

TABLE 7

Investigation of first coating layer substance

| No. | Coating substance of first coating layer | Preparation of first coating layer turbid suspension |
|---|---|---|
| Example 30a | $Li_2MgP_2O_7$ | 7.4 g of lithium carbonate; 8.4 g of magnesium carbonate; 23.0 g of ammonium dihydrogen phosphate; 12.6 g of oxalic acid dihydrate |
| Example 30b | $Li_2CoP_2O_7$ | 7.4 g of lithium carbonate and 15.5 g of cobalt sulfate; 23.0 g of ammonium dihydrogen phosphate; 12.6 g of oxalic acid dihydrate |
| Example 31a | $Li_2CuP_2O_7$ | 7.4 g of lithium carbonate and 16.0 g of copper sulfate; 23.0 g of ammonium dihydrogen phosphate; 12.6 g of oxalic acid dihydrate |
| Example 31b | $Li_2ZnP_2O_7$ | 7.4 g of lithium carbonate and 12.5 g of zinc carbonate; 23.0 g of ammonium dihydrogen phosphate; 12.6 g of oxalic acid dihydrate |
| Example 32 | $TiP_2O_7$ | 24.0 g of titanium sulfate and 23.0 g of ammonium dihydrogen phosphate; 12.6 g of oxalic acid dihydrate |
| Example 33 | $Ag_4P_2O_7$ | 67.9 g of silver nitrate, 23.0 g of ammonium dihydrogen phosphate and 25.2 g of oxalic acid dihydrate |
| Example 34 | $ZrP_2O_7$ | 56.6 g of zirconium sulfate, 23.0 g of ammonium dihydrogen phosphate and 25.2 g of oxalic acid dihydrate |

TABLE 8

Investigation of second coating layer substance

| No. | Second coating layer substance | Preparation of second coating layer turbid suspension |
|---|---|---|
| Example 35 | $Cu_3(PO_4)_2$ | 48.0 g of copper sulfate; 23.0 g of ammonium dihydrogen phosphate; 37.8 g of oxalic acid dihydrate |
| Example 36 | $Zn_3(PO_4)_2$ | 37.6 g of zinc carbonate; 23.0 g of ammonium dihydrogen phosphate; 37.8 g of oxalic acid dihydrate |
| Example 37 | $Ti_3(PO_4)_4$ | 72.0 g of titanium sulfate; 46.0 g of ammonium dihydrogen phosphate; 75.6 g of oxalic acid dihydrate |
| Example 38 | $Ag_3PO_4$ | 50.9 g of silver nitrate; 11.5 g of ammonium dihydrogen phosphate; 18.9 g of oxalic acid dihydrate |
| Example 39 | $Zr_3(PO_4)_4$ | 85.0 g of zirconium sulfate; 46.0 g of ammonium dihydrogen phosphate; 37.8 g of oxalic acid dihydrate |
| Example 40 | $AlPO_4$ | 13.3 g of aluminum chloride; 11.5 g of ammonium dihydrogen phosphate; 18.9 g of oxalic acid dihydrate |

II. Performance Evaluation

1. Testing Method for Lattice Change Rate:

In a constant-temperature environment at 25° C., a positive electrode active material sample was placed in XRD (model: Bruker D8 Discover) and tested at 1°/min, and the test data were sorted and analyzed; and with reference to the standard PDF card, the lattice constants a0, b0, c0, and v0 at this time were calculated (a0, b0, and c0 represented the lengths of a unit cell on all sides, and v0 represented the volume of the unit cell, which could be obtained directly from XRD refinement results).

By using the method for preparing a button battery in the above-mentioned examples, the positive electrode active material sample was manufactured into a button battery, and the button battery was charged at a small rate of 0.05 C until the current was reduced to 0.01 C. Then, a positive electrode plate in the button battery was taken out and soaked in dimethyl carbonate (DMC) for 8 hours. Then, the positive electrode plate was dried, powder scraping was performed, and particles with a particle size of less than 500 nm were screened out. Sampling was performed, and a cell volume v1 was calculated in the same way as that for testing the fresh sample as described above. (v0−v1)/v0×100% was shown in a table as a lattice change rate (cell volume change rate) of the sample before and after complete lithium de-intercalation.

2. Li/Mn Antisite Defect Concentration

The XRD results determined in the "Method for measuring lattice change rate" were compared with the PDF (Powder Diffraction File) card of a standard crystal to obtain a Li/Mn antisite defect concentration. Specifically, the XRD results determined in the "Method for measuring lattice change rate" were imported into a general structure analysis system (GSAS) software, and refinement results were obtained automatically, including the occupancies of different atoms; and a Li/Mn antisite defect concentration was obtained by reading the refinement results.

3. Compacted Density 5 g of the positive electrode active material powder prepared above was put into a compaction dedicated mold (U.S. CARVER mold, model: 13 mm), and the mold was then placed on a compacted density instrument. A pressure of 3 T was applied, the thickness of the powder under pressure (thickness after pressure relief) was read on the device, and the compacted density was calculated with $\rho=m/v$, where the area value used was the standard small picture area of 1540.25 $mm^2$.

4. Charge Constant Current Rate at 3 C

In a 25° C. constant temperature environment, the fresh full battery manufactured in each of the above examples and comparative examples was left to stand for 5 min, and discharged to 2.5 V at ⅓ C. The full battery was left to stand for 5 min, charged to 4.3 V at ⅓ C, and then charged at a constant voltage of 4.3 V until the current was less than or equal to 0.05 mA. The full battery was left to stand for 5 min, and the charge capacity at this time was recorded as C0. The full battery was discharged at ⅓C to 2.5 V, left to stand for 5 min, then charged to 4.3 V at 3 C, and left to stand for 5 min, and the charge capacity at this time was recorded as C1. The charge constant current rate at 3 C was C1/C0×100%.

The higher the charge constant current rate at 3 C, the better the rate performance of the secondary battery.

5. Dissolution Test for Transition Metal Mn (and Fe Doping at Mn Site):

After cycling at 45° C. until the capacity faded to 80%, the full battery manufactured in each of the above examples and comparative examples was discharged to a cut-off voltage of 2.0 V at a rate of 0.1 C. The battery was then disassembled, a negative electrode plate was taken out, a round piece of 30 unit areas (1540.25 mm$^2$) was randomly taken from the negative electrode plate, and inductively coupled plasma (ICP) emission spectroscopy was performed using Agilent ICP-OES730. The amounts of Fe (if the positive electrode active material was doped with Fe at the Mn site) and Mn therein were calculated according to the ICP results, and the dissolution of Mn (and Fe doping at the Mn site) after cycling was then calculated. The testing standard was in accordance with EPA-6010D-2014.

6. Surface Oxygen Valence State 5 g of the positive electrode active material prepared above was manufactured into a button battery according to the method for preparing a button battery in the above examples. The button battery was charged at a small rate of 0.05 C until the current was reduced to 0.01 C. The positive electrode plate in the button battery was then taken out and soaked in DMC for 8 hours. Then, the positive electrode plate was dried, powder scraping was performed, and particles with a particle size of less than 500 nm were screened out. The obtained particles were measured using electron energy loss spectroscopy (EELS, instrument model used: Tabs F200S) to obtain an energy loss near-edge structure (ELNES), reflecting the state density and the energy level distribution of an element. According to the state density and the energy level distribution, the number of occupied electrons was calculated by integrating the data of valence-band state density, and the valence state of surface oxygen after charging was then figured out.

7. Measurement of the Elements Manganese and Phosphorus in Positive Electrode Active Material 5 g of the positive electrode active material prepared above was dissloved in 100 ml of inverse aqua regia (concentrated hydrochloric acid: concentrated nitric acid=1:3) (the concentration of the concentrated hydrochloric acid was about 37%, and the concentration of the concentrated nitric acid was about 65%). The content of each element in the solution was measured by ICP, and the content of the element manganese or phosphorus was then measured and converted (the amount of the element manganese or phosphorus/the amount of the positive electrode active material*100%) to obtain the weight ratio thereof.

8. Method for Measuring Initial Gram Capacity of Button-Type Battery

At 2.5-4.3 V, the button-type battery prepared in each of the above examples and comparative examples was charged to 4.3 V at 0.1 C, then charged at a constant voltage of 4.3 V until the current was less than or equal to 0.05 mA, left to stand for 5 min, and then discharged to 2.0 V at 0.1 C; and the discharge capacity at this time was the initial gram capacity, recorded as D0.

10. Battery Cell Expansion Test for Full Battery Upon 30 Days of Storage at 60° C.:

The full battery prepared in each of the above examples and comparative examples was stored at 60° C. with 100% state of charge (SOC). Before, after and during storage, the open-circuit voltage (OCV) and AC internal impedance (IMP) of a battery cell were measured for monitoring the SOC, and the volume of the battery cell was measured. Herein, the full battery was taken out after every 48 h of storage and left to stand for 1 h, the open-circuit voltage (OCV) and internal impedance (IMP) were then measured, and after cooling to room temperature, the cell volume of the battery cell was measured using a water displacement method. The water displacement method means that the gravity $F_1$ of the battery cell was measured separately using a balance with automatic unit conversion of on-board data, the battery cell was then completely placed in deionized water (with a density known to be 1 g/cm$^3$), the gravity $F_2$ of the battery cell at this time was measured, the buoyancy $F_{buoyancy}$ on the battery cell was $F_1-F_2$, and the battery cell volume $V=(F_1-F_2)/(\rho \times g)$ was then calculated according to the Archimedes' principle $F_{buoyancy}=\rho \times g \times V_{displacement}$.

From the test results of OCV and IMP, the batteries of all the examples always maintained an SOC of 99% or more during the experiment until the end of the storage.

After 30 days of storage, the volume of the battery cell was measured, and the percentage increase in the volume of the battery cell after storage relative to the volume of the battery cell before storage was calculated.

11. Test of Cycling Performance of Full Battery at 45° C.

In a constant-temperature environment at 45° C., at 2.5-4.3 V, a full battery was charged to 4.3 V at 1 C and then charged at a constant voltage of 4.3 V until the current was ≤0.05 mA, the full battery was left to stand for 5 min and then discharged to 2.5 V at 1 C, and the capacity was recorded as $D_n$ (n=0, 1, 2, . . . ). The above-mentioned process was repeated until the capacity faded to 80%, and the number of repetitions at this time was recorded, i.e., the number of cycles corresponding to the 80% capacity retention rate at 45° C.

12. Test of Interplanar Spacing and Included Angle 1 g of each positive electrode active material powder prepared above was placed in a 50 mL test tube, and 10 mL of alcohol with a mass fraction of 75% was injected into the test tube, the mixture was then fully stirred and dispersed for 30 min, a clean disposable plastic straw was then used to take an appropriate amount of the above-mentioned solution, which was dripped onto a 300-mesh copper mesh, when part of the powder would remain on the copper mesh. The copper mesh along with the sample was transferred to a TEM (Tabs F200s G2) sample chamber for testing, an original picture of the TEM test was obtained and the original picture in format (xx.dm3) was saved.

The original picture obtained from the above TEM test was opened in DigitalMicrograph software, and Fourier transform (automatically completed by the software after a clicking operation) was performed to obtain a diffraction pattern, the distance from a diffraction spot to the center position in the diffraction pattern was measured to obtain the interplanar spacing, and the included angle was calculated according to Bragg's equation.

By comparing the obtained interplanar spacing and the corresponding included angle data with their standard values, different substances in the coating layer could be identified.

13. Test of Coating Layer Thickness

The test of the thickness of a coating layer mainly involved cutting a thin slice with a thickness of about 100 nm from the middle of a single particle of the positive electrode active material prepared above by FIB, then performing a TEM test on the thin slice to obtain the original picture of the TEM test, and saving the original picture in format (xx.dm3).

The original picture obtained from the above TEM test was opened in DigitalMicrograph software, the coating layer was identified by means of the lattice spacing and included angle information, and the thickness of the coating layer was measured.

The thickness was measured at three locations on the selected particle and the average value was taken.

14. Determination of the Molar Ratio of SP2 Form to SP3 Form of the Carbon in the Third Coating Layer This test was performed by Raman spectroscopy. By subjecting the energy spectrum of the Raman test to peaking splitting, Id/Ig (where Id was the peak intensity of the SP3-form carbon, and Ig was the peak intensity of the SP2-form carbon) was obtained, thus confirming the molar ratio of the two forms.

The performance test results of all the examples and comparative examples were shown in the following table.

TABLE 9

Properties of powders of the positive electrode active materials and the properties of the prepared batteries in Example 1-27 and Comparative Examples 1-19

| | Properties of powder of positive electrode active material | | | | | | Battery performance | | |
|---|---|---|---|---|---|---|---|---|---|
| Example No. | Lattice change rate (%) | Li/Mn antisite defect concentration (%) | Compacted density (g/cm$^3$) | Surface oxygen valence state | Charge constant current rate at 3 C (%) | Dissolution of Mn and Fe after cycling (ppm) | Capacity of button battery at 0.1 C (mAh/g) | Expansion of battery cell upon 30 d of storage at 60° C. (%) | Number of cycles at a capacity retention rate of 80% at 45° C. |
| Comparative Example 1 | 11.4 | 5.2 | 1.5 | −1.55 | 50.1 | 2060 | 125.6 | 48.6 | 185 |
| Comparative Example 2 | 10.6 | 3.3 | 1.67 | −1.51 | 54.9 | 1810 | 126.4 | 47.3 | 243 |
| Comparative Example 3 | 10.8 | 3.4 | 1.64 | −1.64 | 52.1 | 1728 | 144.7 | 41.9 | 378 |
| Comparative Example 4 | 4.3 | 2.8 | 1.69 | −1.82 | 56.3 | 1096 | 151.2 | 8.4 | 551 |
| Comparative Example 5 | 2.8 | 2.5 | 1.65 | −1.85 | 58.2 | 31 | 148.4 | 7.5 | 668 |
| Comparative Example 6 | 3.4 | 2.4 | 1.61 | −1.86 | 58.4 | 64 | 149.6 | 8.6 | 673 |
| Comparative Example 7 | 4.5 | 2.4 | 1.73 | −1.83 | 59.2 | 85 | 148.6 | 8.3 | 669 |
| Comparative Example 8 | 2.3 | 2.4 | 1.68 | −1.89 | 59.3 | 30 | 152.3 | 7.3 | 653 |
| Comparative Example 9 | 2.3 | 2.4 | 1.75 | −1.89 | 59.8 | 30 | 152.3 | 7.3 | 672 |
| Comparative Example 10 | 2.3 | 2.2 | 1.81 | −1.9 | 64.1 | 28 | 154.2 | 7.2 | 685 |
| Comparative Example 11 | 2.3 | 2.2 | 1.92 | −1.92 | 65.4 | 12 | 154.3 | 5.4 | 985 |
| Comparative Example 12 | 2.3 | 2.1 | 1.95 | −1.95 | 65.5 | 18 | 154.6 | 4.2 | 795 |
| Comparative Example 13 | 11.4 | 5.2 | 1.63 | −1.96 | 52.4 | 56 | 130.2 | 5.4 | 562 |
| Comparative Example 14 | 8.1 | 3.8 | 1.76 | −1.96 | 58.3 | 41 | 135.1 | 5.1 | 631 |
| Comparative Example 15 | 2 | 1.8 | 2.13 | −1.96 | 61.3 | 8 | 154.3 | 3.7 | 1126 |
| Comparative Example 16 | 2 | 1.9 | 1.95 | −1.96 | 60.5 | 18 | 152.7 | 4.5 | 1019 |
| Comparative Example 17 | 2 | 1.9 | 1.9 | −1.89 | 60.4 | 24 | 152.4 | 5.1 | 897 |
| Example 1 | 2.5 | 1.8 | 2.35 | −1.93 | 70.3 | 7 | 157.2 | 4.2 | 1128 |
| Example 2 | 2.5 | 1.8 | 2.24 | −1.94 | 70.2 | 6 | 156.3 | 3.7 | 1253 |
| Example 3 | 2.5 | 1.8 | 2.22 | −1.94 | 70.1 | 5 | 155.4 | 3.4 | 1374 |
| Example 4 | 2.5 | 1.8 | 2.21 | −1.95 | 70.2 | 3 | 153.7 | 2.9 | 1406 |
| Example 5 | 2.5 | 1.8 | 2.33 | −1.93 | 70.1 | 5 | 156.7 | 3.1 | 1501 |
| Example 6 | 2.5 | 1.8 | 2.31 | −1.93 | 69.7 | 4 | 156.2 | 2.8 | 1576 |
| Example 7 | 2.5 | 1.8 | 2.28 | −1.93 | 68.4 | 3 | 155.8 | 2.5 | 1647 |
| Example 8 | 2.5 | 1.8 | 2.29 | −1.93 | 69.1 | 9 | 156.4 | 3.4 | 1058 |
| Example 9 | 2.5 | 1.8 | 2.46 | −1.98 | 73.4 | 6 | 157.6 | 2.9 | 1286 |
| Example 10 | 2.5 | 1.8 | 2.49 | −1.98 | 75.4 | 5 | 157.8 | 2.5 | 1486 |
| Example 11 | 2.6 | 1.9 | 2.38 | −1.97 | 72.4 | 6 | 157.3 | 3.5 | 1026 |
| Example 12 | 2.4 | 1.8 | 2.41 | −1.97 | 74.5 | 4 | 156.3 | 2.5 | 1136 |
| Example 13 | 2.7 | 1.9 | 2.42 | −1.97 | 75.3 | 5 | 156.6 | 3.5 | 1207 |
| Example 14 | 2.8 | 1.9 | 2.45 | −1.97 | 76.5 | 3 | 153.8 | 3.7 | 1308 |
| Example 15 | 2.2 | 1.9 | 2.46 | −1.97 | 74.3 | 3 | 153.8 | 3.7 | 1109 |
| Example 16 | 2.1 | 1.9 | 2.47 | −1.98 | 73.1 | 5 | 154.2 | 3.8 | 1132 |

TABLE 9-continued

Properties of powders of the positive electrode active materials and the properties of the prepared batteries in Example 1-27 and Comparative Examples 1-19

| Example No. | Properties of powder of positive electrode active material | | | | | | Battery performance | | |
|---|---|---|---|---|---|---|---|---|---|
| | Lattice change rate (%) | Li/Mn antisite defect concentration (%) | Compacted density (g/cm³) | Surface oxygen valence state | Charge constant current rate at 3 C (%) | Dissolution of Mn and Fe after cycling (ppm) | Capacity of button battery at 0.1 C (mAh/g) | Expansion of battery cell upon 30 d of storage at 60° C. (%) | Number of cycles at a capacity retention rate of 80% at 45° C. |
| Example 17 | 2.5 | 1.7 | 2.41 | −1.98 | 75.3 | 4 | 155.4 | 4.5 | 1258 |
| Example 18 | 2.3 | 1.6 | 2.42 | −1.97 | 76.1 | 4 | 154.3 | 4.7 | 1378 |
| Example 19 | 2.2 | 1.7 | 2.43 | −1.97 | 76.8 | 4 | 154.3 | 4.7 | 1328 |
| Example 20 | 2.6 | 1.8 | 2.42 | −1.94 | 75.4 | 4 | 153.9 | 3.3 | 1458 |
| Example 21 | 2.4 | 1.7 | 2.41 | −1.97 | 76.1 | 4 | 154.5 | 3.5 | 1327 |
| Example 22 | 2.4 | 1.8 | 2.32 | −1.95 | 72.1 | 2 | 152.1 | 2.7 | 1556 |
| Example 23 | 2.3 | 1.7 | 2.46 | −1.96 | 76.4 | 3 | 151.4 | 2.4 | 1645 |
| Example 24 | 2.2 | 1.8 | 2.47 | −1.95 | 76.3 | 3 | 152.1 | 2.5 | 1548 |
| Example 25 | 2.1 | 1.7 | 2.49 | −1.98 | 78.4 | 3 | 158.6 | 2.9 | 1538 |
| Example 26 | 3.6 | 2.5 | 2.21 | −1.97 | 56.4 | 8 | 152.3 | 4.8 | 1017 |
| Example 27 | 2.8 | 2.1 | 2.24 | −1.98 | 74.3 | 6 | 155.4 | 3.8 | 1126 |
| Example 28 | 2.5 | 1.9 | 1.95 | −1.94 | 54.7 | 9 | 154.9 | 6.4 | 986 |
| Example 29 | 2.4 | 1.8 | 1.98 | −1.95 | 68.4 | 7 | 155.6 | 4.5 | 1047 |

It could be seen from Table 9 that compared with the comparative examples, these examples achieved a smaller lattice change rate, a smaller Li/Mn antisite defect concentration, a larger compacted density, and a closer surface oxygen valence state to −2 valence, less Mn and Fe dissolution after cycling, and better battery performance, such as better high-temperature storage performance and high-temperature cycling performance.

TABLE 10a

The thickness of each layer in the positive electrode active materials prepared in Examples 1-14 and Comparative Examples 3-4, and 12 and the weight ratio of the element manganese to the element phosphorus

| No. | Inner core | First coating layer | Second coating layer | Third coating layer |
|---|---|---|---|---|
| Comparative Example 3 | $LiMn_{0.80}Fe_{0.20}PO_4$ | 2% of amorphous $Li_2FeP_2O_7$ | — | 2% of carbon |
| Comparative Example 4 | $LiMn_{0.70}Fe_{0.295}V_{0.005}PO_4$ | — | — | 1% of carbon |
| Comparative Example 12 | $Li_{0.999}Mn_{0.60}Fe_{0.393}V_{0.004}Co_{0.003}P_{0.999}S_{0.001}O_4$ | — | 3% of crystalline $LiFePO_4$ | 1% of carbon |
| Example 1 | $Li_{0.997}Mn_{0.60}Fe_{0.393}V_{0.004}Co_{0.003}P_{0.997}S_{0.003}O_4$ | 1% of $Li_2FeP_2O_7$ | 3% of $LiFePO_4$ | 1% of carbon |
| Example 2 | $Li_{0.997}Mn_{0.60}Fe_{0.393}V_{0.004}Co_{0.003}P_{0.997}S_{0.003}O_4$ | 1% of $Li_2FeP_2O_7$ | 3% of $LiFePO_4$ | 3% of carbon |
| Example 3 | $Li_{0.997}Mn_{0.60}Fe_{0.393}V_{0.004}Co_{0.003}P_{0.997}S_{0.003}O_4$ | 1% of $Li_2FeP_2O_7$ | 3% of $LiFePO_4$ | 4% of carbon |
| Example 4 | $Li_{0.997}Mn_{0.60}Fe_{0.393}V_{0.004}Co_{0.003}P_{0.997}S_{0.003}O_4$ | 1% of $Li_2FeP_2O_7$ | 3% of $LiFePO_4$ | 5% of carbon |
| Example 5 | $Li_{0.997}Mn_{0.60}Fe_{0.393}V_{0.004}Co_{0.003}P_{0.997}S_{0.003}O_4$ | 2% of $Li_2FeP_2O_7$ | 3% of $LiFePO_4$ | 1% of carbon |
| Example 6 | $Li_{0.997}Mn_{0.60}Fe_{0.393}V_{0.004}Co_{0.003}P_{0.997}S_{0.003}O_4$ | 3% of $Li_2FeP_2O_7$ | 3% of $LiFePO_4$ | 1% of carbon |
| Example 7 | $Li_{0.997}Mn_{0.60}Fe_{0.393}V_{0.004}Co_{0.003}P_{0.997}S_{0.003}O_4$ | 5% of $Li_2FeP_2O_7$ | 3% of $LiFePO_4$ | 1% of carbon |
| Example 8 | $Li_{0.997}Mn_{0.60}Fe_{0.393}V_{0.004}Co_{0.003}P_{0.997}S_{0.003}O_4$ | 1% of $Li_2FeP_2O_7$ | 1% of $LiFePO_4$ | 1% of carbon |
| Example 9 | $Li_{0.997}Mn_{0.60}Fe_{0.393}V_{0.004}Co_{0.003}P_{0.997}S_{0.003}O_4$ | 1% of $Li_2FeP_2O_7$ | 4% of $LiFePO_4$ | 1% of carbon |
| Example 10 | $Li_{0.997}Mn_{0.60}Fe_{0.393}V_{0.004}Co_{0.003}P_{0.997}S_{0.003}O_4$ | 1% of $Li_2FeP_2O_7$ | 5% of $LiFePO_4$ | 1% of carbon |
| Example 11 | $Li_{1.001}Mn_{0.60}Fe_{0.393}V_{0.004}Co_{0.003}P_{0.999}Si_{0.001}O_4$ | 1% of $Li_2FeP_2O_7$ | 2.50% of $LiFePO_4$ | 1.5% of carbon |
| Example 13 | $Li_{0.995}Mn_{0.65}Fe_{0.341}V_{0.004}Co_{0.005}P_{0.995}S_{0.005}O_4$ | 2% of $Li_2FeP_2O_7$ | 2% of $LiFePO_4$ | 2% of carbon |
| Example 14 | $Li_{1.002}Mn_{0.70}Fe_{0.293}V_{0.004}Co_{0.003}P_{0.998}Si_{0.002}O_4$ | 2.5% of $Li_2FeP_2O_7$ | 3.50% of $LiFePO_4$ | 2.5% of carbon |

TABLE 10b

The thickness of each layer in the positive electrode active materials prepared in Examples 1-14 and Comparative Examples 3-4, and 12 and the weight ratio of the element manganese to the element phosphorus

| No. | Thickness of the first coating layer (nm) | Thickness of the second coating layer (nm) | Thickness of the third coating layer (nm) | Content of the element Mn (wt %) | Weight ratio of the element Mn to the element P |
|---|---|---|---|---|---|
| Comparative Example 3 | 4 | — | 10 | 26.1 | 1.383 |

TABLE 10b-continued

The thickness of each layer in the positive electrode active materials prepared in Examples 1-14 and Comparative Examples 3-4, and 12 and the weight ratio of the element manganese to the element phosphorus

| No. | Thickness of the first coating layer (nm) | Thickness of the second coating layer (nm) | Thickness of the third coating layer (nm) | Content of the element Mn (wt %) | Weight ratio of the element Mn to the element P |
|---|---|---|---|---|---|
| Comparative Example 4 | — | — | 5 | 24.3 | 1.241 |
| Comparative Example 12 | — | 7.5 | 5 | 19.6 | 1.034 |
| Example 1 | 2 | 7.5 | 5 | 19.0 | 1.023 |
| Example 2 | 2 | 7.5 | 15 | 18.3 | 1.023 |
| Example 3 | 2 | 7.5 | 20 | 18.0 | 1.023 |
| Example 4 | 2 | 7.5 | 25 | 17.9 | 1.023 |
| Example 5 | 4 | 7.5 | 5 | 18.7 | 1.011 |
| Example 6 | 6 | 7.5 | 5 | 18.3 | 0.999 |
| Example 7 | 10 | 7.5 | 5 | 17.6 | 0.975 |
| Example 8 | 2 | 2.5 | 5 | 19.8 | 1.043 |
| Example 9 | 2 | 10 | 5 | 18.7 | 1.014 |
| Example 10 | 2 | 12.5 | 5 | 18.4 | 1.004 |
| Example 11 | 2 | 6.3 | 7.5 | 19.0 | 1.026 |
| Example 13 | 4 | 5 | 10 | 18.7 | 1.108 |
| Example 14 | 5 | 8.8 | 12.5 | 17.8 | 1.166 |

It could be seen from Table 10a and 10b that by doping lithium manganese iron phosphate (containing 35% of manganese and about 20% of phosphorus) at the manganese and phosphorus sites and by coating with three layers, the content of the element manganese in the positive electrode active material and the ratio of the weight content of the element manganese to that of the element phosphorus was obviously reduced; in addition, by comparing Examples 1-14 with Comparative Examples 3, 4, and 12, and in conjunction with Table 9, it could be known that the decrease in the elements manganese and phosphorus in the positive electrode active material would lead to a decrease in manganese and iron dissolution and an improvement in the battery performance of the secondary battery prepared therefrom.

TABLE 11

Properties of powders of the positive electrode active materials and the properties of the prepared batteries in Example 28-40

| | Properties of powder of positive electrode active material | | | | | | Battery performance | | |
|---|---|---|---|---|---|---|---|---|---|
| Example No. | Lattice change rate (%) | Li/Mn antisite defect concentration (%) | Compacted density (g/cm³) | Surface oxygen valence state | Charge constant current rate at 3 C (%) | Dissolution of Mn and Fe after cycling (ppm) | Capacity of button battery at 0.1 C | Expansion of battery cell upon 30 days of storage at 60° C. (%) | Number of cycles at a capacity retention rate of 80% at 45° C. |
| Example 1 | 2.5 | 1.8 | 2.35 | −1.93 | 70.3 | 7 | 157.2 | 4.2 | 1128 |
| Example 30a | 2.4 | 1.9 | 2.36 | −1.97 | 68.7 | 15 | 156.2 | 4.8 | 1018 |
| Example 30b | 2.5 | 1.7 | 2.36 | −1.96 | 70.1 | 12 | 155.6 | 4.6 | 1087 |
| Example 31a | 2.5 | 1.7 | 2.38 | −1.97 | 69.1 | 14 | 155.9 | 4.3 | 1054 |
| Example 31b | 2.6 | 1.8 | 2.39 | −1.98 | 69.4 | 23 | 156.2 | 5.3 | 997 |
| Example 32 | 2.6 | 1.9 | 2.34 | −1.96 | 71.3 | 16 | 156.4 | 4.6 | 1004 |
| Example 33 | 2.4 | 1.7 | 2.36 | −1.94 | 70.9 | 11 | 157.5 | 5.1 | 1102 |
| Example 34 | 2.5 | 1.9 | 2.33 | −1.92 | 71.6 | 14 | 155.8 | 5.4 | 1024 |
| Example 35 | 2.5 | 1.7 | 2.34 | −1.92 | 68.4 | 18 | 156.1 | 4.9 | 1054 |
| Example 36 | 2.4 | 1.9 | 2.33 | −1.95 | 67.5 | 27 | 154.7 | 5.9 | 954 |
| Example 37 | 2.2 | 1.8 | 2.36 | −1.94 | 69.4 | 24 | 156.4 | 5.7 | 1017 |
| Example 38 | 2.4 | 1.9 | 2.37 | −1.91 | 71.6 | 31 | 155.8 | 5.3 | 991 |
| Example 39 | 2.6 | 1.9 | 2.38 | −1.94 | 70.8 | 27 | 154.8 | 5.1 | 975 |
| Example 40 | 2.4 | 1.9 | 2.36 | −1.92 | 71.5 | 15 | 156.8 | 4.2 | 1154 |

It could be seen from Table 11 that the use of the first coating layer and the second coating layer containing additional elements within the ranges of the present application could also obtain a positive electrode active material with good performance and achieved good battery performance results.

TABLE 12

Interplanar spacings and included angles of the first coating layer substance and the second coating layer substance

| No. | First coating layer substance Interplanar spacing | First coating layer substance Included angle for crystal orientation (111) | Second coating layer substance Interplanar spacing | Second coating layer substance Included angle for crystal orientation (111) |
|---|---|---|---|---|
| Example 1 | 0.303 | 29.496 | 0.348 | 25.562 |
| Example 42 | 0.451 | 19.668 | 0.348 | 25.562 |
| Example 43 | 0.297 | 30.846 | 0.348 | 25.562 |
| Example 44 | 0.457 | 19.456 | 0.348 | 25.562 |
| Example 45 | 0.437 | 20.257 | 0.348 | 25.562 |
| Example 46 | 0.462 | 19.211 | 0.348 | 25.562 |
| Example 47 | 0.450 | 19.735 | 0.348 | 25.562 |
| Example 48 | 0.372 | 23.893 | 0.348 | 25.562 |
| Example 51 | 0.303 | 29.496 | 0.374 | 23.789 |
| Example 52 | 0.303 | 29.496 | 0.360 | 24.710 |
| Example 53 | 0.303 | 29.496 | 0.350 | 25.428 |
| Example 54 | 0.303 | 29.496 | 0.425 | 20.885 |
| Example 55 | 0.303 | 29.496 | 0.356 | 24.993 |
| Example 57 | 0.303 | 29.496 | 0.244 | 36.808 |

It could be seen from Table 12 that the interplanar spacings and included angles of the first coating layer and the second coating layer in the present application were both within the ranges of the present application.

III. Investigation of the Influence of Coating Layer Sintering Method on the Performance of the Positive Electrode Active Material and Secondary Battery The batteries of the examples and comparative examples in the following table were manufactured similarly to Example 1, except that the method parameters in the following table were used. The results were shown in Tables 13a and 13b below.

TABLE 13a

Influence of sintering temperature and sintering time on secondary battery in steps S4, S6 and S8

| No. | Sintering temperature in S4 (° C.) | Sintering time in S4 (h) | Sintering temperature in S6 (° C.) | Sintering time in S6 (h) | Sintering temperature in S8 (° C.) | Sintering time in S8 (h) |
|---|---|---|---|---|---|---|
| Example 1 | 650 | 6 | 700 | 8 | 700 | 10 |
| Example II-1 | 750 | 4 | 600 | 6 | 700 | 6 |
| Example II-2 | 800 | 4 | 600 | 6 | 700 | 6 |
| Example II-3 | 700 | 2 | 600 | 6 | 700 | 6 |
| Example II-4 | 700 | 3 | 600 | 6 | 700 | 6 |
| Example II-5 | 700 | 4 | 500 | 6 | 700 | 6 |
| Example II-6 | 700 | 4 | 700 | 6 | 700 | 6 |
| Example II-7 | 700 | 4 | 600 | 8 | 700 | 6 |
| Example II-8 | 700 | 4 | 600 | 10 | 700 | 6 |
| Example II-9 | 700 | 4 | 600 | 6 | 750 | 6 |
| Example II-10 | 700 | 4 | 600 | 6 | 800 | 6 |
| Example II-11 | 700 | 4 | 600 | 6 | 700 | 8 |
| Example II-12 | 700 | 4 | 600 | 6 | 700 | 10 |
| Comparative Example II-1 | 600 | 3 | 600 | 8 | 750 | 8 |
| Comparative Example II-2 | 850 | 3 | 600 | 8 | 750 | 8 |
| Comparative Example II-3 | 750 | 1.5 | 600 | 8 | 750 | 8 |
| Comparative Example II-4 | 750 | 4.5 | 600 | 8 | 750 | 8 |
| Comparative Example II-5 | 750 | 3 | 450 | 8 | 750 | 8 |
| Comparative Example II-6 | 750 | 3 | 750 | 8 | 750 | 8 |
| Comparative Example II-7 | 750 | 3 | 600 | 5.5 | 750 | 8 |
| Comparative Example II-8 | 750 | 3 | 600 | 10.5 | 750 | 8 |
| Comparative Example II-9 | 750 | 3 | 600 | 8 | 650 | 8 |
| Comparative Example II-10 | 750 | 3 | 600 | 8 | 850 | 8 |
| Comparative Example II-11 | 750 | 3 | 600 | 8 | 750 | 5.5 |
| Comparative Example II-12 | 750 | 3 | 600 | 8 | 750 | 10.5 |

TABLE 13b

Influence of sintering temperature and sintering time on secondary battery in steps S4, S6 and S8

| No. | Lattice change rate (%) | Li/Mn antisite defect concentration | Compacted density | Charge constant current rate at 3 C (%) | Dissolution of Mn and Fe after cycling (ppm) | Surface oxygen valence state | Capacity of button battery at 0.1 C (mAh/g) | Expansion of battery cell upon 30 d of storage at 60° C. (%) | Number of cycles at a capacity retention rate of 80% at 45° C. |
|---|---|---|---|---|---|---|---|---|---|
| Example 1 | 2.5 | 1.8 | 2.35 | 70.3 | 7 | −1.93 | 157.2 | 4.2 | 1128 |
| Example II-1 | 3.0 | 2.4 | 2.24 | 64.2 | 12 | −1.95 | 154.2 | 6.4 | 894 |
| Example II-2 | 3.1 | 2.4 | 2.21 | 67.3 | 12 | −1.95 | 153.2 | 6.2 | 904 |
| Example II-3 | 2.9 | 2.3 | 2.20 | 62.3 | 15 | −1.96 | 151.1 | 5.8 | 846 |
| Example II-4 | 2.7 | 2.1 | 2.23 | 64.3 | 14 | −1.96 | 152.8 | 5.4 | 908 |
| Example II-5 | 2.5 | 1.8 | 2.31 | 62.4 | 28 | −1.95 | 153.1 | 4.7 | 798 |
| Example II-6 | 2.5 | 1.8 | 2.34 | 63.5 | 14 | −1.96 | 154.3 | 5.1 | 867 |
| Example II-7 | 2.5 | 1.8 | 2.31 | 67.3 | 11 | −1.95 | 156.8 | 4.7 | 959 |
| Example II-8 | 2.5 | 1.8 | 2.34 | 68.5 | 10 | −1.96 | 156.2 | 4.5 | 1045 |
| Example II-9 | 2.5 | 1.8 | 2.35 | 70.3 | 7 | −1.93 | 157.2 | 4.2 | 1128 |
| Example II-10 | 2.5 | 1.8 | 2.35 | 70.1 | 7 | −1.93 | 156.3 | 4.4 | 1097 |
| Example II-11 | 2.5 | 1.8 | 2.35 | 68.4 | 8 | −1.91 | 155.4 | 4.7 | 964 |
| Example II-12 | 2.5 | 1.8 | 2.35 | 66.7 | 10 | −1.95 | 154.7 | 5 | 897 |
| Comparative Example II-1 | 4.8 | 5.3 | 2.28 | 54.1 | 86 | −1.90 | 140.7 | 10.6 | 615 |
| Comparative Example II-2 | 5.3 | 4.7 | 2.38 | 57.2 | 84 | −1.91 | 145.3 | 9.0 | 684 |
| Comparative Example II-3 | 4.7 | 4.5 | 2.25 | 53.1 | 87 | −1.91 | 141.9 | 8.8 | 691 |
| Comparative Example II-4 | 4.1 | 4.0 | 2.31 | 58.1 | 79 | −1.92 | 140.1 | 8.1 | 711 |
| Comparative Example II-5 | 4.8 | 4.6 | 2.28 | 52.1 | 78 | −1.90 | 141.2 | 8.7 | 601 |
| Comparative Example II-6 | 3.9 | 4.8 | 2.35 | 49.7 | 78 | −1.95 | 142.4 | 8.8 | 604 |
| Comparative Example II-7 | 4.4 | 4.2 | 2.24 | 45.4 | 81 | −1.93 | 142.9 | 8.8 | 614 |
| Comparative Example II-8 | 4.1 | 3.9 | 2.34 | 49.1 | 79 | −1.92 | 141.1 | 7.9 | 684 |
| Comparative Example II-9 | 5.2 | 4.1 | 2.31 | 48.4 | 81 | −1.93 | 141.8 | 10.2 | 567 |
| Comparative Example II-10 | 5.0 | 4.0 | 2.34 | 49.1 | 78 | −1.95 | 141.2 | 8.7 | 678 |
| Comparative Example II-11 | 4.3 | 4.2 | 2.27 | 47.8 | 84 | −1.91 | 142.9 | 9.4 | 521 |
| Comparative Example II-12 | 50 | 4.9 | 2.35 | 49.8 | 78 | −1.94 | 141.7 | 9.5 | 655 |

It could be seen from the above content that when the sintering temperature range in step S4 was 650-800° C. and the sintering time was 2-6 hours, the sintering temperature in step S6 was 500-700° C. and the sintering time was 6-10 hours, and the sintering temperature in step S8 was 700-800° C. and the sintering time was 6-10 hours, a smaller lattice change rate, a smaller Li/Mn antisite defect concentration, less dissolution of the elements manganese and iron, a better charge constant current rate at 3 C, a larger battery capacity, a better battery cycling performance, and a better high-temperature storage stability could be achieved.

In addition, compared with Comparative Example II-4 (the sintering temperature in step S4 was 750° C. and the sintering time was 4.5 hours), Example II-1 (the sintering temperature in step S4 was 750° C. and the sintering time was 4 h) achieved a better positive electrode active material performance and battery performance, indicating that when the sintering temperature in step S4 was 750° C. or greater than 750° C., it was needed to control the sintering time to be less than 4.5 hours.

IV. Investigation of the Influence of the Reaction Temperature and Reaction Time During the Preparation of the Inner Core on the Performance of the Positive Electrode Active Material and Battery The positive electrode active materials and batteries of Examples III-1 to III-17 in the following table were prepared similarly to Example 1, except for the method parameters in the preparation of the positive electrode active material, as shown in the following table. The results were also shown in the following table.

TABLE 14a

Influence of the reaction temperature and reaction time during the preparation of the inner core on the performance of the positive electrode active material and secondary battery

| No. | step S1 Reaction temperature (° C.) | step S1 Reaction time (h) | step S2 Reaction temperature (° C.) | step S2 Reaction time (h) | Lattice change rate (%) | Li/Mn antisite defect concentration (%) | Compacted density (g/cm³) |
|---|---|---|---|---|---|---|---|
| Example 1 | 80 | 6 | 80 | 10 | 2.5 | 1.8 | 2.35 |
| Example III-1 | 70 | 6 | 80 | 10 | 2.8 | 3.4 | 2.30 |
| Example III-2 | 60 | 6 | 80 | 10 | 3.1 | 3.1 | 2.33 |
| Example III-4 | 100 | 6 | 80 | 10 | 2.3 | 2.4 | 2.37 |
| Example III-5 | 120 | 6 | 80 | 10 | 2.1 | 2.2 | 2.38 |
| Example III-6 | 80 | 2 | 80 | 10 | 2.8 | 3.2 | 2.27 |
| Example III-7 | 80 | 3 | 80 | 10 | 2.6 | 2.7 | 2.29 |
| Example III-8 | 80 | 5 | 80 | 10 | 2.4 | 1.9 | 2.34 |
| Example III-9 | 80 | 7 | 80 | 10 | 2.5 | 1.8 | 2.35 |
| Example III-10 | 80 | 9 | 80 | 10 | 2.6 | 1.8 | 2.36 |
| Example III-11 | 80 | 6 | 40 | 10 | 3.2 | 3.4 | 2.28 |
| Example III-12 | 80 | 6 | 60 | 10 | 2.8 | 2.9 | 2.31 |
| Example III-13 | 80 | 6 | 80 | 10 | 2.5 | 2.7 | 2.35 |
| Example III-14 | 80 | 6 | 100 | 10 | 2.7 | 2.8 | 2.33 |
| Example III-15 | 80 | 6 | 120 | 10 | 2.8 | 3.1 | 2.32 |
| Example III-16 | 80 | 6 | 90 | 1 | 3.7 | 3.8 | 2.26 |
| Example III-17 | 80 | 6 | 90 | 3 | 3.4 | 3.4 | 2.31 |
| Example III-18 | 80 | 6 | 90 | 5 | 3.1 | 3.1 | 2.33 |
| Example III-19 | 80 | 6 | 90 | 7 | 2.8 | 2.9 | 2.34 |
| Example III-20 | 80 | 6 | 90 | 9 | 2.5 | 2.7 | 2.35 |

TABLE 14b

Influence of the reaction temperature and reaction time during the preparation of the inner core on the performance of the positive electrode active material and secondary battery

| No. | Charge constant current rate at 3 C (%) | Dissolution of Mn and Fe after cycling (ppm) | Surface oxygen valence state | Capacity of button battery at 0.1 C (mAh/g) | Expansion of battery cell upon 30 d of storage at 60° C. (%) | Capacity retention rate at 45° C. Number of cycles at 80% |
|---|---|---|---|---|---|---|
| Example 1 | 70.3 | 7 | −1.93 | 157.2 | 4.2 | 1128 |
| Example III-1 | 60.1 | 34 | −1.93 | 155.4 | 5.8 | 876 |
| Example III-2 | 64.2 | 18 | −1.92 | 156.2 | 5.1 | 997 |
| Example III-4 | 71.3 | 7 | −1.94 | 156.8 | 4.1 | 1137 |
| Example III-5 | 72.1 | 5 | −1.92 | 155.4 | 4.0 | 1158 |
| Example III-6 | 68.4 | 24 | −1.90 | 154.9 | 5.1 | 895 |
| Example III-7 | 69.7 | 17 | −1.92 | 156.1 | 4.7 | 967 |
| Example III-8 | 70.6 | 8 | −1.94 | 156.8 | 4.3 | 1137 |
| Example III-9 | 68.3 | 11 | −1.94 | 156.4 | 4.8 | 987 |
| Example III-10 | 67.2 | 15 | −1.93 | 155.9 | 5.2 | 921 |
| Example III-11 | 67.8 | 35 | −1.94 | 156.8 | 5.4 | 894 |
| Example III-12 | 68.7 | 18 | −1.95 | 157.0 | 4.9 | 927 |
| Example III-13 | 70.3 | 7 | −1.93 | 157.2 | 4.2 | 1128 |
| Example III-14 | 69.4 | 15 | −1.93 | 156.7 | 4.6 | 957 |
| Example III-15 | 68.1 | 24 | −1.94 | 156.2 | 4.8 | 914 |
| Example III-16 | 67.9 | 38 | −1.93 | 155.8 | 5.2 | 885 |
| Example III-17 | 68.2 | 32 | −1.94 | 156.1 | 4.8 | 915 |
| Example III-18 | 69.1 | 27 | −1.92 | 156.4 | 4.6 | 934 |
| Example III-19 | 69.4 | 15 | −1.93 | 156.8 | 4.5 | 971 |
| Example III-20 | 70.3 | 7 | −1.93 | 157.2 | 4.2 | 1128 |

It could be seen from Tables 14a and 14b that when the reaction temperature range in step S1 was 60-120° C. and the reaction time was 2-9 hours; and the reaction temperature range in step S2 was 40-120° C. and the reaction time was 1-10 hours, the performance of the powder of the positive electrode active material (lattice change rate, Li/Mn antisite defect concentration, surface oxygen valence state, and compacted density) and the performance of the manufactured battery (electric capacity, high-temperature cycling performance, and high-temperature storage performance) were all excellent.

Specific Examples about the Novel Conductive Undercoat Layer

Hereinafter, the examples of the present application will be explained. The examples described below are exemplary, are merely for explaining the present application, and should not be construed as limiting the present application. Examples in which no specific techniques or conditions are indicated are based on techniques or conditions described in documents in the art or according to product instructions. The reagents or instruments used therein for which no manufacturers are not specified are all conventional products that are commercially available.

In order to distinguish the above specific examples about the novel positive electrode material, the specific examples about the novel conductive undercoat layer are numbered with suffix ['].

Example 1' (Positive Electrode Active Material of Example 1)

1. Provision of First Polymer

In the following examples, the first polymer was a hydrogenated carboxylated acrylonitrile-butadiene rubber, which contained a first monomeric unit, a second monomeric unit, a third monomeric unit, and a fourth monomeric unit. The weight percentages of the first monomeric unit, the second monomeric unit, the third monomeric unit, and the fourth monomeric unit in the polymer and the weight-average molecular weight of the first polymer were as shown in Table 1P.

The first monomeric unit was a monomeric unit represented by formula 1;

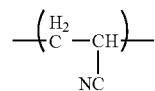

formula 1 the second monomeric unit was including at least one selected from the group consisting of a monomeric unit represented by formula 2 and a monomeric unit represented by formula 3

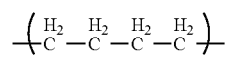

formula 2

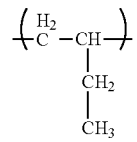

formula 3 the third monomeric unit was including at least one selected from the group consisting of a monomeric unit represented by formula 4 and a monomeric unit represented by formula 5

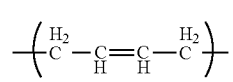

formula 4

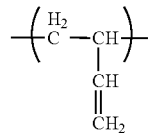

formula 5 the fourth monomeric unit was a monomeric unit represented by formula 6:

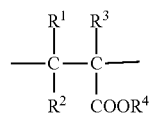

formula 6

In this example, $R^1$, $R^2$, and $R^3$ were all H, and $R^4$ was n-butyl.

TABLE 1P

| First monomeric unit Weight percentage M1 | Second monomeric unit Weight percentage M2 | Third monomeric unit Weight percentage M3 | Fourth monomeric unit Weight percentage M4 | Weight-average molecular weight/10,000 |
|---|---|---|---|---|
| 34% | 64% | 1% | 1% | 25 |

2. Preparation of Aluminum Foil with Conductive Undercoat Layer

A first polymer, a first aqueous binder (polyacrylic acid-acrylate copolymer, with a weight-average molecular weight of 340,000), and a first conductive agent (SP) were dissolved/dispersed in deionized water at a weight ratio of 15:40:45 to prepare a conductive undercoat layer slurry.

The conductive undercoat layer slurry was applied to both sides of an aluminum foil, and after drying, a conductive undercoat layer with a thickness of 5 μm was formed on each side. An aluminum foil with a conductive undercoat layer was obtained.

3) Preparation of Positive Electrode Plate

The three-layer-coated lithium manganese phosphate positive electrode active material prepared above in Example 1' was uniformly mixed with the conductive agent acetylene black and the binder polyvinylidene fluoride (PVDF) in an N-methylpyrrolidone solvent system at a weight ratio of 92:2.5:5.5 to obtain a positive electrode slurry, the positive electrode slurry was applied to both sides of the aluminum foil with a conductive undercoat layer, and after drying and cold pressing, a positive electrode film layer was formed, thereby obtaining a positive electrode plate. The positive electrode film layer had a surface density of 0.025 g/cm² on one side and a compacted density of 2.4 g/cm³.

4) Preparation of Negative Electrode Plate

The negative electrode active material artificial graphite, hard carbon, the conductive agent acetylene black, the binder styrene butadiene rubber (SBR), and the thickening agent sodium carboxymethylcellulose (CMC) were uniformly mixed in deionized water at a weight ratio of 90:5:2:2:1, the mixture was applied to a copper foil, and after drying and cold pressing, a negative electrode film layer was formed, thereby obtaining a negative electrode plate. The negative electrode film layer had a surface density of 0.013 g/cm² on one side and a compacted density of 1.7 g/cm³.

5) Packaging of Full Battery

With a polyethylene (PE) porous polymer thin film as a separator, the positive electrode plate, the separator, and the negative electrode plate were stacked in this order, such that the separator was located between the positive electrode plate and the negative electrode plate and played a role of isolation, and the stack was then wound to obtain a bare battery cell. The bare battery cell was placed in an outer package, which was injected with the above electrolyte solution and packaged to obtain the full battery (hereinafter also referred to as "quandian" in Chinese).

The weight of the positive electrode active substance in a single full battery was 565.66 g; and the weight of the negative electrode active substance was 309.38 g.

Examples 2' to 40' (Positive Electrode Active Materials of Examples 2 to 40)

Examples 2' to 40' were different from Example 1' in step 3). The other step parameters were the same as those in Example 1'.

The positive electrode active materials used in step 3) of Examples 2' to 40' were the positive electrode active materials of Examples 2 to 40 above, respectively.

Comparative Examples 1' to 18' (No Conductive Undercoat Layer was Provided)

Comparative Examples 1' to 18' were different from Example 1' in steps 2) and 3). The other step parameters were the same as those in Example 1'.

In steps 2) and 3) of Comparative Examples 1' to 18', instead of preparing an aluminum foil with a conductive undercoat layer, the positive electrode slurry was directly applied to an aluminum foil, and after drying and cold pressing, a positive electrode film layer was formed, thereby obtaining a positive electrode plate.

The positive electrode active materials used in step 3) of Comparative Examples 1' to 17' were the positive electrode active materials of Comparative Examples 1 to 17 above, respectively.

The positive electrode active material used in step 3) of Comparative Example 18' was the positive electrode active material of Example 1 above.

Comparative Example 19' (No First Polymer)

Comparative Example 19' was different from Example 1' in step 2). The other step parameters were the same as those in Example 1'.

In step 2) of Comparative Example 19', a first aqueous binder (polyacrylic acid-acrylate copolymer) and a first conductive agent (SP) were dissolved/dispersed in deionized water at a weight ratio of 40:45 to prepare a conductive undercoat layer slurry. The conductive undercoat layer slurry was applied to an aluminum foil, and after drying, a conductive undercoat layer with a thickness of 5 µm was formed. An aluminum foil with a conductive undercoat layer was obtained.

Comparative Example 20' (Replacing the First Polymer with an I-th Polymer)

Comparative Example 20' was different from Example 1' in step 2). The other step parameters were the same as those in Example 1'.

In step 2) of Comparative Example 20', an I-th polymer, a first aqueous binder (polyacrylic acid-acrylate copolymer), and a first conductive agent (SP) were dissolved/dispersed in deionized water at a weight ratio of 15:40:45 to prepare a conductive undercoat layer slurry. The conductive undercoat layer slurry was applied to an aluminum foil, and after drying, a conductive undercoat layer with a thickness of 5 µm was formed. An aluminum foil with a conductive undercoat layer was obtained.

The I-th polymer was different from the first polymer in the composition of the polymer. The composition of the I-th polymer and the weight-average molecular weight of the I-th polymer were as shown in Table 2P below.

TABLE 2P

| First monomeric unit Weight percentage M1 | Second monomeric unit Weight percentage M2 | Third monomeric unit Weight percentage M3 | Fourth monomeric unit Weight percentage M4 | Weight-average molecular weight/10,000 |
|---|---|---|---|---|
| 30% | 59% | 10% | 1% | 25 |

Comparative Example 21' (Replacing the First Aqueous Binder with an I-th Binder)

Comparative Example 21' was different from Example 1' in step 2). The other step parameters were the same as those in Example 1'.

In step 2) of Comparative Example 21', a first polymer, an I-th binder (polyacrylic acid, with a weight-average molecular weight of 350,000), and a first conductive agent (SP) were dissolved/dispersed in deionized water at a weight ratio of 15:40:45 to prepare a conductive undercoat layer slurry. The conductive undercoat layer slurry was applied to an aluminum foil, and after drying, a conductive undercoat layer with a thickness of 5 µm was formed. An aluminum foil with a conductive undercoat layer was obtained.

Analysis and Detection

1. Test of Adhesion of Positive Electrode Plate

Figure 2:
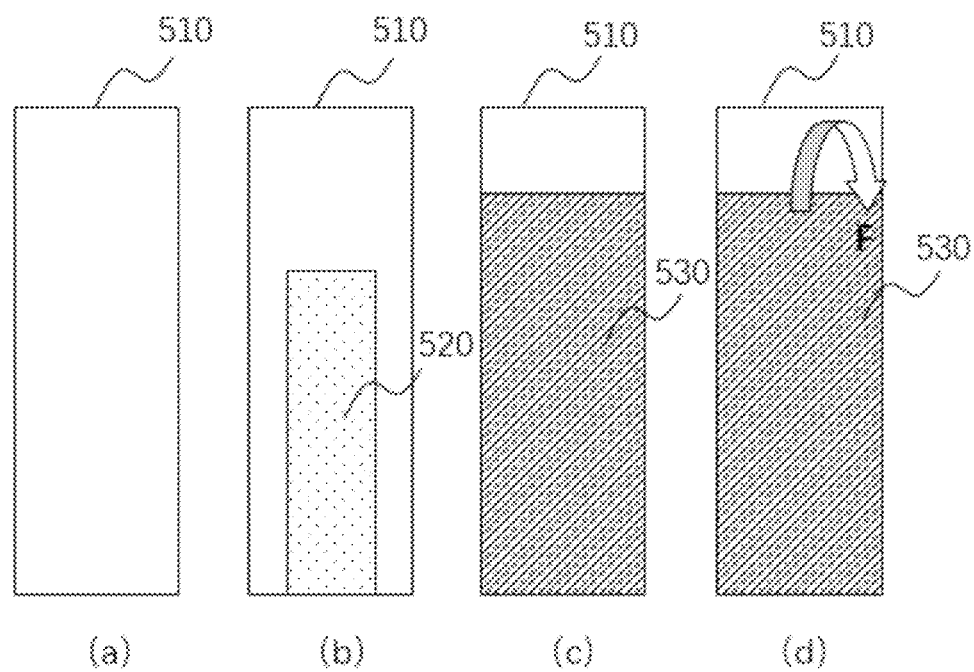
FIG. 2 is a schematic flowchart of the measurement of the adhesion of an electrode plate according to an embodiment of the present application.

FIG. 2 showed in (a) to (d) the flowchart of a peeling test. As shown in FIG. 2(a), first of all, a steel plate 510 with dimensions 30 mm width×100 mm length was provided. As shown in FIG. 2 (b), a double-sided adhesive tape 520 with dimensions 20 mm width×30 mm length was then provided, and the double-sided adhesive tape 520 was adhered to the steel plate 510, with one width side of the double-sided adhesive tape 520 being aligned with one width side of the steel plate 510. As shown in FIG. 2 (c), an electrode plate 530 to be tested was then provided, wherein the dimensions of the electrode plate 530 to be tested were 20 mm width× 180 mm length. The electrode plate 530 to be tested covered the double-sided adhesive tape 520 (both sides were aligned), with the coating face of the electrode plate 530 facing the double-sided adhesive tape 520. Since the length of the electrode plate 530 to be tested was longer than that of the double-sided adhesive tape 520, some areas of the electrode plate 530 to be tested were not bound to the double-sided adhesive tape. As shown in FIG. 2 (d), the steel plate 510 was fixed on a base of a tensile testing machine, the end that was not bound to the double-sided adhesive tape of the electrode plate 530 to be tested was clamped by a clamp, and the clamp was then stretched in the direction to the other end (as shown by the arrow), with the direction of the stretching force being perpendicular to the steel plate 510 and at a certain distance from the surface of the steel plate 510. While stretching the peeling electrode plate out of the paper plane, the steel plate was moved upward to keep the stretching direction perpendicular to the peeling position of the electrode plate. The electrode plate 530 was gradually peeled off the steel plate during stretching. The stretching speed of the clamp was 50 mm/min during stretching. During stretching, the tension force of the clamp was recorded, and after the tension force was stable, peeling continued to a length of 40 mm. The average tension force over this peeling length was the adhesion (in N).

2. Test of DC Resistance Value of Battery

At 25° C., the battery was charged to 4.3 V at a constant current and constant voltage at 1.0 C (1.0 C referred to the nominal capacity); and at a rate of 1.0 C, the power of the battery was adjusted to 50% SOC. After standing for 5 min, the battery was discharged at 4 C at a constant current ($I_m$) for 30 s (voltage data was collected once every 1 s), the initial voltage $U_0$ and the voltage $U_{30}$ after 30 s of discharge were recorded, and the value of DC resistance (DCR) was calculated according to the following equation.

Value of DC resistance=$(U_0-U_{30})/I_m$

The DC resistance value of the battery in Example 1' was 100%, and the changes of the other examples and comparative examples relative to Example 1' were expressed in percentage.

3. Number of Cycles of the Battery at a Capacity Retention Rate of 80% at 45° C. (Hereinafter Referred to as "Number of Cycles at 80% Capacity")

In a constant-temperature environment at 45° C., at 2.5-4.3 V, the full battery was charged to 4.3 V at 1 C and then charged at a constant voltage of 4.3 V until the current was less than or equal to 0.05 mA. The full battery was left to stand for 5 min and then discharged to 2.5 V at 1 C, and the discharge capacity at this time was recorded as DO. The above-mentioned charge/discharge cycle was repeated until the discharge capacity was reduced to 80% of DO. The number of cycles experienced by the battery at this time was recorded.

According to the above detection and analysis methods, the adhesion of the positive electrode plates prepared in Examples 1' to 40' and Comparative Examples 1' to 21' above, the DC resistance value of the battery, and the number of cycles of the battery at a capacity retention rate of 80% at 45° C. were detected, and the results were as shown in Table 3P below.

TABLE 3P

|  | Adhesion of positive electrode plate/N | DC resistance with Example 1' as a basis | Number of cycles at 80% capacity |
| --- | --- | --- | --- |
| Comparative Example 1' | 4.8 | 209% | 208 |
| Comparative Example 2' | 4.9 | 2005 | 286 |
| Comparative Example 3' | 4.7 | 201% | 384 |
| Comparative Example 4' | 4.5 | 210% | 651 |
| Comparative Example 5' | 5 | 173% | 766 |
| Comparative Example 6' | 4.4 | 175% | 773 |
| Comparative Example 7' | 4.5 | 160% | 769 |
| Comparative Example 8' | 4.5 | 166% | 753 |
| Comparative Example 9' | 4.4 | 159% | 772 |
| Comparative Example 10' | 4.8 | 155% | 785 |
| Comparative Example 11' | 5 | 152% | 1007 |
| Comparative Example 12' | 5.1 | 160% | 863 |
| Comparative Example 13' | 4 | 177% | 661 |
| Comparative Example 14' | 3.8 | 144% | 711 |
| Comparative Example 15' | 3.7 | 110% | 1106 |
| Comparative Example 16' | 3.9 | 104% | 1037 |
| Comparative Example 17' | 4 | 127% | 903 |
| Comparative Example 18' | 3.8 | 177% | 1133 |
| Comparative Example 19' | 9.5 | 102% | 1285 |
| Comparative Example 20' | 16.4 | 162% | 643 |
| Comparative Example 21' | 16 | 100% | 1300 |
| Example 1' | 15.0 | 100% | 1470 |
| Example 2' | 14 | 90% | 1548 |
| Example 3' | 14.2 | 95% | 1588 |
| Example 4' | 12.7 | 91% | 1621 |
| Example 5' | 15 | 98% | 1700 |
| Example 6' | 15.5 | 100% | 1777 |
| Example 7' | 15.5 | 103% | 1803 |
| Example 8' | 15.5 | 107% | 1200 |
| Example 9' | 14.8 | 100% | 1485 |
| Example 10' | 15.8 | 105% | 1593 |
| Example 11' | 13.9 | 110% | 1200 |
| Example 12' | 12 | 94% | 1320 |
| Example 13' | 11.6 | 99% | 1400 |
| Example 14' | 12 | 101% | 1500 |

TABLE 3P-continued

|  | Adhesion of positive electrode plate/N | DC resistance with Example 1' as a basis | Number of cycles at 80% capacity |
|---|---|---|---|
| Example 15' | 13.4 | 100% | 1365 |
| Example 16' | 15.6 | 100% | 1302 |
| Example 17' | 15 | 101% | 1455 |
| Example 18' | 16.3 | 101% | 1500 |
| Example 19' | 14.6 | 99% | 1568 |
| Example 20' | 13.8 | 97% | 1606 |
| Example 21' | 14.7 | 95% | 1539 |
| Example 22' | 15.2 | 85% | 1732 |
| Example 23' | 16.7 | 89% | 1805 |
| Example 24' | 7.3 | 88% | 1700 |
| Example 25' | 14.9 | 88% | 1698 |
| Example 26' | 14.8 | 99% | 1244 |
| Example 27' | 14.8 | 100% | 1321 |
| Example 28' | 14.6 | 110% | 1195 |
| Example 29' | 15 | 100% | 1122 |
| Example 30a' | 15.7 | 100% | 1549 |
| Example 30b' | 15.6 | 100% | 1644 |
| Example 31a' | 14.6 | 105% | 1300 |
| Example 31b' | 15 | 100% | 1302 |
| Example 32' | 15 | 95% | 1200 |
| Example 33' | 14.5 | 99% | 1305 |
| Example 34' | 14.5 | 103% | 1240 |
| Example 35' | 14.5 | 100% | 1257 |
| Example 36' | 15.6 | 110% | 1000 |
| Example 37' | 14.9 | 104% | 1920 |
| Example 38' | 14.8 | 111% | 1094 |
| Example 39' | 16.1 | 111% | 1098 |
| Example 40' | 15.2 | 98% | 1328 |

As could be seen from Table 3P, the positive electrode plates of Examples 1' to 40' exhibited improved adhesion, and the batteries of Example 1' to 40' exhibited reduced DC resistance and improved cycling capacity retention rate.

Comparative Examples 18' (no conductive undercoat layer was arranged), 19' (without the first polymer), 20' (replacing the first polymer with an I-th polymer), and 21' (replacing the first aqueous binder with the I-th binder) failed to achieve the above improvement effects.

Examples 3-1' to 3-7' (the Composition of the First Polymer Varied)

Examples 3-1' to 3-7' were different from Example 1' in step 2). The other step parameters were the same as those in Example 1'.

In step 2), the composition of the first polymers used in Examples 3-1' to 3-7' was different from that in Example 1'. Specifically, the weight percentages of the second monomeric unit and the third monomeric unit were different from those in Example 1'. The composition of the first polymers of Example 3-1' to 3-7' was as shown in Table 4P below.

Examples 3-8' to 3-12' (the Thickness of the Conductive Undercoat Layer Varied)

Examples 3-8' to 3-12' were different from Example 1' in step 2). The other step parameters were the same as those in Example 1'.

In step 2), the thickness of the conductive undercoat layers of Examples 3-8' to 3-12' was different from that of Example 1'. See Table 5P for details.

TABLE 5P

|  | Example 1' | Example 3-8' | Example 3-9' | Example 3-10' | Example 3-11' | Example 3-12' |
|---|---|---|---|---|---|---|
| Thickness of conductive undercoat layer | 5 μm | 1 μm | 3 μm | 7 μm | 10 μm | 20 μm |

TABLE 4P

|  | First monomeric unit Weight percentage M1 | Second monomeric unit Weight percentage M2 | Third monomeric unit Weight percentage M3 | Fourth monomeric unit Weight percentage M4 | M3/(M2 + M3) |
|---|---|---|---|---|---|
| Example 1' | 0.64 | 0.01 | 0.01 | 0.015 | 0.34 |
| Example 3-1' | 0.65 | 0 | 0.01 | 0 | 0.34 |
| Example 3-2' | 0.649675 | 0.000325 | 0.01 | 0.0005 | 0.34 |
| Example 3-3' | 0.64935 | 0.00065 | 0.01 | 0.001 | 0.34 |
| Example 3-4' | 0.6487 | 0.0013 | 0.01 | 0.002 | 0.34 |
| Example 3-5' | 0.64805 | 0.00195 | 0.01 | 0.003 | 0.34 |
| Example 3-6' | 0.64675 | 0.00325 | 0.01 | 0.005 | 0.34 |
| Example 3-7' | 0.598 | 0.052 | 0.01 | 0.08 | 0.34 |

Examples 3-13' to 3-18' (the Composition of the Conductive Undercoat Layer Varied)

Examples 3-13' to 3-18' were different from Example 1' in step 2). The other step parameters were the same as those in Example 1'.

In step 2), the composition of the conductive undercoat layer of Examples 3-13' to 3-18' (the ratio of the first polymer, the first aqueous binder and the first conductive agent) was different from that of Example 1'. See Table 6P for details.

TABLE 6P

|  | First polymer Parts by weight | First aqueous binder Parts by weight | First conductive agent Parts by weight |
|---|---|---|---|
| Example 1' | 15 | 40 | 45 |
| Example 3-13' | 5 | 45 | 50 |
| Example 3-14' | 10 | 40 | 50 |
| Example 3-15' | 20 | 30 | 50 |
| Example 3-16' | 10 | 80 | 10 |
| Example 3-17' | 10 | 65 | 25 |
| Example 3-18' | 10 | 50 | 40 |

According to the above detection and analysis methods, the adhesion of the positive electrode plates prepared in Examples 1', 3-1', and 3-18' above, the DC resistance value of the battery, and the number of cycles of the battery at a capacity retention rate of 80% at 45° C. were detected, and the results were as shown in Table 7P below.

TABLE 7P

|  | Adhesion of electrode plate | DC resistance | Number of cycles at 80% capacity |
|---|---|---|---|
| Example 1' | 15.0 | 100% | 1470 |
| Example 3-1' | 13.1 | 1 | 1400 |
| Example 3-2' | 13.0 | 0.97 | 1488 |
| Example 3-3' | 12.5 | 1 | 1403 |
| Example 3-4' | 13.6 | 0.99 | 1400 |
| Example 3-5' | 13.8 | 0.98 | 1460 |
| Example 3-6' | 13.5 | 0.99 | 1455 |
| Example 3-7' | 12.0 | 2.58 | 645 |
| Example 3-8' | 8.9 | 112% | 1444 |
| Example 3-9' | 8.3 | 108% | 1520 |
| Example 3-10' | 9.4 | 100% | 1473 |
| Example 3-11' | 21.5 | 122% | 1400 |
| Example 3-12' | 32.8 | 159% | 1378 |
| Example 3-13' | 8.5 | 100% | 1430 |
| Example 3-14' | 10.5 | 105% | 1480 |
| Example 3-15' | 11.9 | 103% | 1401 |
| Example 3-16' | 10.7 | 135% | 1400 |
| Example 3-17' | 14.3 | 129% | 1435 |
| Example 3-18' | 15 | 115% | 1430 |

As could be seen from Table 7P, the positive electrode plates of Examples 1' and 3-1' to 3-18' exhibited improved adhesion, and the batteries of Examples 1' and 3-1' to 3-18' exhibited reduced DC resistance and improved cycling capacity retention rate. When the value of M3/(M2+M3) was 0-5%, the DC impedance of the battery exhibited a significant decrease.

Examples 4-1' to 4-9'

Examples 4-1' to 4-9' were different from Example 1' in step 3). The other step parameters were the same as those in Example 1'.

In step 3) of Examples 4-1' to 4-9', the three-layer-coated lithium manganese phosphate positive electrode active material prepared above in Example 1 was uniformly mixed with the conductive agent acetylene black, the binder polyvinylidene fluoride (PVDF), a dispersing agent, and an infiltration agent in an N-methylpyrrolidone solvent system at a weight ratio of $(92-Y_1-Y_2)$: 2.5:5.5: $Y_1$: $Y_2$ to obtain a positive electrode slurry, the positive electrode slurry was applied to both sides of the aluminum foil with a conductive undercoat layer, and after drying and cold pressing, a positive electrode film layer was formed, thereby obtaining a positive electrode plate. The positive electrode film layer had a surface density of 0.025 g/cm² on one side and a compacted density of 2.4 g/cm³.

The infiltration agent in Examples 4-1' to 4-9' was a maleic anhydride-styrene copolymer (molecular weight 5,000). The dispersing agent in Examples 4-1' to 4-9' was the second polymer.

The second polymer was a hydrogenated acrylonitrile-butadiene rubber, which contained a fifth monomeric unit, a sixth monomeric unit, and a seventh monomeric unit. The weight percentages of the fifth monomeric unit, the sixth monomeric unit, and the seventh monomeric unit in the polymer and the weight-average molecular weight of the second polymer were as shown in Table 8P.

The fifth monomeric unit was a monomeric unit represented by formula 1;

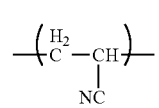

formula 7 the sixth monomeric unit was including at least one selected from the group consisting of a monomeric unit represented by formula 8 and a monomeric unit represented by formula 9

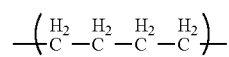

formula 8

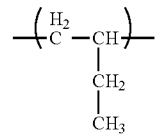

formula 9 the seventh monomeric unit was including at least one selected from the group consisting of a monomeric unit represented by formula 10 and a monomeric unit represented by formula 11

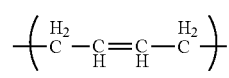

formula 10

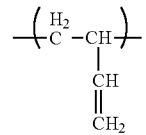

formula 11

TABLE 8P

| Fifth monomeric unit Weight percentage M5 | Sixth monomeric unit Weight percentage M6 | Seventh monomeric unit Weight percentage M7 | Weight-average molecular weight/ 10,000 |
|---|---|---|---|
| 45% | 54.9% | 0.1% | 22 |

In the positive electrode plates of Examples 4-1' to 4-9', the mass ratio of the first polymer (from the conductive undercoat layer) to the second polymer (from the positive electrode film layer) was 2:1.

The proportions $Y_1$ of the dispersing agent (the second polymer) and $Y_2$ of the infiltration agent (the maleic anhydride-styrene copolymer) used in step 3) of Examples 4-1' to 4-9' and the ratio $Y_1/Y_2$ between the two were as shown in Table 9P below.

TABLE 9P

| | $Y_1$ | $Y_2$ | $Y_1/Y_2$ |
|---|---|---|---|
| Example 4-1' | 0.2 | 0.3 | 0.67 |
| Example 4-2' | 0.1 | 0.5 | 0.20 |
| Example 4-3' | 0.5 | 0.5 | 1.00 |
| Example 4-4' | 1 | 0.5 | 2.00 |
| Example 4-5' | 0.25 | 0.05 | 5.00 |
| Example 4-6' | 0.25 | 0.2 | 1.25 |
| Example 4-7' | 0.25 | 0.3 | 0.83 |
| Example 4-8' | 0.25 | 0.8 | 0.31 |
| Example 4-9' | 0.25 | 2 | 0.13 |

According to the above detection and analysis methods, the adhesion of the positive electrode plates prepared in Examples 1' and 4-1' to 4-9' above, the DC resistance value of the battery, and the number of cycles of the battery at a capacity retention rate of 80% at 45° C. were detected, and the results were as shown in Table 10P below.

TABLE 10P

| | Adhesion of electrode plate | DC resistance | Number of cycles |
|---|---|---|---|
| Example 1' | 15 | 100% | 1470 |
| Example 4-1' | 78 | 93% | 1562 |
| Example 4-2' | 60 | 105% | 1577 |
| Example 4-3' | 144 | 134% | 1516 |
| Example 4-4' | 189 | 167% | 1600 |
| Example 4-5' | 103 | 100% | 1684 |
| Example 4-6' | 103 | 99% | 1469 |
| Example 4-7' | 115 | 98% | 1504 |
| Example 4-8' | 108 | 101% | 1536 |
| Example 4-9' | 110 | 110% | 1488 |

As shown in Table 10P, on the basis of the above-mentioned novel conductive undercoat layer, combined with the novel positive electrode film layer containing the dispersing agent and infiltration agent, the adhesion of the electrode plate could be further improved, and/or the DC resistance of the battery could be reduced, and/or the cycling performance of the battery could be improved.

As could be seen from the above experimental data, the present application provided a novel positive electrode plate, a secondary battery, and a power consuming device. The positive electrode plate comprises a novel positive electrode active material and a novel conductive undercoat layer.

The novel positive electrode active material achieved superior results in terms of one or even all of cycling performance, high-temperature storage performance, and safety performance.

The novel conductive undercoat layer achieved superior results in terms of one or even all of providing the adhesion of the electrode plate, reducing the DC resistance of the battery, and improving the cycling performance of the battery.

It should be noted that the present application is not limited to the above embodiments. The above embodiments are exemplary only, and any embodiment that has substantially the same constitutions as the technical ideas and the same functions and effects within the scope of the technical solution of the present application falls within the technical scope of the present application. In addition, without departing from the gist of the present application, various modifications that can be conceived by those skilled in the art to the embodiments and other modes constructed by combining some of the constituent elements of the embodiments also fall within the scope of the present application.

What is claimed is:
1. A positive electrode plate, comprising:
   a positive electrode current collector;
   a positive electrode film layer arranged on at least one surface of the positive electrode current collector; and
   a conductive undercoat layer positioned between the positive electrode current collector and the positive electrode film layer;
   wherein:
      the positive electrode film layer comprises a positive electrode active material comprising an inner core and a shell coating the inner core, wherein:
         the inner core has a chemical formula of $Li_{1+x}Mn_{1-y}A_yP_{1-z}R_zO_4$ in which x is any value in a range of −0.100 to 0.100, y is any value in a range of 0.001 to 0.500, z is any value in a range of 0.001 to 0.100, A is one or more selected from the group consisting of Zn, Al, Na, K, Mg, Mo, W, Ti, V, Zr, Fe, Ni, Co, Ga, Sn, Sb, Nb, and Ge, R is one or more selected from the group consisting of B, Si, N, and S, and the values of x, y, and z satisfy that the entire inner core be electrically neutral; and
         the shell comprises a first coating layer coating the inner core, a second coating layer coating the first coating layer, and a third coating layer coating the second coating layer, wherein:
            the first coating layer comprises crystalline pyrophosphate $Li_aMP_2O_7$ or $M_b(P_2O_7)_c$ in which $0 \leq a \leq 2$, $1 \leq b \leq 4$, and $1 \leq c \leq 6$, with the values of a, b, and c satisfying that the crystalline pyrophosphate $Li_aMP_2O_7$ or $M_b(P_2O_7)_c$ be electrically neutral, and M in each of the crystalline pyrophosphates $Li_aMP_2O_7$ and $M_b(P_2O_7)_c$ is independently one or more selected from the group consisting of Fe, Ni, Mg, Co, Cu, Zn, Ti, Ag, Zr, Nb, and Al;
            the second coating layer comprises crystalline phosphate $XPO_4$ in which X is one or more selected from the group consisting of Li, Fe, Ni, Mg, Co, Cu, Zn, Ti, Ag, Zr, Nb, and Al; and
            the third coating layer is carbon; and the conductive undercoat layer comprises a polymer, an aqueous binder, and a conductive agent, wherein the polymer comprises:
a first monomeric unit represented by formula 1;
a second monomeric unit including at least one selected from the group consisting of a monomeric unit represented by formula 2 and a monomeric unit represented by formula 3;
a third monomeric unit including at least one selected from the group consisting of a monomeric unit represented by formula 4 and a monomeric unit represented by formula 5; and
a fourth monomeric unit represented by formula 6, in which:
$R^1$, $R^2$, and $R^3$ each independently representing one or more of H, carboxyl, an ester group, and substituted or unsubstituted C1-C10 alkyl, C1-C10 alkoxy, C2-C10 alkenyl, and C6-C10 aryl, and
$R^4$ represents one or more of H and substituted or unsubstituted C1-C10 alkyl, C1-C10 alkoxy, C2-C10 alkenyl, and C6-C10 aryl;

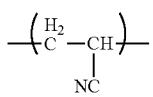

formula 1

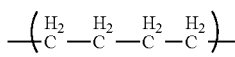

formula 2

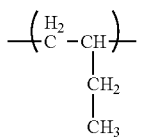

formula 3

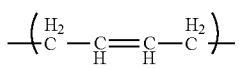

formula 4

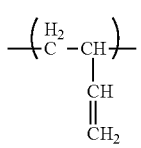

formula 5

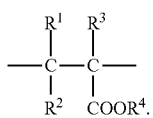

formula 6

2. The positive electrode plate according to claim 1, wherein based on a total mass of the polymer:
a mass percentage content of the first monomeric unit M1 is in a range of 10-55%; or
a mass percentage content of the second monomeric unit M2 is in a range of 40-80%; or
a mass percentage content of the third monomeric unit M3 is greater than 0 and less than or equal to 10%; or
a mass percentage content of the fourth monomeric unit M4 is greater than 0 and less than or equal to 10%.

3. The positive electrode plate according to claim 2, wherein M3/(M2+M3) is greater than 0 and less than or equal to 5%.

4. The positive electrode plate according to claim 1, wherein:
the polymer includes one or more selected from the group consisting of hydrogenated acrylonitrile-butadiene rubber and hydrogenated carboxylated acrylonitrile-butadiene rubber; or
a weight-average molecular weight of the polymer is in a range of 50,000 to 1,500,000.

5. The positive electrode plate according to claim 1, wherein:
the aqueous binder includes one or more selected from the group consisting of an aqueous polyacrylic resin and derivatives of the aqueous polyacrylic resin, an aqueous amino-modified polypropylene resin and derivatives of the aqueous amino-modified polypropylene resin, and polyvinyl alcohol and derivatives of the polyvinyl alcohol; or
a weight-average molecular weight of the aqueous binder is in a range of 200,000-1,500,000.

6. The positive electrode plate according to claim 1, wherein the conductive agent includes one or more selected from the group consisting of superconducting carbon, conductive graphite, acetylene black, carbon black, Ketjen black, carbon dots, carbon nanotubes, graphene, and carbon nanofibers.

7. The positive electrode plate according to claim 1, wherein based on a total mass of the conductive undercoat layer:
a mass percentage content of the polymer is in a range of 5-20%; or
a mass percentage content of the aqueous binder is in a range of 30-80%; or
a mass percentage content of the conductive agent is in a range of 10-50%.

8. The positive electrode plate according to claim 1, wherein a thickness of the conductive undercoat layer is in a range of 1-20 μm.

9. The positive electrode plate according to claim 1, wherein the positive electrode film layer further comprises one or more selected from the group consisting of an infiltration agent and a dispersing agent.

10. The positive electrode plate according to claim 9, wherein a surface tension of the infiltration agent is in a range of 20-40 mN/m.

11. The positive electrode plate according to claim 9, wherein the infiltration agent includes one or more selected from the group consisting of a small molecular organic solvent and a low-molecular-weight polymer.

12. The positive electrode plate according to claim 9, wherein:
the polymer is a first polymer; and
the dispersing agent comprises a second polymer, and the second polymer comprises:
a fifth monomeric unit represented by formula 7;
a sixth monomeric unit including at least one selected from the group consisting of a monomeric unit represented by formula 8 and a monomeric unit represented by formula 9; and
a seventh monomeric unit including at least one selected from the group consisting of a monomeric unit represented by formula 10 and a monomeric unit represented by formula 11;

formula 7

-continued

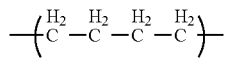
formula 8

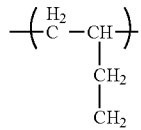
formula 9

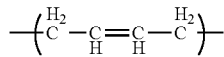
formula 10

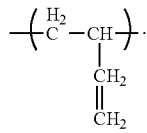
formula 11

13. The positive electrode plate according to claim 12, wherein based on a total mass of the second polymer:

a mass percentage content of the fifth monomeric unit M5 is in a range of 10-55%; or a mass percentage content of the sixth monomeric unit M6 is in a range of 40-80%; or a mass percentage content of the seventh monomeric unit M7 is greater than 0 and less than or equal to 10%.

14. The positive electrode plate according to claim 13, wherein M7/(M6+M7) is greater than 0 and less than or equal to 5%.

15. The positive electrode plate according to claim 12, wherein:

the second polymer is hydrogenated acrylonitrile-butadiene rubber; or a weight-average molecular weight of the second polymer is in a range of 50,000 to 500,000.

16. The positive electrode plate according to claim 12, wherein in the positive electrode plate, a mass ratio of the first polymer to the second polymer is in a range of 1.5-5.

17. The positive electrode plate according to claim 9, wherein based on a total mass of the positive electrode film layer:

a mass percentage content of the dispersing agent Y1 is in a range of 0.05-1%; or a mass percentage content of the infiltration agent Y2 is in a range of 0.05-2%.

18. The positive electrode plate according to claim 17, wherein Y1/Y2 is in a range of 0.05-20.

19. The positive electrode plate according to claim 1, wherein:

the crystalline pyrophosphate in the first coating layer has an interplanar spacing range of 0.293-0.470 nm and an included angle range of 18.00°-32.00° for the crystal orientation (111); and the crystalline phosphate in the second coating layer has an interplanar spacing range of 0.244-0.425 nm and an included angle range of 20.00°-37.00° for the crystal orientation (111).

20. The positive electrode plate according to claim 1, wherein:

in the inner core, a ratio of y to 1-y is in a range of 1:10 to 1:1; or in the inner core, a ratio of z to 1-z is in a range of 1:9 to 1:999.

* * * * *